(12) United States Patent
Robinson et al.

(10) Patent No.: US 11,099,433 B2
(45) Date of Patent: Aug. 24, 2021

(54) SWITCHABLE DIRECTIONAL DISPLAY APPARATUS

(71) Applicant: RealD Spark, LLC, Beverly Hills, CA (US)

(72) Inventors: Michael G. Robinson, Boulder, CO (US); Graham J. Woodgate, Henley-on-Thames (GB); Robert A. Ramsey, Boulder, CO (US); Jonathan Harrold, Leamington Spa (GB)

(73) Assignee: RealD Spark, LLC, Beverly Hills, CA (US)

(*) Notice: Subject to any disclaimer, the term of this patent is extended or adjusted under 35 U.S.C. 154(b) by 0 days.

(21) Appl. No.: 16/646,105

(22) PCT Filed: Sep. 14, 2018

(86) PCT No.: PCT/US2018/051027
§ 371 (c)(1),
(2) Date: Mar. 10, 2020

(87) PCT Pub. No.: WO2019/055755
PCT Pub. Date: Mar. 21, 2019

(65) Prior Publication Data
US 2021/0026170 A1   Jan. 28, 2021

Related U.S. Application Data

(60) Provisional application No. 62/699,914, filed on Jul. 18, 2018, provisional application No. 62/673,359, (Continued)

(51) Int. Cl.
*G02F 1/13363* (2006.01)
*G02B 5/30* (2006.01)
(Continued)

(52) U.S. Cl.
CPC ....... *G02F 1/13363* (2013.01); *G02B 5/3016* (2013.01); *G02B 5/3083* (2013.01);
(Continued)

(58) Field of Classification Search
CPC .................................................. G02F 1/1323
See application file for complete search history.

(56) References Cited

U.S. PATENT DOCUMENTS

| 4,621,898 A | 11/1986 | Cohen |
| 4,974,941 A | 12/1990 | Gibbons et al. |

(Continued)

FOREIGN PATENT DOCUMENTS

| CA | 2222313 A1 | 6/1998 |
| CN | 1125943 C | 10/2003 |

(Continued)

OTHER PUBLICATIONS

Adachi, et al. "P-228L: Late-News Poster: Controllable Viewing-Angle Displays using a Hybrid Aligned Nematic Liquid Crystal Cell", ISSN, SID 2006 Digest, pp. 705-708.

(Continued)

*Primary Examiner* — Edmond C Lau
(74) *Attorney, Agent, or Firm* — Penny L. Lowry

(57) ABSTRACT

A switchable directional display apparatus comprises a spatial light modulator and a backlight comprising a waveguide, two light sources arranged to provide illumination through the edge of the waveguide and a switchable liquid crystal retarder. The light sources and switchable liquid crystal retarder may be controlled to provide a first operating state with a narrow field of view and a second operating state with a wide field of view. Image visibility in wide angle mode of operation may be maximised while visual security level may be maximised in a narrow angle mode of operation, to provide an efficient privacy mode of operation.

46 Claims, 45 Drawing Sheets

Related U.S. Application Data filed on May 18, 2018, provisional application No. 62/641,657, filed on Mar. 12, 2018, provisional application No. 62/634,168, filed on Feb. 22, 2018, provisional application No. 62/592,085, filed on Nov. 29, 2017, provisional application No. 62/582,052, filed on Nov. 6, 2017, provisional application No. 62/565,836, filed on Sep. 29, 2017, provisional application No. 62/559,187, filed on Sep. 15, 2017.

(51) Int. Cl.
| | |
|---|---|
| *G02F 1/1335* | (2006.01) |
| *G02F 1/137* | (2006.01) |
| *G02F 1/13* | (2006.01) |
| *G02F 1/1337* | (2006.01) |
| *G02F 1/1347* | (2006.01) |
| *F21V 8/00* | (2006.01) |

(52) U.S. Cl.
CPC ......... *G02B 6/0035* (2013.01); *G02B 6/0055* (2013.01); *G02F 1/137* (2013.01); *G02F 1/1323* (2013.01); *G02F 1/1337* (2013.01); *G02F 1/13471* (2013.01); *G02F 1/133528* (2013.01); *G02F 1/133536* (2013.01); *G02F 1/133634* (2013.01); *G02F 1/13706* (2021.01); *G02F 1/13712* (2021.01); *G02F 1/133738* (2021.01); *G02F 1/133742* (2021.01); *G02F 2203/12* (2013.01); *G02F 2413/02* (2013.01)

(56) References Cited

U.S. PATENT DOCUMENTS

| | | | |
|---|---|---|---|
| 5,005,108 A | 4/1991 | Pristash et al. |
| 5,035,491 A | 7/1991 | Kawagishi et al. |
| 5,658,490 A | 8/1997 | Sharp et al. |
| 5,715,028 A | 2/1998 | Abileah et al. |
| 5,808,784 A | 9/1998 | Ando et al. |
| 5,835,166 A | 11/1998 | Hall et al. |
| 5,894,361 A | 4/1999 | Yamazaki et al. |
| 5,914,760 A | 6/1999 | Daiku |
| 6,055,103 A | 4/2000 | Woodgate et al. |
| 6,099,758 A | 8/2000 | Verrall et al. |
| 6,144,433 A | 11/2000 | Tillin et al. |
| 6,204,904 B1 | 3/2001 | Tillin et al. |
| 6,222,672 B1 | 4/2001 | Towler et al. |
| 6,392,727 B1 | 5/2002 | Larson et al. |
| 6,437,915 B2 | 8/2002 | Moseley et al. |
| 7,067,985 B2 | 6/2006 | Adachi |
| 7,163,319 B2 | 1/2007 | Kuo et al. |
| 7,227,602 B2 | 6/2007 | Jeon et al. |
| 7,524,542 B2 | 4/2009 | Kim et al. |
| 7,528,893 B2 | 5/2009 | Schultz et al. |
| 7,528,913 B2 | 5/2009 | Kobayashi |
| 7,633,586 B2 | 12/2009 | Winlow et al. |
| 7,660,047 B1 | 2/2010 | Travis et al. |
| 7,766,534 B2 | 8/2010 | Iwasaki |
| 7,834,834 B2 | 11/2010 | Takatani et al. |
| 7,970,246 B2 | 6/2011 | Travis et al. |
| 7,991,257 B1 | 8/2011 | Coleman |
| 8,098,350 B2 | 1/2012 | Sakai et al. |
| 8,154,686 B2 | 4/2012 | Mather et al. |
| 8,237,876 B2 | 8/2012 | Tan et al. |
| 8,249,408 B2 | 8/2012 | Coleman |
| 8,262,271 B2 | 9/2012 | Tillin et al. |
| 8,646,931 B2 | 2/2014 | Choi et al. |
| 8,801,260 B2 | 8/2014 | Urano et al. |
| 8,939,595 B2 | 1/2015 | Choi et al. |
| 8,973,149 B2 | 3/2015 | Buck |
| 9,195,087 B2 | 11/2015 | Terashima |
| 9,274,260 B2 | 3/2016 | Urano et al. |
| 9,304,241 B2 | 4/2016 | Wang et al. |
| 9,324,234 B2 | 4/2016 | Ricci et al. |
| 9,448,355 B2 | 9/2016 | Urano et al. |
| 9,501,036 B2 | 11/2016 | Kang et al. |
| 9,519,153 B2 | 12/2016 | Robinson et al. |
| 10,054,732 B2 | 8/2018 | Robinson et al. |
| 10,126,575 B1 | 11/2018 | Robinson et al. |
| 10,303,030 B2 | 5/2019 | Robinson et al. |
| 10,401,638 B2 | 9/2019 | Robinson et al. |
| 10,488,705 B2 | 11/2019 | Xu et al. |
| 10,649,248 B1 | 5/2020 | Jiang et al. |
| 10,649,259 B2 | 5/2020 | Lee et al. |
| 2002/0024529 A1 | 2/2002 | Miller et al. |
| 2002/0171793 A1 | 11/2002 | Sharp et al. |
| 2003/0089956 A1 | 5/2003 | Allen et al. |
| 2003/0107686 A1 | 6/2003 | Sato et al. |
| 2004/0015729 A1 | 1/2004 | Elms et al. |
| 2004/0100598 A1 | 5/2004 | Adachi et al. |
| 2004/0125430 A1 | 7/2004 | Kasajima et al. |
| 2004/0145703 A1 | 7/2004 | O'Connor et al. |
| 2004/0240777 A1 | 12/2004 | Woodgate et al. |
| 2005/0111100 A1 | 5/2005 | Mather et al. |
| 2005/0117186 A1 | 6/2005 | Li et al. |
| 2005/0157225 A1 | 7/2005 | Toyooka et al. |
| 2005/0190326 A1 | 9/2005 | Jeon et al. |
| 2005/0190329 A1 | 9/2005 | Okumura |
| 2005/0219693 A1 | 10/2005 | Hartkop et al. |
| 2006/0066785 A1 | 3/2006 | Moriya |
| 2006/0082702 A1 | 4/2006 | Jacobs et al. |
| 2006/0203162 A1 | 9/2006 | Ito et al. |
| 2006/0215244 A1 | 9/2006 | Yosha et al. |
| 2006/0244884 A1 | 11/2006 | Jeon et al. |
| 2006/0262258 A1 | 11/2006 | Wang et al. |
| 2006/0262558 A1 | 11/2006 | Cornelissen |
| 2006/0268207 A1 | 11/2006 | Tan et al. |
| 2006/0285040 A1 | 12/2006 | Kobayashi |
| 2007/0035964 A1 | 2/2007 | Olczak |
| 2007/0047254 A1 | 3/2007 | Schardt et al. |
| 2007/0064163 A1 | 3/2007 | Tan et al. |
| 2007/0139772 A1 | 6/2007 | Wang |
| 2007/0223251 A1 | 9/2007 | Liao |
| 2007/0285775 A1 | 12/2007 | Lesage et al. |
| 2008/0068329 A1 | 3/2008 | Shestak et al. |
| 2008/0158491 A1 | 7/2008 | Zhu et al. |
| 2008/0285310 A1 | 11/2008 | Aylward et al. |
| 2008/0316198 A1 | 12/2008 | Fukushima et al. |
| 2009/0040426 A1 | 2/2009 | Mather et al. |
| 2009/0085894 A1 | 4/2009 | Gandhi et al. |
| 2009/0086509 A1 | 4/2009 | Omori et al. |
| 2009/0128735 A1 | 5/2009 | Larson et al. |
| 2009/0128746 A1 | 5/2009 | Kean et al. |
| 2009/0174843 A1 | 7/2009 | Sakai et al. |
| 2009/0213298 A1 | 8/2009 | Mimura et al. |
| 2009/0213305 A1 | 8/2009 | Ohmuro et al. |
| 2009/0244415 A1 | 10/2009 | Ide |
| 2010/0002296 A1 | 1/2010 | Choi et al. |
| 2010/0128200 A1 | 5/2010 | Morishita et al. |
| 2010/0149459 A1 | 6/2010 | Yabuta et al. |
| 2010/0177113 A1 | 7/2010 | Gay et al. |
| 2010/0205667 A1 | 8/2010 | Anderson et al. |
| 2010/0238376 A1 | 9/2010 | Sakai et al. |
| 2010/0283930 A1 | 11/2010 | Park et al. |
| 2010/0289989 A1 | 11/2010 | Adachi et al. |
| 2010/0295755 A1 | 11/2010 | Broughton et al. |
| 2010/0328438 A1 | 12/2010 | Ohyama et al. |
| 2011/0018860 A1 | 1/2011 | Parry-Jones et al. |
| 2011/0032483 A1 | 2/2011 | Hruska et al. |
| 2011/0241983 A1 | 10/2011 | Chang |
| 2011/0286222 A1 | 11/2011 | Coleman |
| 2011/0321143 A1 | 12/2011 | Angaluri et al. |
| 2012/0002121 A1 | 1/2012 | Pirs et al. |
| 2012/0086875 A1 | 4/2012 | Yokota |
| 2012/0127573 A1 | 5/2012 | Robinson et al. |
| 2012/0147280 A1 | 6/2012 | Osterman et al. |
| 2012/0235891 A1 | 9/2012 | Nishitani et al. |
| 2012/0294037 A1 | 11/2012 | Holman et al. |
| 2012/0299913 A1 | 11/2012 | Robinson et al. |
| 2012/0314145 A1 | 12/2012 | Robinson |
| 2012/0327101 A1 | 12/2012 | Blixt et al. |
| 2013/0039062 A1 | 2/2013 | Vinther et al. |
| 2013/0100097 A1 | 4/2013 | Martin |

(56) References Cited

U.S. PATENT DOCUMENTS

| | | |
|---|---|---|
| 2013/0107174 A1 | 5/2013 | Yun et al. |
| 2013/0128165 A1 | 5/2013 | Lee et al. |
| 2013/0242231 A1 | 9/2013 | Kurata et al. |
| 2013/0278544 A1 | 10/2013 | Cok |
| 2013/0293793 A1 | 11/2013 | Lu |
| 2013/0300985 A1 | 11/2013 | Bulda |
| 2013/0307831 A1 | 11/2013 | Robinson et al. |
| 2013/0321340 A1 | 12/2013 | Seo et al. |
| 2013/0328866 A1 | 12/2013 | Woodgate et al. |
| 2014/0009508 A1 | 1/2014 | Woodgate et al. |
| 2014/0022619 A1 | 1/2014 | Woodgate et al. |
| 2014/0071382 A1 | 3/2014 | Scardato |
| 2014/0098418 A1 | 4/2014 | Lin |
| 2014/0111760 A1 | 4/2014 | Guo et al. |
| 2014/0132887 A1 | 5/2014 | Kurata |
| 2014/0201844 A1 | 7/2014 | Buck |
| 2014/0211125 A1 | 7/2014 | Kurata |
| 2014/0232960 A1 | 8/2014 | Schwartz et al. |
| 2014/0240344 A1 | 8/2014 | Tomono et al. |
| 2014/0240828 A1 | 8/2014 | Robinson et al. |
| 2014/0268358 A1 | 9/2014 | Kusaka et al. |
| 2014/0286043 A1 | 9/2014 | Sykora et al. |
| 2014/0289835 A1 | 9/2014 | Varshaysky et al. |
| 2014/0361990 A1 | 12/2014 | Leister |
| 2015/0055366 A1 | 2/2015 | Chang et al. |
| 2015/0116212 A1 | 4/2015 | Freed et al. |
| 2015/0177447 A1 | 6/2015 | Woodgate et al. |
| 2015/0177563 A1 | 6/2015 | Cho et al. |
| 2015/0185398 A1 | 7/2015 | Chang et al. |
| 2015/0205157 A1 | 7/2015 | Sakai et al. |
| 2015/0268479 A1* | 9/2015 | Woodgate ............ G02B 6/0035 349/15 |
| 2015/0286061 A1 | 10/2015 | Seo et al. |
| 2015/0286817 A1 | 10/2015 | Haddad et al. |
| 2015/0301400 A1 | 10/2015 | Kimura et al. |
| 2015/0346455 A1 | 12/2015 | Powell |
| 2015/0346532 A1 | 12/2015 | Do et al. |
| 2015/0355490 A1 | 12/2015 | Kao et al. |
| 2015/0378085 A1 | 12/2015 | Robinson et al. |
| 2016/0103264 A1 | 4/2016 | Lee et al. |
| 2016/0132721 A1 | 5/2016 | Bostick et al. |
| 2016/0147074 A1 | 5/2016 | Kobayashi et al. |
| 2016/0154259 A1 | 6/2016 | Kim et al. |
| 2016/0216420 A1 | 7/2016 | Gaides et al. |
| 2016/0216540 A1 | 7/2016 | Cho et al. |
| 2016/0224106 A1 | 8/2016 | Liu |
| 2016/0238869 A1 | 8/2016 | Osterman et al. |
| 2016/0334898 A1 | 11/2016 | Kwak et al. |
| 2016/0349444 A1 | 12/2016 | Robinson et al. |
| 2016/0356943 A1 | 12/2016 | Choi et al. |
| 2016/0357046 A1 | 12/2016 | Choi et al. |
| 2017/0003436 A1 | 1/2017 | Inoue et al. |
| 2017/0031206 A1 | 2/2017 | Smith et al. |
| 2017/0090103 A1 | 3/2017 | Holman |
| 2017/0092187 A1 | 3/2017 | Bergquist |
| 2017/0092229 A1 | 3/2017 | Greenebaum et al. |
| 2017/0115485 A1 | 4/2017 | Saito et al. |
| 2017/0123241 A1 | 5/2017 | Su et al. |
| 2017/0139110 A1 | 5/2017 | Woodgate et al. |
| 2017/0168633 A1 | 6/2017 | Kwak et al. |
| 2017/0205558 A1 | 7/2017 | Hirayama et al. |
| 2017/0236494 A1 | 8/2017 | Sommerlade et al. |
| 2017/0269283 A1 | 9/2017 | Wang et al. |
| 2017/0269285 A1 | 9/2017 | Hirayama et al. |
| 2017/0329399 A1 | 11/2017 | Azam et al. |
| 2017/0336661 A1 | 11/2017 | Harrold et al. |
| 2017/0339398 A1 | 11/2017 | Woodgate et al. |
| 2017/0343715 A1 | 11/2017 | Fang et al. |
| 2018/0014007 A1 | 1/2018 | Brown |
| 2018/0052346 A1 | 2/2018 | Sakai et al. |
| 2018/0082068 A1 | 3/2018 | Lancioni et al. |
| 2018/0095581 A1 | 4/2018 | Hwang et al. |
| 2018/0113334 A1 | 4/2018 | Fang et al. |
| 2018/0188576 A1 | 7/2018 | Xu et al. |
| 2018/0188603 A1 | 7/2018 | Fang et al. |
| 2018/0196275 A1 | 7/2018 | Robinson et al. |
| 2018/0210243 A1 | 7/2018 | Fang et al. |
| 2018/0231811 A1 | 8/2018 | Wu |
| 2018/0252949 A1 | 9/2018 | Klippstein et al. |
| 2018/0259799 A1 | 9/2018 | Kroon |
| 2018/0259812 A1 | 9/2018 | Goda et al. |
| 2018/0321523 A1 | 11/2018 | Robinson et al. |
| 2018/0321553 A1 | 11/2018 | Robinson et al. |
| 2018/0329245 A1 | 11/2018 | Robinson et al. |
| 2018/0364526 A1 | 12/2018 | Finnemeyer et al. |
| 2019/0086706 A1 | 3/2019 | Robinson et al. |
| 2019/0121173 A1 | 4/2019 | Robinson et al. |
| 2019/0154896 A1 | 5/2019 | Yanai |
| 2019/0196236 A1 | 6/2019 | Chen et al. |
| 2019/0197928 A1 | 6/2019 | Schubert et al. |
| 2019/0215509 A1 | 7/2019 | Woodgate et al. |
| 2019/0227366 A1 | 7/2019 | Harrold et al. |
| 2019/0235304 A1 | 8/2019 | Tamada et al. |
| 2019/0250458 A1 | 8/2019 | Robinson et al. |
| 2019/0293858 A1 | 9/2019 | Woodgate et al. |
| 2019/0293983 A1 | 9/2019 | Robinson et al. |
| 2019/0353944 A1 | 11/2019 | Acreman et al. |
| 2020/0159055 A1 | 5/2020 | Robinson et al. |
| 2020/0225402 A1 | 7/2020 | Ihas et al. |

FOREIGN PATENT DOCUMENTS

| | | |
|---|---|---|
| CN | 1776484 A | 5/2006 |
| CN | 101681061 A | 3/2010 |
| CN | 104133292 A | 11/2014 |
| CN | 204740413 U | 11/2015 |
| CN | 209171779 U | 7/2019 |
| GB | 2418518 A | 3/2006 |
| GB | 2428100 A | 1/2007 |
| GB | 2482065 A | 1/2012 |
| GB | 2486935 B | 9/2013 |
| JP | H01130783 U | 9/1989 |
| JP | H11174489 A | 7/1999 |
| JP | 2007148279 A | 6/2007 |
| JP | 2007273288 A | 10/2007 |
| KR | 20120011228 A | 2/2012 |
| KR | 101990286 B1 | 6/2019 |
| TW | M537663 U | 3/2017 |
| WO | 2005071449 A2 | 8/2005 |
| WO | 2010021926 A2 | 2/2010 |
| WO | 2014011328 A1 | 1/2014 |
| WO | 2015040776 A1 | 3/2015 |
| WO | 2015057625 A1 | 4/2015 |
| WO | 2015143227 A1 | 9/2015 |
| WO | 2015157184 A1 | 10/2015 |
| WO | 2015190311 A1 | 12/2015 |
| WO | 2015200814 A1 | 12/2015 |
| WO | 2016195786 A1 | 12/2016 |
| WO | 2017050631 A1 | 3/2017 |
| WO | 2018035492 A1 | 2/2018 |
| WO | 2018208618 A1 | 11/2018 |
| WO | 2019055755 A1 | 3/2019 |
| WO | 2019067846 A1 | 4/2019 |
| WO | 2019147762 A1 | 8/2019 |

OTHER PUBLICATIONS

Brudy et al., "Is Anyone Looking? Mitigating Shoulder Surfing on Public Displays through Awareness and Protection", Proceedings of the International Symposium on Persuasive Displays (Jun. 3, 2014), pp. 1-6.

CN201780030715.3 Notification of the First Office Action dated Jan. 21, 2020.

EP-16860628.3 Extended European Search Report of European Patent Office dated Apr. 26, 2019.

EP-17799963.8 Extended European Search Report of European Patent Office dated Oct. 9, 2019.

Gass, et al. "Privacy LCD Technology for Cellular Phones", Sharp Laboratories of Europe Ltd, Mobile LCD Group, Feb. 2007, pp. 45-49.

Ishikawa, T., "New Design for a Highly Collimating Turning Film", SID 06 Digest, pp. 514-517.

(56) References Cited

OTHER PUBLICATIONS

Kalantar, et al. "Backlight Unit With Double Surface Light Emission," J. Soc. Inf. Display, vol. 12, Issue 4, pp. 379-387 (Dec. 2004).
PCT/US2016/058695 International search report and written opinion of the international searching authority dated Feb. 28, 2017.
PCT/US2017/032734 International search report and written opinion of the international searching authority dated Jul. 27, 2017.
PCT/US2018/031206 International search report and written opinion of the international searching authority dated Jul. 20, 2018.
PCT/US2018/031218 International Preliminary Report on Patentability dated Nov. 21, 2019.
PCT/US2018/031218 International search report and written opinion of the international searching authority dated Jul. 19, 2018.
PCT/US2018/051021 International search report and written opinion of the international searching authority dated Nov. 21, 2018.
PCT/US2018/051027 International search report and written opinion of the international searching authority dated Nov. 30, 2018.
PCT/US2018/053328 International search report and written opinion of the international searching authority dated Nov. 30, 2018.
PCT/US2018/059249 International search report and written opinion of the international searching authority dated Jan. 3, 2019.
PCT/US2018/059256 International search report and written opinion of the international searching authority dated Jan. 3, 2019.
PCT/US2019/014889 International search report and written opinion of the international searching authority dated May 24, 2019.
PCT/US2019/014902 International search report and written opinion of the international searching authority dated Jun. 25, 2019.
PCT/US2019/023659 International search report and written opinion of the international searching authority dated Jun. 10, 2019.
PCT/US2019/038409 International search report and written opinion of the international searching authority dated Sep. 19, 2019.
PCT/US2019/038466 International search report and written opinion of the international searching authority dated Nov. 5, 2019.
PCT/US2019/042027 International search report and written opinion of the international searching authority dated Oct. 15, 2019.
PCT/US2019/054291 International search report and written opinion of the international searching authority dated Jan. 6, 2020.
PCT/US2019/059990 International search report and written opinion of the international searching authority dated Feb. 28, 2020.
PCT/US2019/066208 International search report and written opinion of the international searching authority dated Feb. 27, 2020.
PCT/US2020/017537 International search report and written opinion of the international searching authority dated Apr. 29, 2020.
Weindorf et al., "Active Circular Polarizer OLED E-Mirror", Proceedings of the Society for Information Display 25th Annual Symposium of Vehicle Displays, Livonia, MI, pp. 225-237, Sep. 25-26, 2018.
Yang, "Mutli-scale recognition with DAG-CNNs", ICCV 2015.
PCT/US2020/060155 International search report and written opinion of the international searching authority dated Feb. 5, 2021.
PCT/US2020/060191 International search report and written opinion of the international searching authority dated Feb. 8, 2021.
Robson, et al. "Spatial and temporal contrast-sensitivity functions of the visual system", J. Opt. Soc. Amer., vol. 56, pp. 1141-1142 (1966).
PCT/US2020/053863 International search report and written opinion of the international searching authority dated Mar. 12, 2021.
PCT/US2020/063638 International search report and written opinion of the international searching authority dated Mar. 2, 2021.
PCT/US2020/064633 International search report and written opinion of the international searching authority dated Mar. 15, 2021.
Simonyan et al., "Very Deep Convolutional Networks For Large-Scale Image Recognition", ICLR 2015.
CN201880042320.X Notification of the First Office Action dated May 25, 2021.
EP-18855604.7 Extended European Search Report of European Patent Office dated Jun. 1, 2021.
EP-18857077.4 Extended European Search Report of European Patent Office dated Jun. 16, 2021.

\* cited by examiner

SWITCHABLE DIRECTIONAL DISPLAY APPARATUS

TECHNICAL FIELD

This disclosure generally relates to illumination from light modulation devices, and more specifically relates to switchable optical stacks for providing control of illumination for use in display including privacy display and a night-time display.

BACKGROUND

Privacy displays provide image visibility to a primary user that is typically in an on-axis position and reduced visibility of image content to a snooper, that is typically in an off-axis position. A privacy function may be provided by micro-louvre optical films that transmit some light from a display in an on-axis direction with low luminance in off-axis positions. However such films have high losses for head-on illumination and the micro-louvres may cause Moiré artefacts due to beating with the pixels of the spatial light modulator. The pitch of the micro-louvre may need selection for panel resolution, increasing inventory and cost.

Switchable privacy displays may be provided by control of the off-axis optical output.

Control may be provided by means of luminance reduction, for example by means of switchable backlights for a liquid crystal display (LCD) spatial light modulator. Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in U.S. Pat. No. 9,519,153, which is herein incorporated by reference in its entirety.

BRIEF SUMMARY

According to a first aspect of the present disclosure there is provided a display device comprising: a backlight arranged to output light, the backlight comprising: a directional waveguide; and plural light sources arranged to input light into the waveguide, the waveguide being arranged to direct light from different light sources into different solid angular extents as the output light; a transmissive spatial light modulator arranged to receive the output light from the backlight; an input polariser arranged on the input side of the spatial light modulator between the backlight and the spatial light modulator; an output polariser arranged on the output side of the spatial light modulator; an additional polariser arranged on the input side of the input polariser between the input polariser and the backlight or on the output side of the output polariser; and a switchable liquid crystal retarder comprising a layer of liquid crystal material arranged between the at least one additional polariser and the input polariser in the case that the additional polariser is arranged on the input side of the input polariser or between the additional polariser and the output polariser in the case that the additional polariser is arranged on the output side of the output polariser; and a control system arranged to synchronously control the light sources and the at least one switchable liquid crystal retarder.

Advantageously a display may be provided that achieves high levels of visual security to an off-axis snooper in a privacy mode of operation and high levels of image visibility to an off-axis viewer in a wide angle mode of operation. Desirable visual security level and image visibility for the respective modes are provided in ambient illumination. In privacy operation, the head-on user may increase display luminance while maintaining off-axis privacy, increasing image comfort. In wide angle operation, the head-on user may reduce display luminance while maintaining off-axis visibility, increasing image comfort.

The control system may be arranged: in a first device state, to operate light sources to selectively operate a first set of the light sources, the output light from which is directed into a first output solid angular extent, and to switch the switchable liquid crystal retarder into a first retarder state in which no phase shift is introduced to light passing therethrough; and in a second device state, to operate light sources to selectively operate a second set of the light sources, the output light from which is directed into a second output solid angular extent that is narrower than the first output solid angular extent, and to switch the switchable liquid crystal retarder into a second retarder state in which a phase shift is introduced to polarisation components of light passing therethrough along an axis inclined to a normal to the plane of the switchable liquid crystal retarder.

Advantageously a display may be switched between wide angle and narrow angle modes of operation without substantially reducing head-on luminance.

The directional waveguide may comprise at least one light input surface extending in a lateral direction along an end of the waveguide, the light sources being disposed along the at least one light input surface; and opposed first and second light guiding surfaces extending across the waveguide from the at least one light input surfaces for guiding the input light along the waveguide by total internal reflection, the waveguide being arranged to deflect input light guided through the waveguide to exit through the first guide surface.

Advantageously a large area thin backlight may be provided.

The second guide surface may be arranged to deflect the reflected input light through the first guide surface as output light, and the waveguide is arranged to image the light sources in the lateral direction so that the output light from the light sources is directed into respective optical windows in output directions that are distributed in dependence on input positions of the light sources. The waveguide may comprise a light input surface extending along a first end of the directional waveguide, and a reflective end extending along a second end of the directional waveguide opposite to the first end for reflecting the input light back along the waveguide, the reflective end having positive optical power in the lateral direction. The second guide surface may comprise light extraction features and intermediate regions between the light extraction features, the light extraction features being oriented to deflect the reflected input light through the first guide surface as output light and the intermediate regions being arranged to direct light through the waveguide without extracting it. The light extraction features may have positive optical power in the lateral direction. The at least one light input surface comprises a first input surface extending along a first end of the waveguide and a second input surface extending along a second light input end of the waveguide wherein the second light input end faces the first light input end.

Advantageously a controllable light output cone may be provided. In comparison to non-imaging waveguides, reduced off-axis luminance may be achieved by the backlight such that increased visual security levels may be achieved in privacy mode.

The first light guiding surface may comprise: a plurality of non-inclined light extraction features arranged in an array, each non-inclined light extraction feature being elongate, extending in a longitudinal direction perpendicular to the lateral direction, and having surface normal directions that vary in a plane orthogonal to the longitudinal direction and that have no component of tilt in the longitudinal direction; and the second light guiding surface comprises: a plurality of inclined light extraction features arranged in an array, each inclined light extraction feature having a surface normal direction with a tilt that has a component in the longitudinal direction, the plurality of non-inclined light extraction features and the plurality of inclined light extraction features being oriented to direct guided light through the first and second light guiding surfaces as output light.

Advantageously a collimated output may be provided from the waveguide, to achieve a narrow angle luminance profile from the backlight. Privacy mode operation may be achieved. By way of comparison with imaging waveguides reduced thickness may be achieved.

The first light guiding surface may comprise a planar surface and the second light guiding surface may comprise: (i) a plurality of non-inclined light extraction features arranged in an array, each non-inclined light extraction feature being elongate, extending in a longitudinal direction perpendicular to the lateral direction, and having surface normal directions that vary in a plane orthogonal to the longitudinal direction and that have no component of tilt in the longitudinal direction; and (ii) a plurality of inclined light extraction features arranged in an array, each inclined light extraction feature having a surface normal direction with a tilt that has a component in the longitudinal direction, the plurality of non-inclined light extraction features and the plurality of inclined light extraction features being oriented to direct guided light through the first and second light guiding surfaces as output light.

By way of comparison with waveguides with features on both sides, increased image quality and yield of manufacture may advantageously be achieved.

The plurality of inclined light extraction features may comprise: a first plurality of inclined light extraction features, each light extraction feature of the first plurality of inclined light extraction features having a surface normal direction that has a tilt with a component in the longitudinal direction that is away from the first light input end; and a second plurality of inclined light extraction features, each light extraction feature of the second plurality of inclined light extraction features having a surface normal direction that has a tilt with a component in the longitudinal direction that is towards the first light input end. The magnitude of the component in the longitudinal direction of the tilt of the surface normal direction of the first plurality of inclined light extraction features may be different from the magnitude of the component in the longitudinal direction of the tilt of the surface normal direction of the second plurality of inclined light extraction features. The plurality of non-inclined light extraction features comprises a lenticular surface or an elongate prismatic surface.

Advantageously a switchable backlight may be provided to achieve a narrow angle luminance profile and a wide angle luminance profile with increased solid angular extent in comparison to the narrow angle luminance profile. First and second sets of light sources may be conveniently arranged at facing sides of the waveguide to achieve a thin structure with low bezel width on two sides.

The display device may further comprise a light turning film comprising an array of elongate prismatic elements.

Advantageously maximum luminance output may be achieved in a direction normal to the display surface.

The switchable liquid crystal retarder may comprise electrodes disposed adjacent to the layer of liquid crystal material and on opposite sides of the liquid crystal layer. The control system may control the switchable liquid crystal material by means of control of a voltage being applied across the electrodes. The layer of liquid crystal material is switchable between two orientation states.

Advantageously the retardance of the liquid crystal layer may be adjusted to provide control of narrow and wide angle functionality.

When the layer of liquid crystal material is in the first orientation state of said two orientation states, the liquid crystal retarder provides no overall retardance to light passing therethrough perpendicular to the plane of the liquid crystal retarder or at an acute angle to the perpendicular to the plane of the liquid crystal retarder, and when the layer of liquid crystal material is in the second orientation state of said two orientation states, the liquid crystal retarder provides no overall retardance to light passing therethrough along an axis perpendicular to the plane of the retarders, but provides a non-zero overall retardance to light passing therethrough for some polar angles that are at an acute angle to the perpendicular to the plane of the liquid crystal retarder. In the case that the additional polariser is arranged on the input side of the input polariser between the input polariser and the backlight, the additional polariser has an electric vector transmission direction that is parallel to the electric vector transmission direction of the input polariser; or in the case that the additional polariser is arranged on the output side of the output polariser, the additional polariser has an electric vector transmission direction that is parallel to the electric vector transmission direction of the output polariser.

Advantageously the transmission in the direction normal to the display surface is substantially the same in the wide angle and privacy modes of operation.

The display may further comprise at least one passive compensation retarder arranged between the at least one additional polariser and the input polariser in the case that the additional polariser is arranged on the input side of the input polariser or between the additional polariser and the output polariser in the case that the additional polariser is arranged on the output side of the output polariser.

Advantageously the size of the polar region of luminance reduction may be increased in comparison to arrangements with no passive compensation retarder.

The at least one passive compensation retarder may comprise a pair of positive birefringent retarders which have optical axes in the plane of the retarders that are crossed.

The pair of retarders may have optical axes that each extend at 45° with respect to an electric vector transmission direction that is parallel to the electric vector transmission of the input display polariser in the case that the additional polariser is arranged on the input side of the input display polariser or is parallel to the electric vector transmission of the output display polariser in the case that the additional polariser is arranged on the output side of the input display polariser. The pair of retarders may each comprise a single A-plate.

Advantageously retarder cost may be reduced.

The at least one passive compensation retarder may comprise a retarder having an optical axis perpendicular to the plane of the retarder. The passive compensation retarder having an optical axis perpendicular to the plane of the retarders may comprise a negative C-plate.

Advantageously retarder thickness may be reduced.

The switchable liquid crystal retarder may further comprise at least one surface alignment layer disposed adjacent to the layer of liquid crystal material and arranged to provide homeotropic alignment in the adjacent liquid crystal material. The switchable liquid crystal retarder may comprise two surface alignment layers disposed adjacent to the layer liquid crystal material and on opposite sides thereof and arranged to provide homeotropic alignment in the adjacent liquid crystal material. The layer of liquid crystal material of the switchable retarder may comprise a liquid crystal material with a negative dielectric anisotropy.

Advantageously the liquid crystal retarder may have low power consumption in wide angle mode and the maximum power consumption of the display may be reduced.

The layer of liquid crystal material may have a retardance for light of a wavelength of 550 nm in a range from 500 nm to 1000 nm, preferably in a range from 600 nm to 900 nm and most preferably in a range from 700 nm to 850 nm. The at least one passive compensation retarder may comprise a retarder having its optical axis perpendicular to the plane of the retarder, the at least one passive retarder having a retardance for light of a wavelength of 550 nm in a range from −300 nm to −900 nm, preferably in a range from −450 nm to −800 nm and most preferably in a range from −500 nm to −725 nm; or the at least one passive compensation retarder comprises a pair of retarders which have optical axes in the plane of the retarders that are crossed, each retarder of the pair of retarders having a retardance for light of a wavelength of 550 nm in a range from 300 nm to 800 nm, preferably in a range from 500 nm to 700 nm and most preferably in a range from 550 nm to 675 nm.

Advantageously the off-axis field of view of luminance reduction may be maximised.

The switchable liquid crystal retarder may further comprise at least one surface alignment layer disposed adjacent to the layer of liquid crystal material and arranged to provide homogeneous alignment in the adjacent liquid crystal material. The switchable liquid crystal retarder may comprise two surface alignment layers disposed adjacent to the layer of liquid crystal material and on opposite sides thereof and arranged to provide homogeneous alignment in the adjacent liquid crystal material. The layer of liquid crystal material of the switchable liquid crystal retarder may comprise a liquid crystal material with a positive dielectric anisotropy.

The layer of liquid crystal material may have a retardance for light of a wavelength of 550 nm in a range from 500 nm to 1000 nm, preferably in a range from 600 nm to 850 nm and most preferably in a range from 700 nm to 800 nm. The at least one passive compensation retarder may comprise a retarder having its optical axis perpendicular to the plane of the retarder, the at least one passive retarder having a retardance for light of a wavelength of 550 nm in a range from −300 nm to −700 nm, preferably in a range from −350 nm to −600 nm and most preferably in a range from −400 nm to −500 nm; or the at least one passive compensation retarder may comprise a pair of retarders which have optical axes in the plane of the retarders that are crossed, each retarder of the pair of retarders having a retardance for light of a wavelength of 550 nm in a range from 300 nm to 800 nm, preferably in a range from 350 nm to 650 nm and most preferably in a range from 450 nm to 550 nm.

In comparison to switchable retarders comprising homeotropic alignment layers, increased resilience to the appearance of material flow when the liquid crystal retarder is pressed may be advantageously be provided.

The switchable liquid crystal retarder may comprise two surface alignment layers disposed adjacent to the layer of liquid crystal material and on opposite sides thereof, one of the surface alignment layers being arranged to provide homeotropic alignment in the adjacent liquid crystal material and the other of the surface alignment layers being arranged to provide homogeneous alignment in the adjacent liquid crystal material. The surface alignment layer arranged to provide homogeneous alignment may be between the layer of liquid crystal material and the compensation retarder; the layer of liquid crystal material may have a retardance for light of a wavelength of 550 nm in a range from 700 nm to 2000 nm, preferably in a range from 1000 nm to 1500 nm and most preferably in a range from 1200 nm to 1500 nm; and the at least one passive compensation retarder may comprise a retarder having its optical axis perpendicular to the plane of the retarder, the at least one passive retarder having a retardance for light of a wavelength of 550 nm in a range from −400 nm to −1800 nm, preferably in a range from −700 nm to −1500 nm and most preferably in a range from −900 nm to −1300 nm; or the at least one passive compensation retarder may comprise a pair of retarders which have optical axes in the plane of the retarders that are crossed, each retarder of the pair of retarders having a retardance for light of a wavelength of 550 nm in a range from 400 nm to 1800 nm, preferably in a range from 700 nm to 1500 nm and most preferably in a range from 900 nm to 1300 nm. The surface alignment layer arranged to provide homeotropic alignment may be between the layer of liquid crystal material and the compensation retarder; the layer of liquid crystal material may have a retardance for light of a wavelength of 550 nm in a range from 500 nm to 1800 nm, preferably in a range from 700 nm to 1500 nm and most preferably in a range from 900 nm to 1350 nm; and the at least one passive compensation retarder may comprise a retarder having its optical axis perpendicular to the plane of the retarder, the at least one passive retarder having a retardance for light of a wavelength of 550 nm in a range from −300 nm to −1600 nm, preferably in a range from −500 nm to −1300 nm and most preferably in a range from −700 nm to −1150 nm; or the at least one passive compensation retarder may comprise a pair of retarders which have optical axes in the plane of the retarders that are crossed, each retarder of the pair of retarders having a retardance for light of a wavelength of 550 nm in a range from 400 nm to 1600 nm, preferably in a range from 600 nm to 1400 nm and most preferably in a range from 800 nm to 1300 nm.

In comparison to switchable retarders comprising two homeotropic alignment layers, increased resilience to the appearance of material flow when the liquid crystal retarder is pressed may be advantageously be provided.

A display device may further comprise a further additional polariser arranged either on the input side of the input display polariser between the first-mentioned additional polariser and the backlight in the case that the first-mentioned additional polariser is arranged on the input side of the input display polariser, or on the output side of the first-mentioned additional polariser in the case that the first-mentioned additional polariser is arranged on the output side of the output display polariser; and at least one further retarder arranged between the further additional polariser and the first-mentioned additional polariser in the case that the first-mentioned additional polariser is arranged on the input side of the input display polariser or between the further additional polariser and the first-mentioned additional polariser in the case that the first-mentioned additional polariser is arranged on the output side of the output display polariser, wherein the at least one further retarder may comprise at least one passive compensation retarder. The first-mentioned additional polariser may be arranged on the input side of the input display polariser between the input display polariser and the backlight, and the display device may further comprise: a further additional polariser arranged on the output side of the output display polariser; and at least one further retarder arranged between the further additional polariser and the output display polariser. The at least one further retarder may comprise a further switchable liquid crystal retarder comprising a layer of liquid crystal material and electrodes on opposite sides of the layer of liquid crystal material, the layer of liquid crystal material being switchable between two orientation states by means of a voltage being applied across the electrodes. In the case that the first-mentioned or further additional polariser is arranged on the input side of the input display polariser, the first-mentioned additional polariser or further additional polariser may be a reflective polariser.

Advantageously visual security level in privacy mode of operation may be increased in comparison to embodiments without the further additional polariser and further switchable liquid crystal retarder. Improved visual security level may be achieved in environments with reduced ambient illuminance. Display luminance to the head-on user may be increased. Further high image visibility may be achieved in wide angle mode for off-axis users.

In the second device state the backlight may provide a luminance at lateral angles greater than 45 degrees, that may be at most 20%, preferably at most 15% and most preferably at most 10% of the luminance in a direction normal to the display surface. In the second device state for a display luminance in a direction normal to the display surface of 1 nit and Lambertian ambient illuminance of 1 lux, the visual security level at lateral angles greater than 45 degrees may be greater than 3.0, preferably greater than 4.0 and most preferably greater than 5.0. Advantageously desirable levels of visual security may be achieved.

In the first device state the backlight provides a luminance at lateral angles greater than 45 degrees that is greater than 20%, preferably greater than 25% and most preferably greater than 30% of the luminance in a direction normal to the display surface. In the first device state for a display luminance in a direction normal to the display surface of 1 nit and Lambertian ambient illuminance of 1 lux, the image visibility at lateral angles greater than 45 degrees may be greater than 0.85, preferably greater than 0.9 and most preferably greater than 0.95. Advantageously desirable levels of image visibility may be achieved.

Any of the aspects of the present disclosure may be applied in any combination.

Embodiments of the present disclosure may be used in a variety of optical systems. The embodiments may include or work with a variety of projectors, projection systems, optical components, displays, microdisplays, computer systems, processors, self-contained projector systems, visual and/or audio-visual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which.

DETAILED DESCRIPTION

Figure 1A:
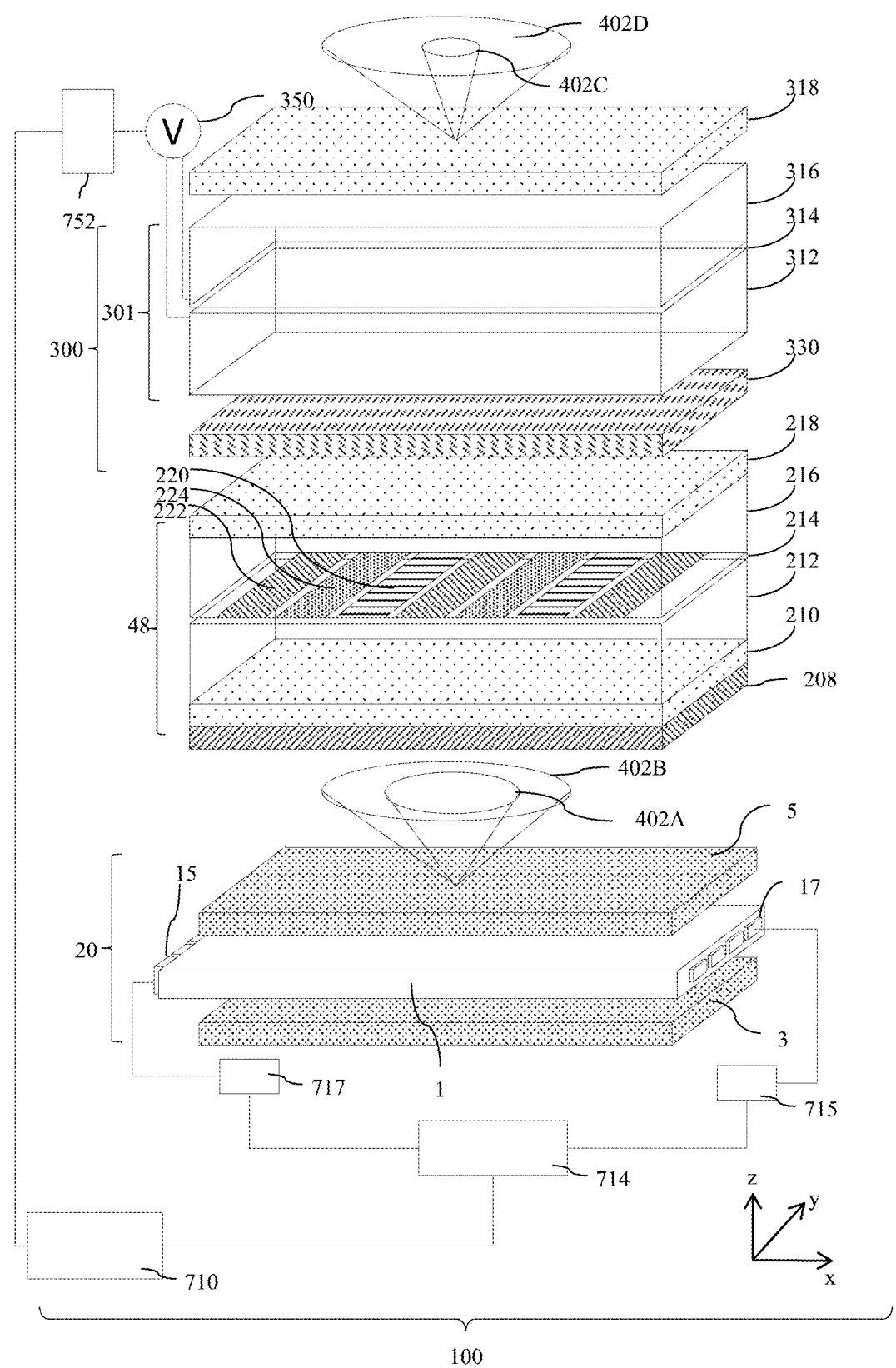
FIG. 1A is a schematic diagram illustrating in front perspective view a switchable directional display apparatus comprising a switchable directional backlight and a switchable liquid crystal retarder.

Terms related to optical retarders for the purposes of the present disclosure will now be described.

In a layer comprising a uniaxial birefringent material there is a direction governing the optical anisotropy whereas all directions perpendicular to it (or at a given angle to it) have equivalent birefringence.

The optical axis of an optical retarder refers to the direction of propagation of a light ray in the uniaxial birefringent material in which no birefringence is experienced. This is different from the optical axis of an optical system which may for example be parallel to a line of symmetry or normal to a display surface along which a principal ray propagates.

For light propagating in a direction orthogonal to the optical axis, the optical axis is the slow axis when linearly polarized light with an electric vector direction parallel to the slow axis travels at the slowest speed. The slow axis direction is the direction with the highest refractive index at the design wavelength. Similarly the fast axis direction is the direction with the lowest refractive index at the design wavelength.

For positive dielectric anisotropy uniaxial birefringent materials the slow axis direction is the extraordinary axis of the birefringent material. For negative dielectric anisotropy uniaxial birefringent materials the fast axis direction is the extraordinary axis of the birefringent material.

The terms half a wavelength and quarter a wavelength refer to the operation of a retarder for a design wavelength $\lambda_0$ that may typically be between 500 nm and 570 nm. In the present illustrative embodiments exemplary retardance values are provided for a wavelength of 550 nm unless otherwise specified.

The retarder provides a phase shift between two perpendicular polarization components of the light wave incident thereon and is characterized by the amount of relative phase, Γ, that it imparts on the two polarization components; which is related to the birefringence Δn and the thickness d of the retarder by $$\Gamma = 2\cdot\pi\cdot\Delta n\cdot d/\lambda_0 \qquad \text{eqn. 1}$$

In eqn. 1, Δn is defined as the difference between the extraordinary and the ordinary index of refraction, i.e.

$$\Delta n = n_e - n_o \qquad \text{eqn. 2}$$

For a half wave retarder, the relationship between d, Δn, and $\lambda_0$ is chosen so that the phase shift between polarization components is $\Gamma=\pi$. For a quarter wave retarder, the relationship between d, Δn, and $\lambda_0$ is chosen so that the phase shift between polarization components is $\Gamma=\pi/2$.

The term half wave retarder herein typically refers to light propagating normal to the retarder and normal to the spatial light modulator.

In the present disclosure an 'A-plate' refers to an optical retarder utilizing a layer of birefringent material with its optical axis parallel to the plane of the layer.

A 'positive A-plate' refers to positively birefringent A-plates, i.e. A-plates with a positive Δn.

In the present disclosure a 'C-plate' refers to an optical retarder utilizing a layer of birefringent material with its optical axis perpendicular to the plane of the layer. A 'positive C-plate' refers to positively birefringent C-plate, i.e. a C-plate with a positive Δn. A 'negative C-plate' refers to a negatively birefringent C-plate, i.e. a C-plate with a negative Δn.

'O-plate' refers to an optical retarder utilizing a layer of birefringent material with its optical axis having a component parallel to the plane of the layer and a component perpendicular to the plane of the layer. A 'positive O-plate' refers to positively birefringent O-plates, i.e. O-plates with a positive Δn.

Achromatic retarders may be provided wherein the material of the retarder is provided with a retardance Δn·d that varies with wavelength λ as $$\Delta n\cdot d/\lambda = \kappa \qquad \text{eqn. 3}$$

where κ is substantially a constant.

Examples of suitable materials include modified polycarbonates from Teijin Films. Achromatic retarders may be provided in the present embodiments to advantageously minimise color changes between polar angular viewing directions which have low luminance reduction and polar angular viewing directions which have increased luminance reductions as will be described below.

Various other terms used in the present disclosure related to retarders and to liquid crystals will now be described.

A liquid crystal cell has a retardance given by Δn·d where Δn is the birefringence of the liquid crystal material in the liquid crystal cell and d is the thickness of the liquid crystal cell, independent of the alignment of the liquid crystal material in the liquid crystal cell.

Homogeneous alignment refers to the alignment of liquid crystals in switchable liquid crystal displays where molecules align substantially parallel to a substrate. Homogeneous alignment is sometimes referred to as planar alignment. Homogeneous alignment may typically be provided with a small pre-tilt such as 2 degrees, so that the molecules at the surfaces of the alignment layers of the liquid crystal cell are slightly inclined as will be described below. Pretilt is arranged to minimise degeneracies in switching of cells.

In the present disclosure, homeotropic alignment is the state in which rod-like liquid crystalline molecules align substantially perpendicularly to the substrate. In discotic liquid crystals homeotropic alignment is defined as the state in which an axis of the column structure, which is formed by disc-like liquid crystalline molecules, aligns perpendicularly to a surface. In homeotropic alignment, pretilt is the tilt angle of the molecules that are close to the alignment layer and is typically close to 90 degrees and for example may be 88 degrees.

Liquid crystal molecules with positive dielectric anisotropy are switched from a homogeneous alignment (such as an A-plate retarder orientation) to a homeotropic alignment (such as a C-plate or O-plate retarder orientation) by means of an applied electric field.

Liquid crystal molecules with negative dielectric anisotropy are switched from a homeotropic alignment (such as a C-plate or O-plate retarder orientation) to a homogeneous alignment (such as an A-plate retarder orientation) by means of an applied electric field.

Rod-like molecules have a positive birefringence so that $n_e > n_o$ as described in equation 2. Discotic molecules have negative birefringence so that $n_e < n_o$.

Positive retarders such as A-plates, positive O-plates and positive C-plates may typically be provided by stretched films or rod-like liquid crystal molecules. Negative retarders such as negative C-plates may be provided by stretched films or discotic like liquid crystal molecules.

Parallel liquid crystal cell alignment refers to the alignment direction of homogeneous alignment layers being parallel or more typically antiparallel. In the case of pre-tilted homeotropic alignment, the alignment layers may have components that are substantially parallel or antiparallel. Hybrid aligned liquid crystal cells may have one homogeneous alignment layer and one homeotropic alignment layer. Twisted liquid crystal cells may be provided by alignment layers that do not have parallel alignment, for example oriented at 90 degrees to each other.

Transmissive spatial light modulators may further comprise retarders between the input display polariser and the output display polariser for example as disclosed in U.S. Pat. No. 8,237,876, which is herein incorporated by reference in its entirety. Such retarders (not shown) are in a different place to the passive retarders of the present embodiments. Such retarders compensate for contrast degradations for off-axis viewing locations, which is a different effect to the luminance reduction for off-axis viewing positions of the present embodiments.

A private mode of operation of a display is one in which an observer sees a low contrast sensitivity such that an image is not clearly visible. Contrast sensitivity is a measure of the ability to discern between luminances of different levels in a static image. Inverse contrast sensitivity may be used as a measure of visual security, in that a high visual security level (VSL) corresponds to low image visibility.

For a privacy display providing an image to an observer, visual security may be given as:

$$V = (V+R)/(Y-K) \qquad \text{eqn. 4}$$

where V is the visual security level (VSL), Y is the luminance of the white state of the display at a snooper viewing angle, K is the luminance of the black state of the display at the snooper viewing angle and R is the luminance of reflected light from the display.

Panel contrast ratio is given as:

$$C=Y/K \qquad \text{eqn. 5}$$

so the visual security level may be further given as:

$$V=(P \cdot L+I \cdot \rho/\pi)/(P \cdot (L-L/C)) \qquad \text{eqn. 6}$$

where off-axis relative luminance, P is typically defined as the percentage of head-on luminance, L at the snooper angle and the display may have image contrast ratio C and the surface reflectivity is $\rho$.

The off-axis relative luminance, P is sometimes referred to as the privacy level. However, such privacy level P describes relative luminance of a display at a given polar angle compared to head-on luminance, and is not a measure of privacy appearance.

The display may be illuminated by Lambertian ambient illuminance I. Thus in a perfectly dark environment, a high contrast display has VSL of approximately 1.0. As ambient illuminance increases, the perceived image contrast degrades, VSL increases and a private image is perceived.

For typical liquid crystal displays the panel contrast C is above 100:1 for almost all viewing angles, allowing the visual security level to be approximated to:

$$V=1+I \cdot \rho/(\pi \cdot P \cdot L) \qquad \text{eqn. 7}$$

In comparison to privacy displays, desirably wide angle displays are easily observed in standard ambient illuminance conditions. One measure of image visibility is given by the contrast sensitivity such as the Michelson contrast which is given by:

$$M=(I_{max}-I_{min})/(I_{max}+I_{min}) \qquad \text{eqn. 8}$$

and so:

$$M=((Y+R)-(K+R))/((Y+R)+(K+R))=(Y-K)/(Y+K+2 \cdot R) \qquad \text{eqn. 9}$$

Thus the visual security level (VSL), V is equivalent (but not identical to) 1/M. In the present discussion, for a given off-axis relative luminance, P the wide angle image visibility, W is approximated as $$W=1/V=1/(1+I \cdot \rho/(\pi \cdot P \cdot L)) \qquad \text{eqn. 10}$$

A switchable directional display that may be used as a privacy display or for other stray light reduction purposes such as night safety display will now be described.

FIG. 1A is a schematic diagram illustrating in front perspective view a switchable directional display apparatus comprising a switchable directional backlight 20 and a switchable liquid crystal retarder 300.

A display device 100 comprises a backlight 20 arranged to output light, the backlight 20 comprising a directional waveguide 1; and plural light sources 15, 17 arranged to input light into the waveguide 1, the waveguide 1 being arranged to direct light from different light sources 15, 17 into different solid angular extents 402A, 402B as the output light 400.

In the present disclosure a solid angular extent is the solid angle of a light cone within which the luminance is greater than a given relative luminance to the peak luminance. For example the luminance roll-off may be to a 50% relative luminance so that the solid angular extent has an angular width in a given direction (such as the lateral direction) that is the same as the full-width half maximum (FWHM).

A transmissive spatial light modulator 48 arranged to receive the output light from the backlight; an input polariser 210 arranged on the input side of the spatial light modulator between the backlight 20 and the spatial light modulator 48; an output polariser 218 arranged on the output side of the spatial light modulator 48; an additional polariser 318 arranged on the output side of the output polariser 218; and a switchable liquid crystal retarder 300 comprising a layer 314 of liquid crystal material arranged between the at least one additional polariser 318 and the output polariser 318 in this case in which the additional polariser 318 is arranged on the output side of the output polariser 218; and a control system 710 arranged to synchronously control the light sources 15, 17 and the at least one switchable liquid crystal retarder 300.

In the present disclosure, the spatial light modulator 48 may comprise a liquid crystal display comprising substrates 212, 216, and liquid crystal layer 214 having red, green and blue pixels 220, 222, 224. The spatial light modulator 48 has an input display polariser 210 and an output display polariser 218 on opposite sides thereof. The output display polariser 218 is arranged to provide high extinction ratio for light from the pixels 220, 222, 224 of the spatial light modulator 48. Typical polarisers 210, 218 may be absorbing polarisers such as dichroic polarisers.

Optionally a reflective polariser 208 may be provided between the dichroic input display polariser 210 and backlight 210 to provide recirculated light and increase display efficiency. Advantageously efficiency may be increased.

Backlight 20 may comprise input light sources 15, 17, waveguide 1, rear reflector 3 and optical stack 5 comprising diffusers, light turning films and other known optical backlight structures. Asymmetric diffusers, that may comprise asymmetric surface relief features for example, may be provided in the optical stack 5 with increased diffusion in the elevation direction in comparison to the lateral direction may be provided. Advantageously image uniformity may be increased.

In the present embodiments, the backlight 20 may be arranged in a first mode of operation to provide an angular light solid angular extent 402A that has reduced luminance for off-axis viewing positions in comparison to head-on luminance. Further the backlight 20 may be arranged to provide an angular light solid angular extent 402B that has high luminance at off-axis viewing positions than for the solid angular extent 402A.

The solid angular extent 402A of illumination may be provided for a privacy or other low stray light mode of operation, whereas the solid angular extent 402B of illumination may be provided for a wide angle mode of operation.

Control system 710 comprises control of illumination controller 714 that is arranged to provide control of light source driver 717 and light source driver 717, in order to achieve control of light sources 15, 17 respectively. Control system 710 further comprises control of voltage controller 752 that is arranged to provide control of voltage driver 350, in order to achieve control of switchable liquid crystal retarder 301.

The control system is arranged: in a first device state, to operate light sources to selectively operate a first set 17 of the light sources, the output light from which is directed into a first output solid angular extent 402B, and to switch the switchable liquid crystal retarder 301 into a first retarder state in which no phase shift is introduced to light passing therethrough; and in a second device state, to operate light sources to selectively operate a second set 15 of the light sources, the output light from which has a second output solid angular extent 402A that is narrower than the first output solid angular extent, and as will be described below to switch the switchable liquid crystal retarder 301 into a second retarder state in which a phase shift is introduced to polarisation components of light passing therethrough along an axis inclined to a normal to the plane of the switchable liquid crystal retarder 301.

As will be described below, off-axis luminance in privacy mode of operation may be too great by control of backlight 20 to solid angular extent 402A alone in order to provide an effective privacy display. Switchable liquid crystal retarder 300 as will be described below may be arranged in a privacy mode of operation to provide an output solid angular extent 402C that is less than the solid angular extent 402A provided by the backlight 20.

By way of comparison, solid angular extent 402D may be substantially the same as solid angular extent 402B in a wide angle mode of operation. Such control of output solid angular extents 402C, 402D may be achieved by synchronous control of the sets 15, 17 of light sources and the at least one switchable liquid crystal retarder 300.

Advantageously a privacy mode or low stray light mode of operation may be achieved with low image visibility for off-axis viewing and a large solid angular extent may be provided with high efficiency for a wide angle mode of operation, for sharing display imagery between multiple users and increasing image spatial uniformity.

Additional polariser 318 is arranged on the same output side of the spatial light modulator 48 as the display output polariser 218 which may be an absorbing dichroic polariser. The display polariser 218 and the additional polariser 318 have electric vector transmission directions 219, 319 that are parallel. As will be described below, such parallel alignment provides high transmission for central viewing locations.

The desirable visibility of images in wide angle mode for an off-axis viewer will now be further described.

Figure 1B:
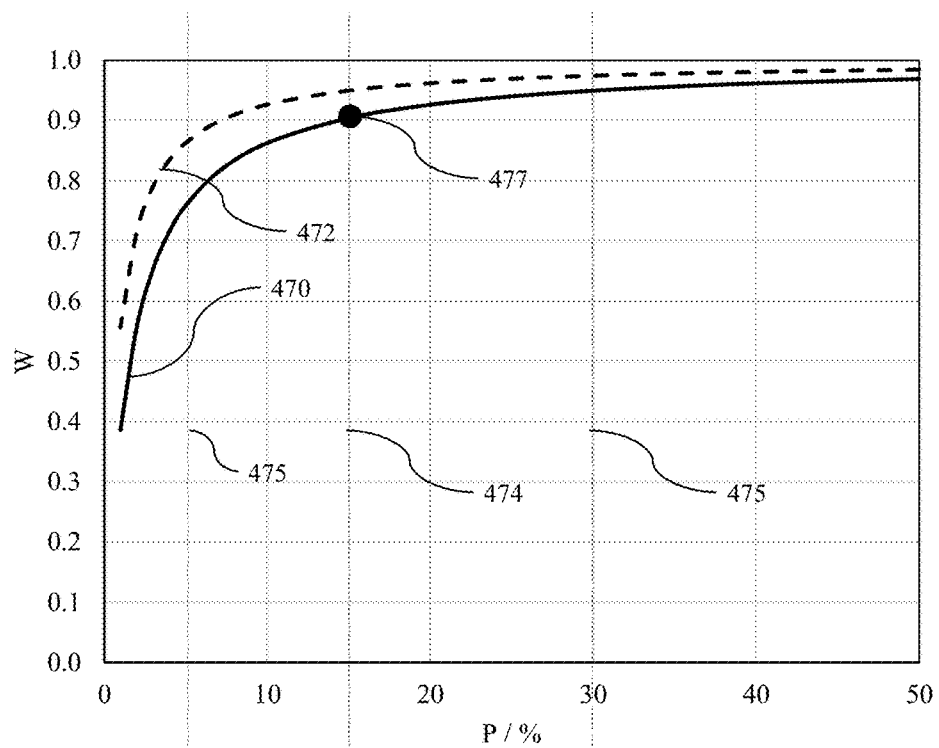
FIG. 1B is a schematic graph illustrating variation of image visibility with off-axis relative luminance of a switchable privacy display operating in wide angle mode.
Figure 1C:
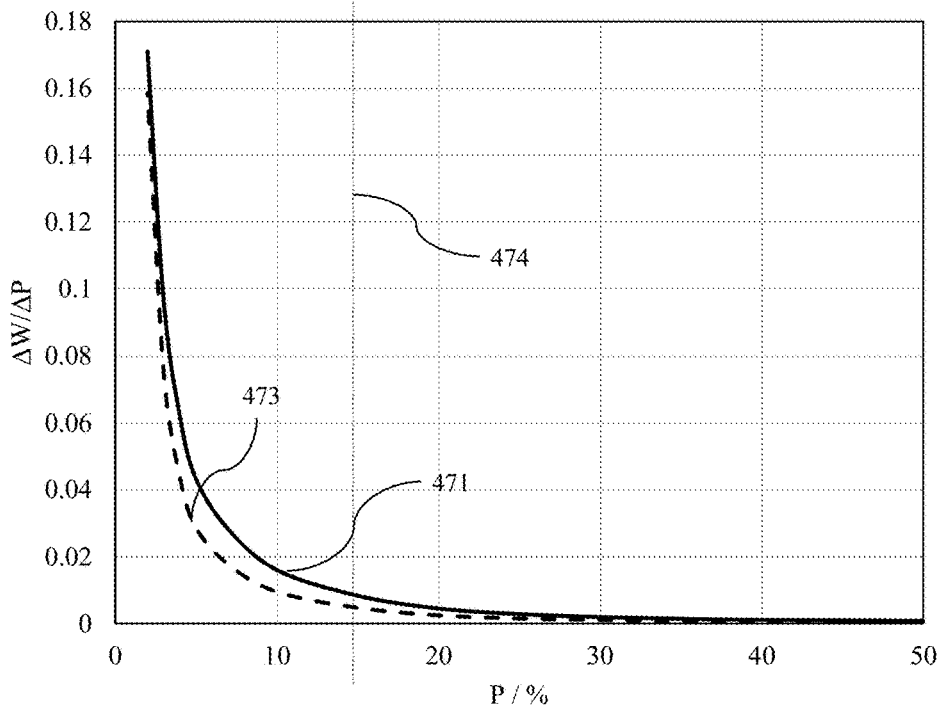
FIG. 1C is a schematic graph illustrating variation of rate of change of image visibility with off-axis relative luminance of a switchable privacy display operating in wide angle mode.

FIG. 1B is a schematic graph illustrating variation of image visibility, W with off-axis relative luminance P of a switchable privacy display operating in wide angle mode for two different ratios of head-on luminance to illuminance ratios respectively; and FIG. 1C is a schematic graph illustrating variations of rate of change of image visibility with off-axis relative luminance, P of a switchable privacy display operating in wide angle mode, for a display reflectivity ρ of 5%.

Profile 470 illustrates the variation of image visibility W with off-axis relative luminance, P for a ratio of 1 nit head-on luminance per 1 lux of ambient Lambertian illuminance (for example a 100 nit head-on luminance display illuminated by 100 lux) and profile 472 illustrates the variation of W with P for 2 nit head-on luminance per 1 lux of ambient Lambertian illuminance (for example a 200 nit head-on luminance display illuminated by 100 lux).

Noticeably the profiles have substantial non-linearities, and this is made clearer by the rate of change profiles 471, 473. For desirable wide angle image visibility, a value of W of greater than 0.85, preferably greater than 0.9 and most preferably greater than 0.95 is desirable for an easily observed image. Displays that desirably achieve high image contrast have contrast sensitivities of greater than 90% and preferably greater than 95%.

Thus for typical wide angle displays operating in ambient illumination, it is desirable to provide an off-axis luminance such that the image visibility is slowly varying and above a desirable image visibility such as illustrated by line 474 at which a 1 nit/lux display condition provides an image visibility of 0.9. Preferably a switchable privacy display achieves an off-axis relative luminance for an off-axis viewer (for example at a lateral viewing angle of 45 degrees) of greater than 15% and most preferably an off-axis relative luminance, P of greater than 30% as illustrated by line 475 for an image visibility W of greater than 0.95. As illustrated by line 472, increasing display luminance to 2 nits/lux provides increased image visibility W, as would be expected.

The desirable visibility of images in privacy mode for an off-axis snooper will now be further described.

Figure 1D:
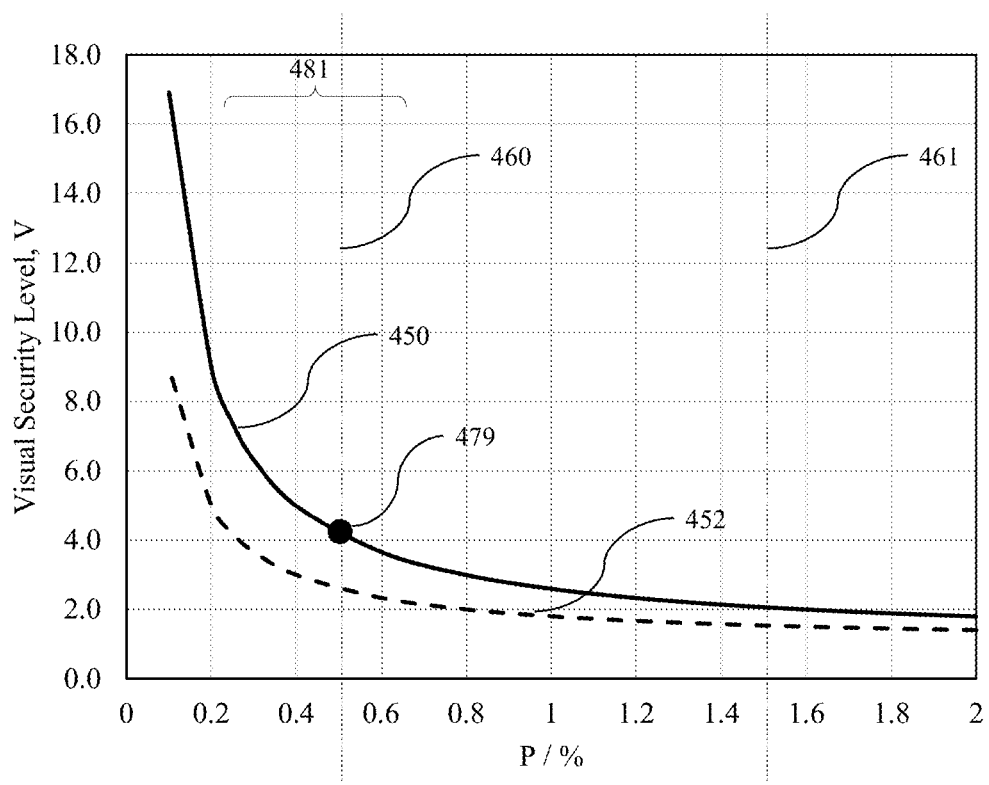
FIG. 1D is a schematic graph illustrating variation of Visual Security Level with off-axis relative luminance of a switchable privacy display operating in wide angle mode.
Figure 1E:
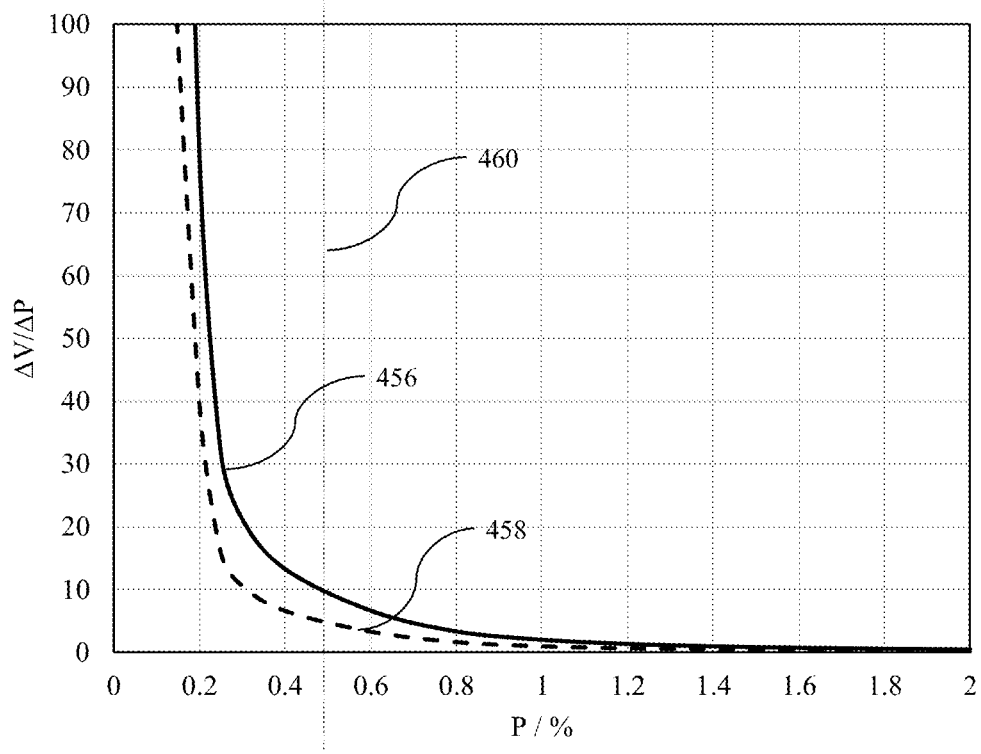
FIG. 1E is a schematic graph illustrating variation of rate of change of Visual Security Level with off-axis relative luminance of a switchable privacy display operating in wide angle mode.

FIG. 1D is a schematic graph illustrating variation of Visual Security Level, V with off-axis relative luminance, P of a switchable privacy display in privacy mode for two different ratios of head-on luminance to illuminance for a display with reflectivity at a snooper angle of 45 degrees; and FIG. 1E is a schematic graph illustrating variations 456, 454 of rate of change of Visual Security Level with off-axis relative luminance of a privacy display for the same two different ratios of head-on luminance to illuminance ratios respectively, for a display reflectivity ρ of 5%.

The profile 450 of visual security level, V against off-axis relative luminance, P for a ratio of 1 nit head-on luminance per 1 lux of ambient Lambertian illuminance (for example a 100 nit head-on luminance display illuminated by a 100 lux ambient illuminance) and profile illustrates the VSL profile 452 for 2 nit head-on luminance per 1 lux of ambient Lambertian illuminance (for example a 200 nit head-on luminance display illuminated by a 100 lux ambient illuminance).

Such profiles 450, 452, 456, 458 are highly non-linear with respect to the base off-axis relative luminance P and illustrate that there is a switch point in behavior of privacy displays at off-axis relative luminances of approximately 0.5% of head-on luminance in such illuminance environments as illustrated by line 460.

At greater off-axis relative luminances (>0.5%), changes of off-axis relative luminance have a small effect on VSL, V while at lower off-axis relative luminances (<=0.5%), changes of off-axis relative luminance have significant level on VSL, V. Unexpectedly, privacy display desirably provides a threshold level of image off-axis relative luminance for a given surface reflectivity, ρ. The switch point also appears to be somewhat independent of typical display viewing conditions.

To summarise desirably a switchable privacy display provides off-axis relative luminances of <0.5% in privacy mode and >15% in wide angle mode to achieve desired functionality. Such display requires switching of greater than 30:1 in control of off-axis luminance between the two modes of operation, and over relatively wide polar viewing regions.

Typical angular luminance profiles from wide angle and collimated backlights will now be described.

Figure 1F:
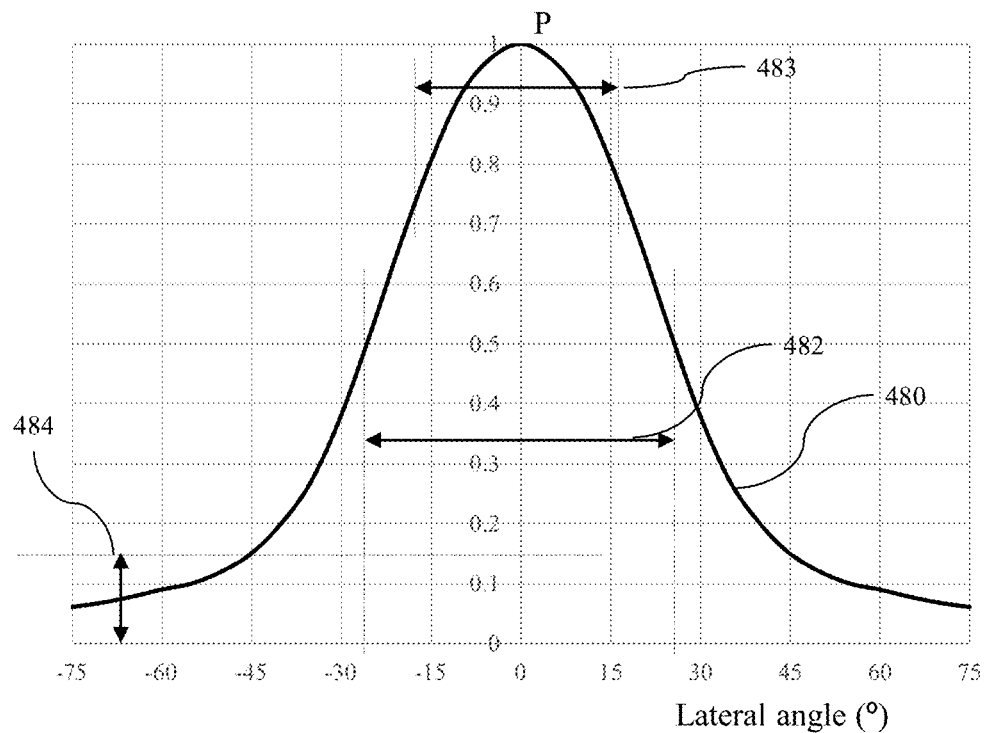
FIG. 1F is a schematic graph illustrating variation of output luminance with viewing angle for a typical wide angle backlight arranged to provide high image visibility to a wide range of display viewers.
Figure 1G:
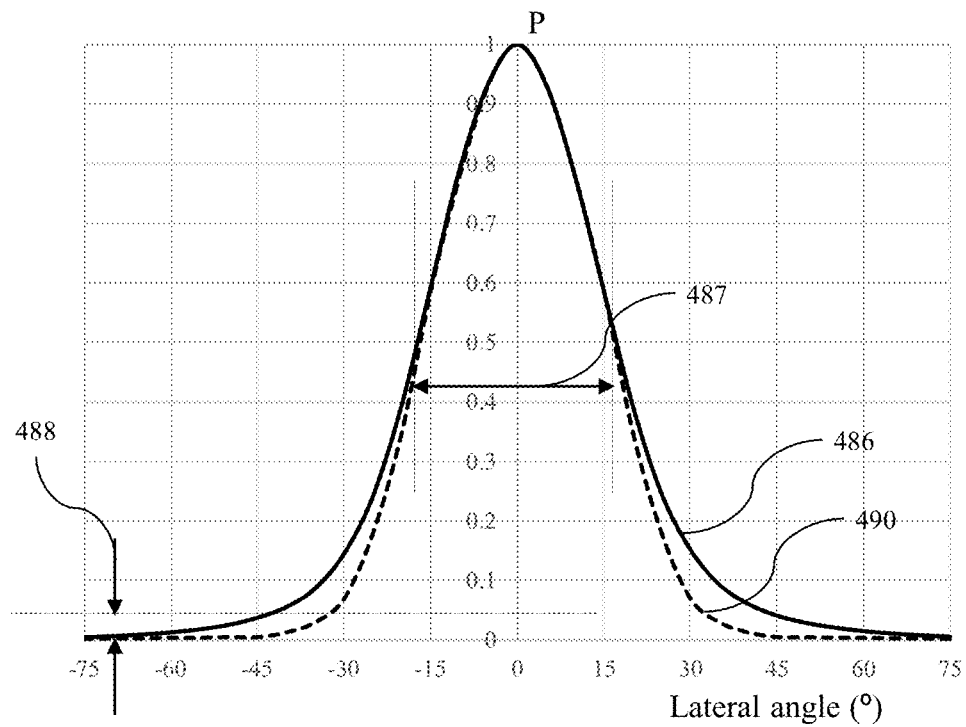
FIG. 1G is a schematic graph illustrating variation of output luminance with viewing angle for a typical collimated backlight arranged to cooperate with a switchable retarder to provide high visual security level to a wide range of snooper locations.

FIG. 1F is a schematic graph illustrating variation of output luminance with viewing angle for a typical wide angle backlight arranged to provide high image visibility to a wide range of display viewers; and FIG. 1G is a schematic graph illustrating variation of output luminance with viewing angle for a typical collimated backlight arranged to cooperate with a switchable retarder to provide high visual security level to a wide range of snooper locations. The operation and structure of examples of such backlights 20 as illustrated in FIG. 1A will be described further below.

FIG. 1F illustrates a desirable wide angle luminance angular extent with profile 480 against lateral viewing angle, with a full width half maximum (FWHM) 482 of 50 degrees. Such a profile may be achieved with the switchable backlight 20 of the present embodiments operated in wide angle mode and with switchable liquid crystal retarder 300 operated in wide angle mode.

For an off-axis viewer at 45 degrees, an off-axis relative luminance 484 of 15% is provided. As illustrated in FIG. 1B, for an ambient illumination of the display of 1 nit/lux, image visibility W of 0.9 is provided by such a backlight 20, advantageously achieving comfortable image viewing. Further for a 300 mm wide display viewed from 500 mm, the lateral uniformity represented by angular extent 483 is provided, and achieving an image uniformity of 75% across the display width from the backlight. Diffusers and other optical films may further increase the illumination width from the display 100 when illuminated by such a backlight 20, to increase image visibility for off-axis viewers and image uniformity for the head-on user.

FIG. 1G illustrates a desirable luminance profile 486 of a switchable backlight 20 of the present embodiments operated in privacy mode for use with the switchable liquid crystal retarder 300 of FIG. 1A in privacy mode.

The profile 486 is modified by switchable liquid crystal retarder 300 to provide a profile 490 that advantageously achieves an off-axis relative luminance of less than 0.5% at 45 degrees lateral angle as will be described further hereinbelow. Thus the arrangement of FIG. 1A may achieve a visual security level, V of greater than 4.0 in a 1 nit/lux ambient environment and display setting, illustrated by line 460 in FIG. 1D. Visual security level point 479 for display operation may be at or near the turning region 481 of the VSL profile, where the turning region 481 is the range of off-axis relative luminance, P for which the profile 450 undergoes an inflection.

By way of comparison with the present disclosure, a privacy display comprising a fixed backlight with the backlight profile 480 of FIG. 1F and switchable liquid crystal retarder 300 may achieve desirable wide angle image visibility but an off-axis relative luminance of 1.5% and VSL, V of approximately 2.0 for 1 nit/lux. Such a VSL provides undesirable image visibility to an off-axis snooper. Privacy performance can be increased by reduction of nits/lux, however undesirably such a display setting may provide low head-on luminance and reduced image visibility for the primary user.

By further way of comparison with the present disclosure, in a privacy display with the backlight profile 486 and no switchable liquid crystal retarder 300 or switchable liquid crystal retarder 300 set in wide angle mode would provide an undesirable image visibility, W at 1 nit/lux of approximately 0.75 as illustrated by line 475 in FIG. 1B. In order to achieve W>0.85, off-axis luminance is increased to >2 nits/lux which can provide uncomfortable luminance levels for the head-on user due the large difference between off-axis and off-axis luminance in such a display. Further such a backlight typically has a FWHM of approximately 40 degrees and an image uniformity of approximately 50%. It would be desirable to increase display uniformity and variation of display luminance with primary user viewing position.

Advantageously as will be described below the embodiments of the present disclosure achieve (i) desirable visual security level, V to an off-axis snooper in privacy mode (ii) desirable image visibility, W to an off-axis viewer in wide angle mode (iii) increased uniformity in wide angle mode to the head-on user and (iv) comfortable viewing luminance and image visibility to the primary user. Such advantages are achieved by providing switchable backlight 20 and switchable liquid crystal retarder 300 such that the display 100 may be controlled to operate (i) at or above the desirable visual security level point 479 in privacy mode or (ii) at or above the desirable image visibility turning point 477 in wide angle mode for a given nits/lux ratio.

A switchable privacy display comprising backlight 20 comprising an imaging waveguide 1 will now be described.

Figure 2A:
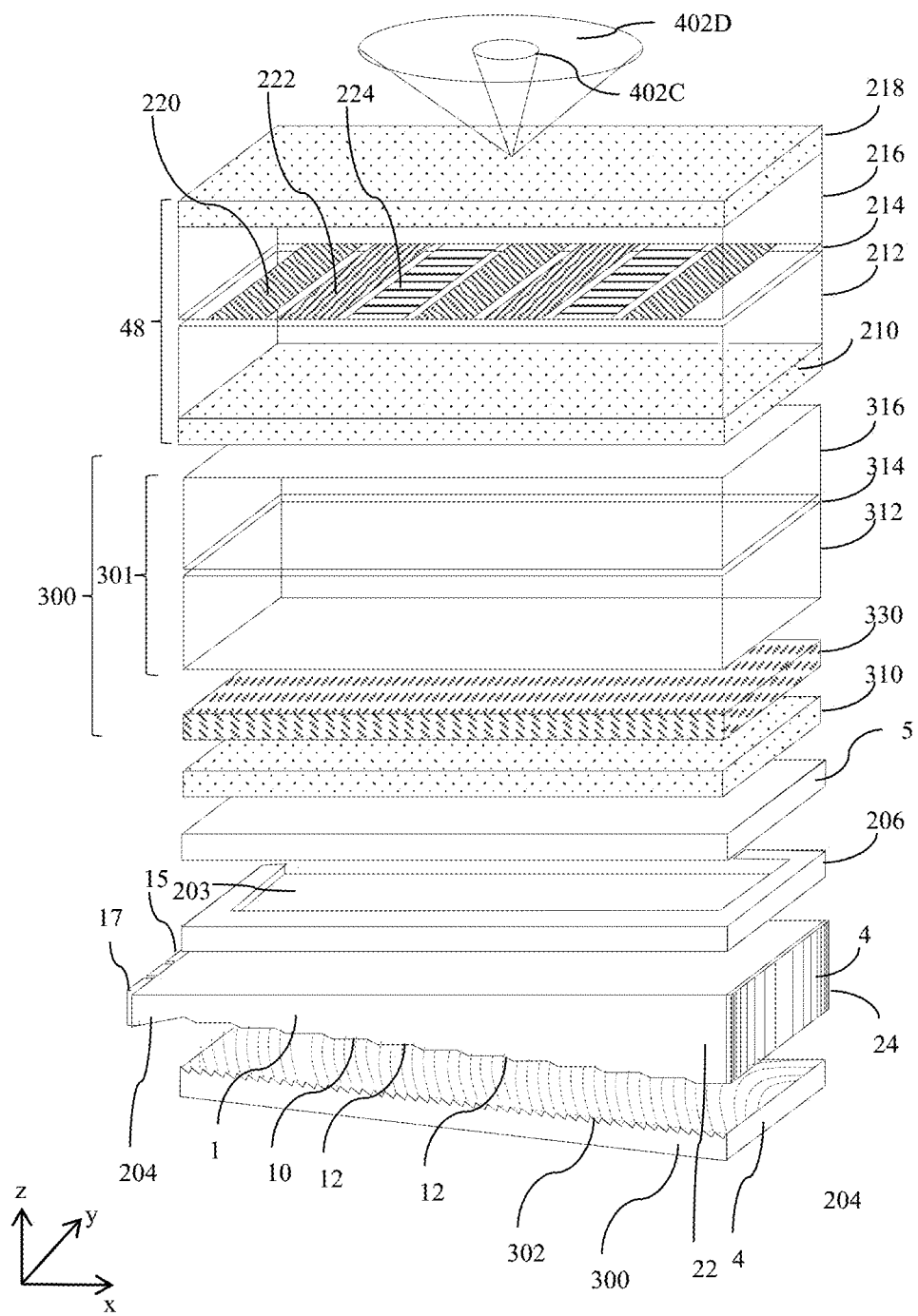
FIG. 2A is a schematic diagram illustrating in front perspective view a switchable directional display apparatus comprising an imaging waveguide and switchable liquid crystal retarder.
Figure 2B:
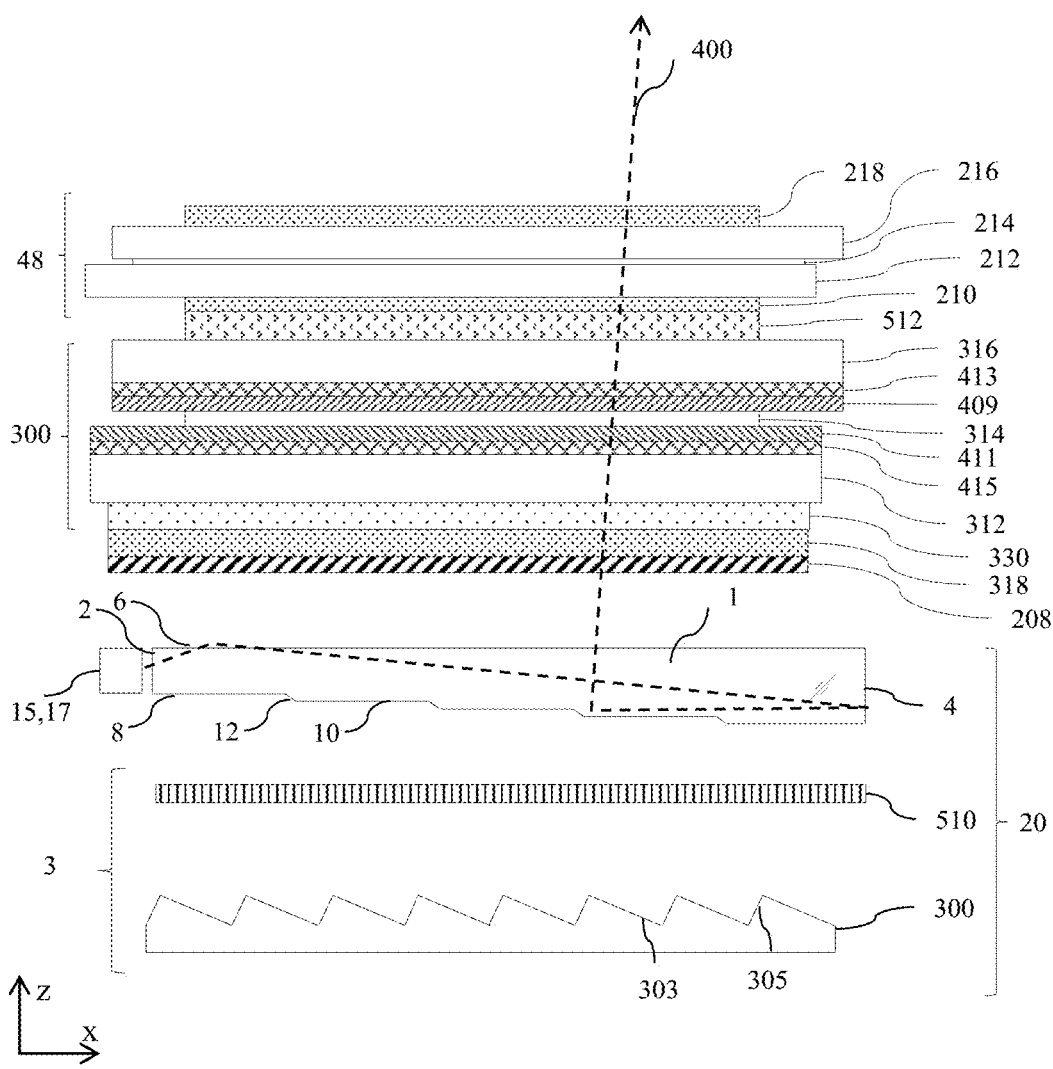
FIG. 2B is a schematic diagram illustrating a side view of a switchable directional display apparatus comprising an imaging waveguide and switchable liquid crystal retarder.

FIG. 2A is a schematic diagram illustrating in front perspective view a switchable directional display 100 comprising an imaging waveguide 1; and FIG. 2B is a schematic diagram illustrating a side view of a switchable directional display apparatus 100 comprising an imaging waveguide 1 and switchable liquid crystal retarder 300.

In comparison to FIG. 1A, the switchable liquid crystal retarder 300 comprises an additional polariser 318 arranged between the backlight 20 and input polariser 210 of the spatial light modulator 48. Further the first and second sets 15, 17 of light sources are arranged on the same input side of the waveguide 1.

The directional waveguide 1 comprises: a light input surface 2 extending in a lateral direction along an end of the waveguide 1, the sets 15, 17 of light sources being disposed along the light input surface 2; and opposed first and second light guiding surfaces 6, 8 extending across the waveguide 1 from light input surface 2 for guiding the input light along the waveguide 1 by total internal reflection, the waveguide being arranged to deflect input light 400 guided through the waveguide to exit through the first guide surface 6.

The propagation of output light rays 400 will now be further described.

Figure 3A:
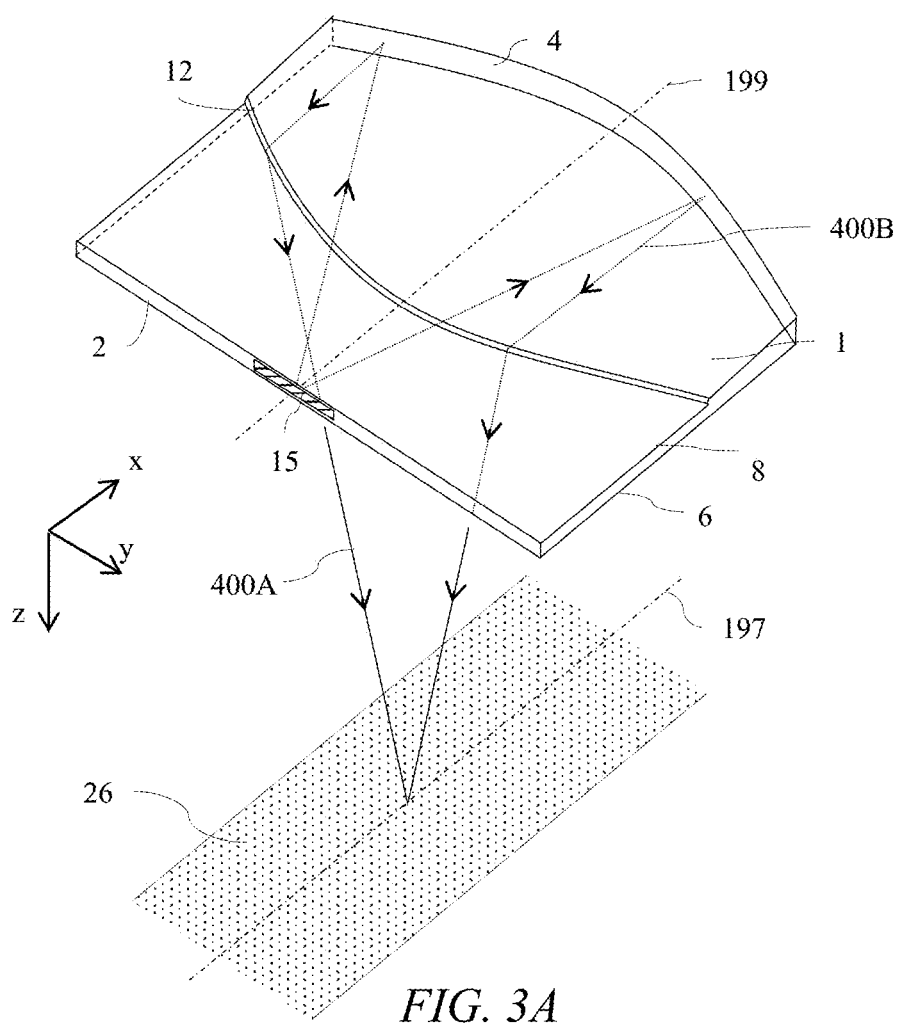
FIG. 3A is a schematic diagram illustrating in rear perspective view operation of an imaging waveguide in a narrow angle mode of operation.

FIG. 3A is a schematic diagram illustrating in rear perspective view operation of an imaging waveguide 1 in a narrow angle mode of operation and formation of an off-axis optical window 26. Light rays 400A, 400B provided by input set 15 of light sources are directed to reflective end 4, and directed within the waveguide 1 to extraction feature 12 by means of total internal reflection within the waveguide 1. The waveguide 1 comprises a light input surface 2 extending along a first end of the directional waveguide 1, and a reflective end 4 extending along a second end of the directional waveguide 1 opposite to the first end 2 for reflecting the input light back along the waveguide 1, the reflective end 4 having positive optical power in the lateral direction. The second guide surface 8 comprises light extraction features 12 and intermediate regions 10 between the light extraction features 12, the light extraction features 12 being oriented to deflect the reflected input light 400A, 400B through the first guide surface 6 as output light and the intermediate regions 10 being arranged to direct light through the waveguide 1 without extracting it.

Imaging waveguides and optical systems incorporating imaging waveguides are described in U.S. Pat. No. 9,519,153 and in U.S. Pat. No. 10,054,732, both of which are herein incorporated by reference in their entireties.

As illustrated in FIG. 3A, the light extraction features may have positive optical power in the lateral direction, such optical power cooperates with the optical power of the curved reflective end 4 to provide imaging of the set 15 of light sources.

After reflection rays 400A, 400B is directed in the z-direction to optical window 26 in the window plane 106. Optical window 26 is an image in the lateral direction (y-axis) of the set 15 of light sources.

The second guide surface 8 is thus arranged to deflect the reflected input light 400A, 400B through the first guide 6 surface as output light, and the waveguide 1 is arranged to image the set 15 of light sources in the lateral direction so that the output light from the light sources is directed into respective optical windows 26 in output directions that are distributed in dependence on input positions of the light sources of the set 15 of light sources.

Advantageously imaging waveguides have demonstrated off-axis relative luminance, P at lateral angles of 45 degrees of less than 1.5%. In the present embodiments, such waveguides can achieve off-axis luminance in privacy mode of less than 0.1% when the liquid crystal retarder is appropriately driven. Very high levels of visual image security, V can be achieved, including V>20. Such displays have improved performance in low illuminance environments when >1 nits/lux display setting may be desirable.

Figure 3B:
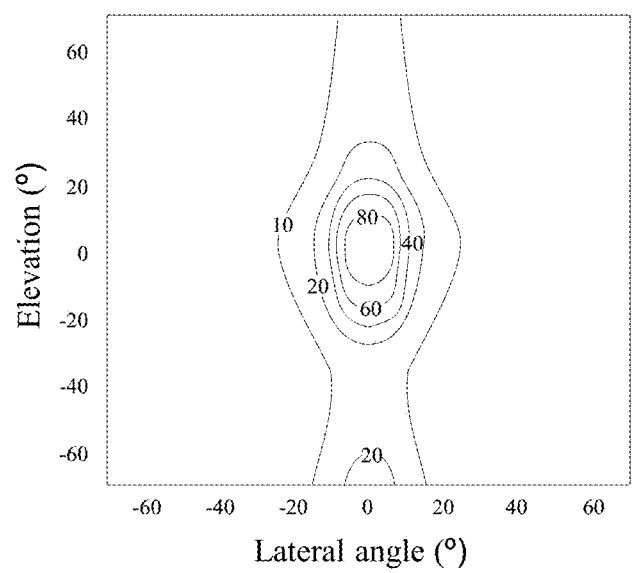
FIG. 3B is a schematic graph illustrating field-of-view luminance plot of the output of FIG. 3A when used in a display apparatus with no switchable liquid crystal retarder.

FIG. 3B is a schematic graph illustrating field-of-view luminance plot of the output of FIG. 3A when used in a display apparatus with no switchable liquid crystal retarder, where luminance contour lines are illustrated.

Thus imaging may be substantially provided in the lateral direction. In the elevation direction, some restriction of viewing angle may be provided by the propagation of Lambertian input illumination in the waveguide and by the light reflected from the facets 303, 305 of the rear reflector 300 illustrated in FIG. 2B that is transmitted by the features 12.

Advantageously relatively low levels of off-axis luminance may be achieved for off-axis viewing systems, because of the imaging of the waveguide. For example less than 5% of head-on luminance at a lateral angle of 45 degrees and elevation of 0 degrees may be provided.

Such a waveguide has a thickness that is limited by the height of the light sources and efficiency determined by the relative height of the reflective end 4 and input end 2. It would be desirable to provide reduced thickness.

Figure 4:
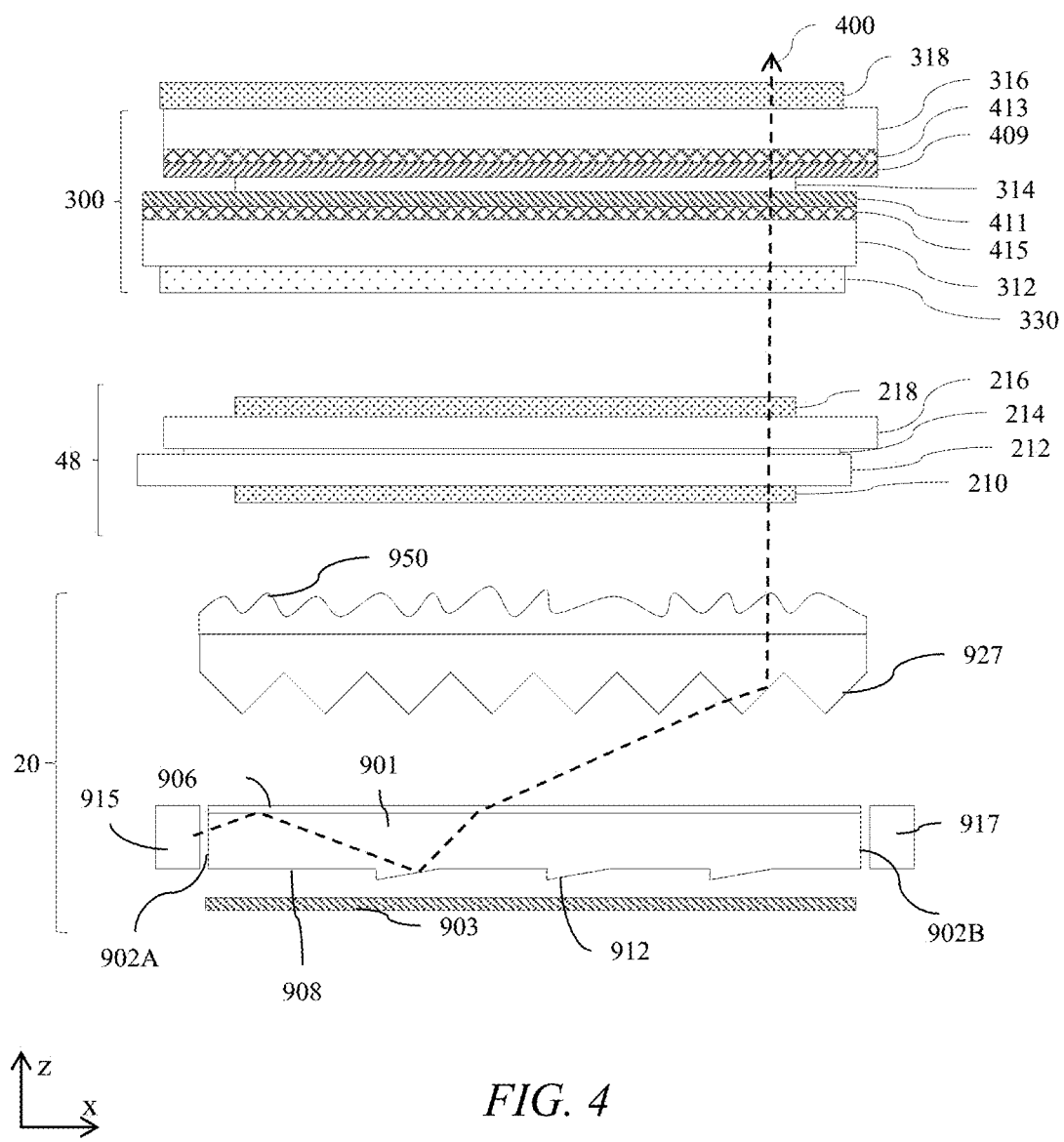
FIG. 4 is a schematic diagram illustrating a side view of a switchable directional display apparatus comprising a switchable collimating waveguide and a switchable liquid crystal retarder operating in a privacy mode of operation.

FIG. 4 is a schematic diagram illustrating a side view of a switchable directional display apparatus comprising a switchable collimating waveguide 901 and a switchable liquid crystal retarder 300 operating in a privacy mode of operation.

The directional waveguide 901 comprises: first and second light input surfaces 902A, 902B extending in a lateral direction along opposing ends of the waveguide 901, the sets 915, 917 of light sources being disposed along each respective light input surface 902A, 902B; and opposed first and second light guiding surfaces 906, 908 extending across the waveguide 901 from light input surface 902A for guiding the input light 400 along the waveguide 901 by total internal reflection, the waveguide being arranged to deflect input light guided through the waveguide to exit through the first guide surface 906.

The at least one light input surface comprises a first input surface 902A extending along a first end of the waveguide 901 and a second input surface 902B extending along a second light input end of the waveguide 901 wherein the second light input end faces the first light input end.

Reflector 903 may be arranged to deflect light that is scattered to the rear of the backlight 20 to increase efficiency. Output light rays 400 are output from the waveguide and are further deflected by turning film 927 and may be diffused by surface 950 arranged on or near the output of the turning film 927.

Figure 5A:
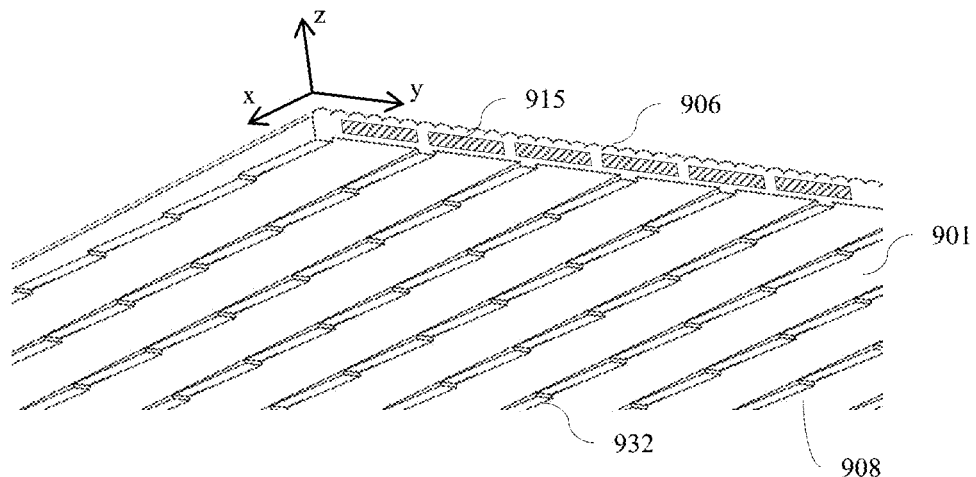
FIG. 5A, FIG. 5B, and FIG. 5C are schematic diagrams illustrating in various perspective views a collimating waveguide.
Figure 5B:
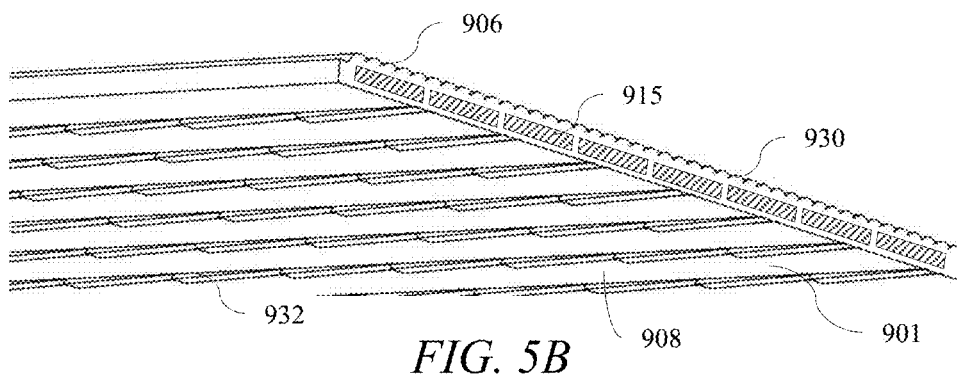
Figure 5C:
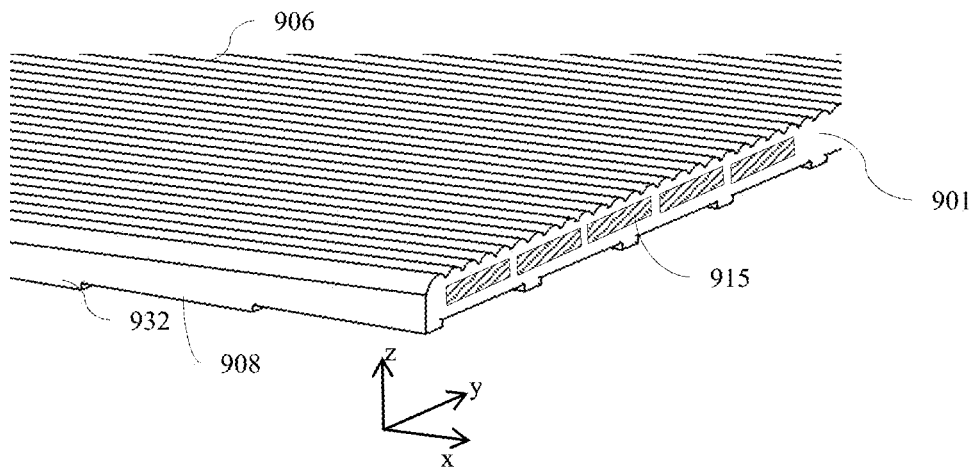
Figure 6A:
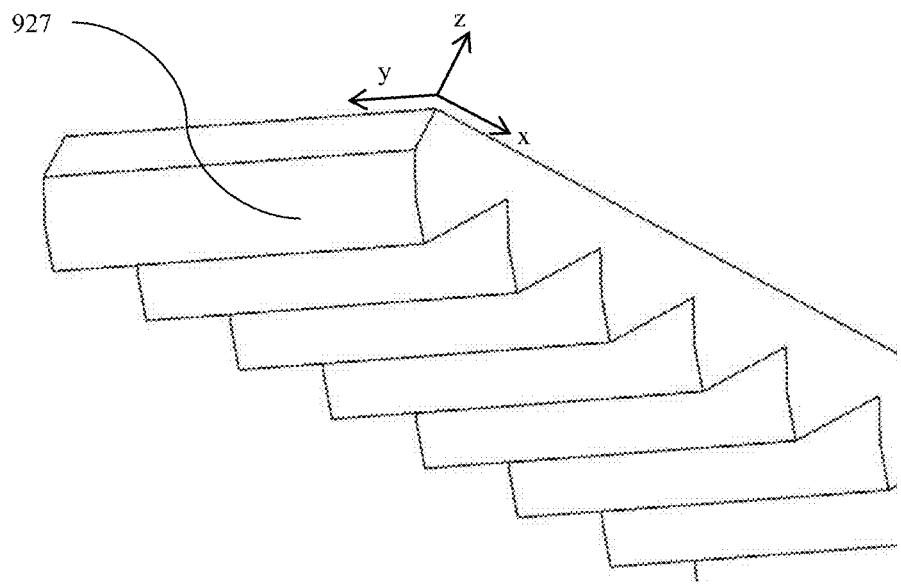
FIG. 6A and FIG. 6B are schematic diagrams illustrating in various perspective views a light turning film.
Figure 6B:
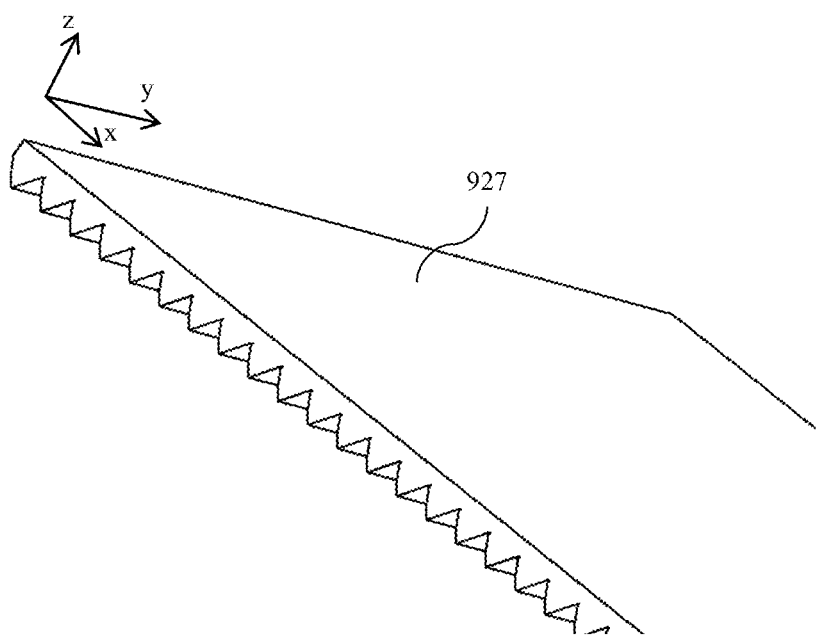

FIGS. 5A-5C are schematic diagrams illustrating in various perspective views the collimating waveguide 901; and FIGS. 6A-6B are schematic diagrams illustrating in various perspective views a light turning film 927 comprising an array of elongate prismatic elements.

The structure and operation of the collimating waveguide 901 will now be further described.

The first light guiding surface 906 of the waveguide 901 comprises: a plurality of non-inclined light extraction features 930 arranged in an array, each non-inclined light extraction feature being elongate, extending in a longitudinal direction perpendicular to the lateral direction, and having surface normal directions that vary in a plane orthogonal to the longitudinal direction and that have no component of tilt in the longitudinal direction;

The second light guiding surface 908 comprises: a plurality of inclined light extraction features 932 arranged in an array, each inclined light extraction feature 932 having a surface normal direction with a tilt that has a component in the longitudinal direction.

The plurality of non-inclined light extraction features 930 and the plurality of inclined light extraction features 932 are oriented to direct guided light 180 through the first and second light guiding surfaces 906, 908 as output light.

The operation of the light extraction features 930, 932 will now be described further for light input from the first input end 2.

Figure 7A:
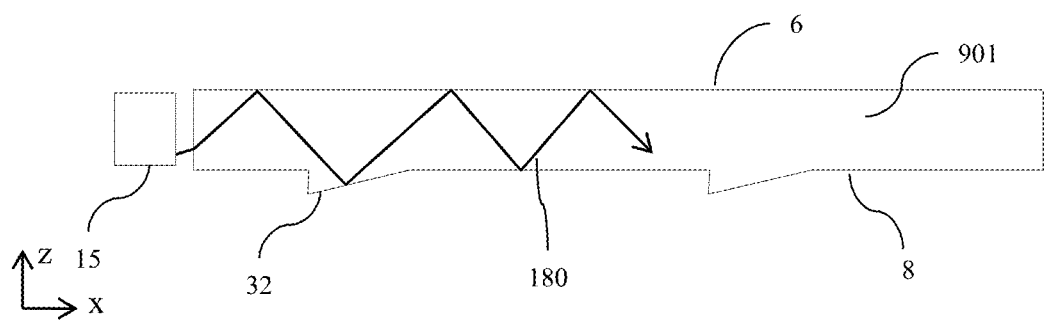
FIG. 7A is a schematic diagram illustrating in side view operation of a first inclined planar region of a collimating waveguide comprising a planar non-inclined region for on-axis illumination.

FIG. 7A is a schematic diagram illustrating in side view operation of a first inclined planar region 32 of an optical waveguide 1 for on-axis illumination. Light ray 180 propagates by guiding between surfaces 6 and 8. Light ray 180 has angle of incidence at surface 6, 8 gradually reduced by the tapering of the features 32. Light rays that are at smaller angles of incidence than the critical angle in the material of the optical waveguide 1 are extracted at angles close to grazing the first or second guiding surfaces 6, 8. In operation the taper angle 133 of the features 32 is arranged to not provide alone sufficient light leakage from the optical waveguide 1; that is insufficient leakage would be present if the non-inclined lenticular surface 930 were not present.

Figure 7B:
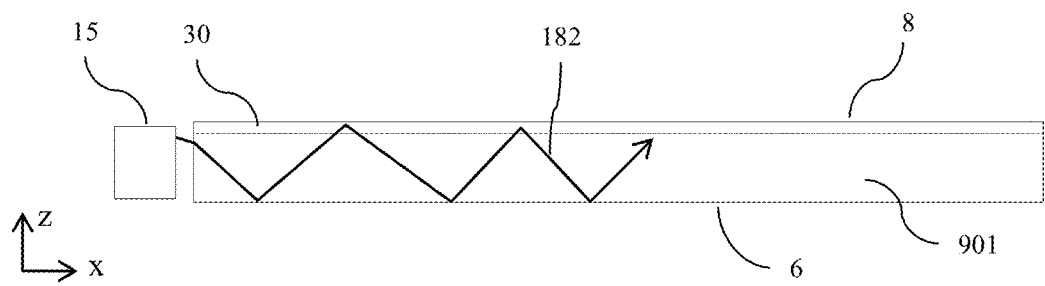
FIG. 7B is a schematic diagram illustrating in side view operation of a non-inclined lenticular structure of a collimating waveguide for on-axis illumination.

FIG. 7B is a schematic diagram illustrating in side view operation of a non-inclined lenticular structure for on-axis illumination. At each reflection at the non-inclined lenticular surface 930, a deflection of the light ray 182 is provided that is out of plane of the paper in FIG. 7B. The resultant ray thus sees a taper effect due to the inclined surface of the lenticular surface 930. Some reflections increase the angle of incidence while other reflections reduce the angle of incidence. In operation the net ray angle of incidence change is small and does not provide sufficient light leakage from the optical waveguide 1; that is insufficient leakage would be present if the planar surfaces 32 were not present.

The directionality of light extraction from surface 930 will now be further described for light rays incident at different positions across the lenticular surface 930 for light that has not undergone reflections at feature 32.

Figures 8A, 8B, 8C:
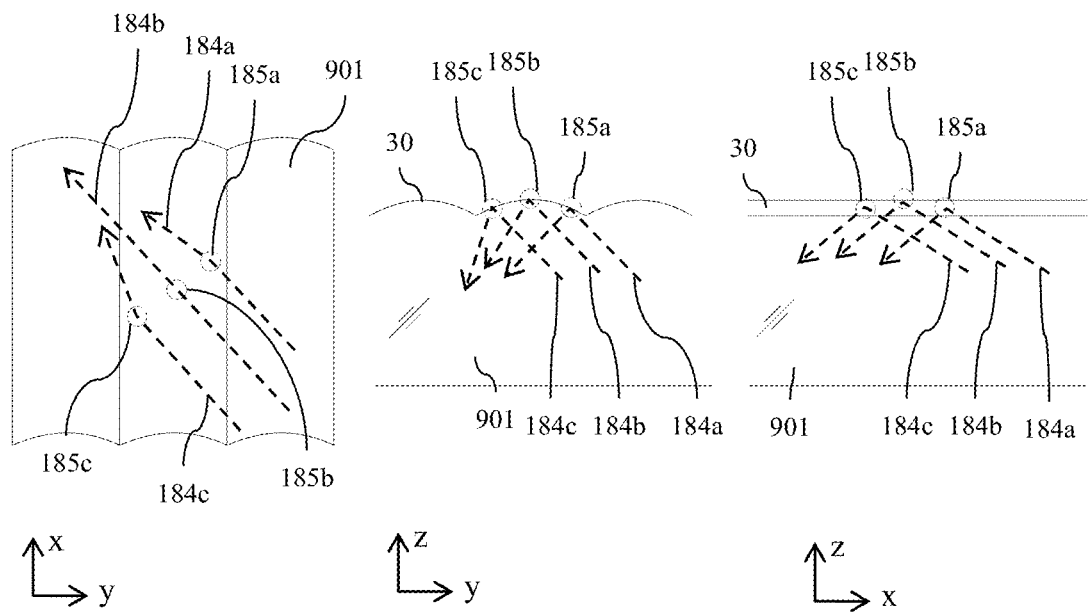
FIG. 8A is a schematic diagram illustrating in top view operation of a non-inclined lenticular structure of a collimating waveguide for off-axis illumination.
FIG. 8B is a schematic diagram illustrating in end view operation of a non-inclined lenticular structure of a collimating waveguide for off-axis illumination.
FIG. 8C is a schematic diagram illustrating in side view operation of a non-inclined lenticular structure of a collimating waveguide for off-axis illumination.

FIG. 8A is a schematic diagram illustrating in top view operation of a non-inclined lenticular structure for off-axis illumination; FIG. 8B is a schematic diagram illustrating in end view operation of a non-inclined lenticular structure for off-axis illumination; and FIG. 8C is a schematic diagram illustrating in side view operation of a non-inclined lenticular structure for off-axis illumination.

Rays 184a, 184b, 184c have locations of incidence 185a, 185b, 185c respectively at the lenticular surface 930. In top view the rays 184a, 184c are deflected by the inclined lenticular surface 930. In end view, the angle of reflection varies across the surface 930 while in side view the angle of reflection is unmodified. For each reflection, the ray angles are sufficiently above the critical angle that no light is extracted.

Figure 8D:
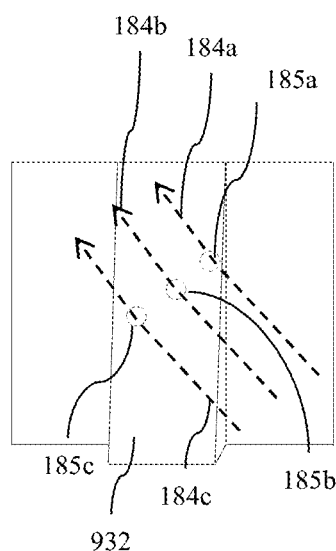
FIG. 8D is a schematic diagram illustrating in top view operation of an inclined planar feature of a collimating waveguide for off-axis illumination.
Figure 8E:
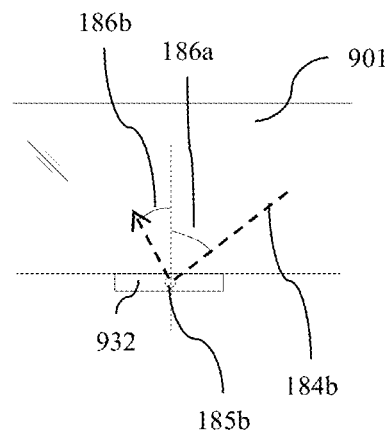
FIG. 8E is a schematic diagram illustrating in end view operation of an inclined planar feature of a collimating waveguide for off-axis illumination.
Figure 8F:
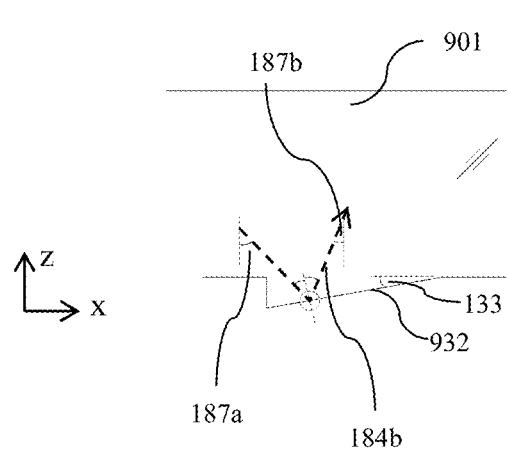
FIG. 8F is a schematic diagram illustrating in side view operation of an inclined planar feature of a collimating waveguide for off-axis illumination.

FIG. 8D is a schematic diagram illustrating in top view operation of an inclined planar feature for off-axis illumination; FIG. 8E is a schematic diagram illustrating in end view operation of an inclined planar feature for off-axis illumination; and FIG. 8F is a schematic diagram illustrating in side view operation of an inclined planar feature for off-axis illumination.

Rays 184a, 184b, 184c have locations of incidence 185a, 185b, 185c respectively at the planar light extraction feature 32. In top view and end view the rays 184a, 184b, 184c are slightly deflected by the inclined feature 32. In side view the dominant effect of the surface of the feature 32 can be visualised, the angle 187b being smaller than the angle 187a. Thus the taper angle 133 of the feature 32 directs light rays 184b closer to the critical angle.

The combined effect of the features 32 and non-inclined lenticular surface 930 will now be described.

Figure 8G:
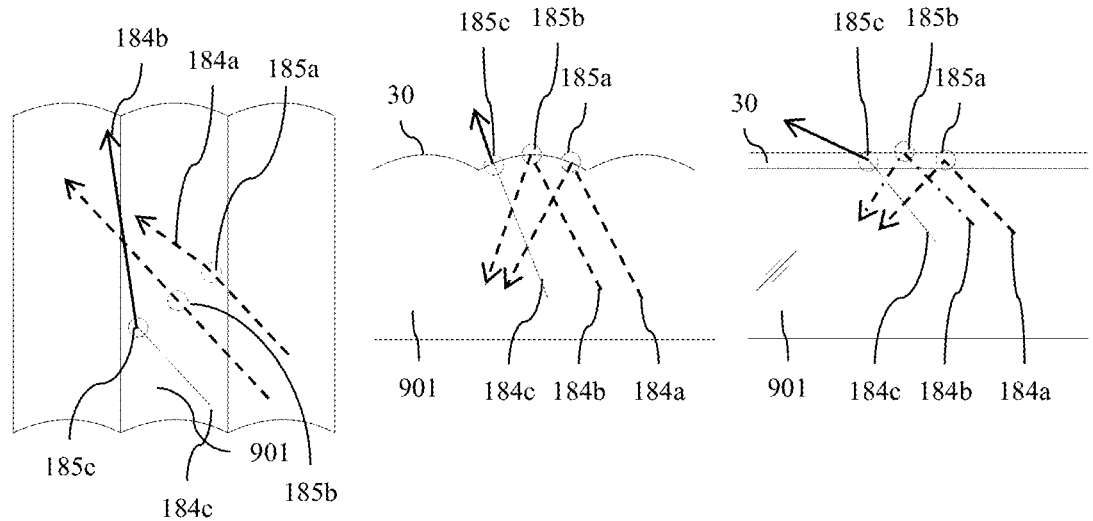
FIG. 8G is a schematic diagram illustrating in top view operation of a non-inclined lenticular structure of a collimating waveguide for off-axis illumination after incidence with an inclined planar feature.
Figure 8G:
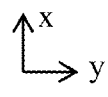
Figure 8H:
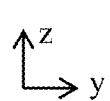
FIG. 8H is a schematic diagram illustrating in end view operation of a non-inclined lenticular structure of a collimating waveguide for off-axis illumination after incidence with an inclined planar feature.
Figure 8I:
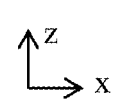
FIG. 8I is a schematic diagram illustrating in side view operation of a non-inclined lenticular structure of a collimating waveguide for off-axis illumination after incidence with an inclined planar feature.

FIG. 8G is a schematic diagram illustrating in top view operation of a non-inclined lenticular structure for off-axis illumination after incidence with an inclined planar feature 32; FIG. 8H is a schematic diagram illustrating in end view operation of a non-inclined lenticular structure for off-axis illumination after incidence with an inclined planar feature 32; and FIG. 8I is a schematic diagram illustrating in side view operation of a non-inclined lenticular structure for off-axis illumination after incidence with an inclined planar feature 32.

In comparison to the arrangement of FIGS. 6A-6C, the light rays 184a-c have angles of incidence that have been reduced after reflection at light extraction feature 32. Light rays 184a, 184b still remain above the critical angle of incidence when incident on the lenticular surface 930. However, light ray 184c is incident at an angle below the critical angle and is extracted. The direction of extraction is inclined towards the longitudinal direction in comparison to the incident ray angle, as illustrated in FIG. 8G. In this manner, the light extraction features 32 and lenticular surface 930 cooperate to extract light in directions close to the longitudinal direction.

Figure 8J:
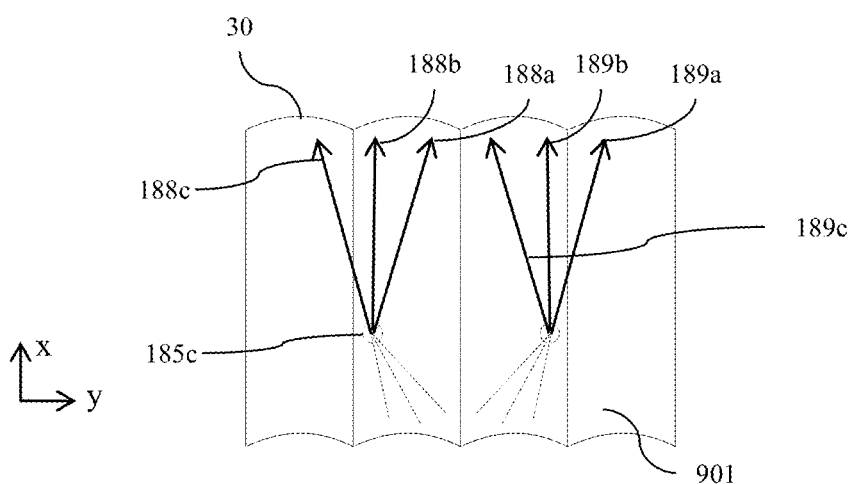
FIG. 8J is a schematic diagram illustrating in top view output of a collimating waveguide.

FIG. 8J is a schematic diagram illustrating in top view output of an optical waveguide. Thus light cones comprising rays 188a, 188b, 188c are preferentially output from the lenticular surface 930, arising for light travelling towards an inclined surface. Thus reflected ray bundles 189a-c are also provided from the oppositely tilted lenticular surface.

Figure 9A:
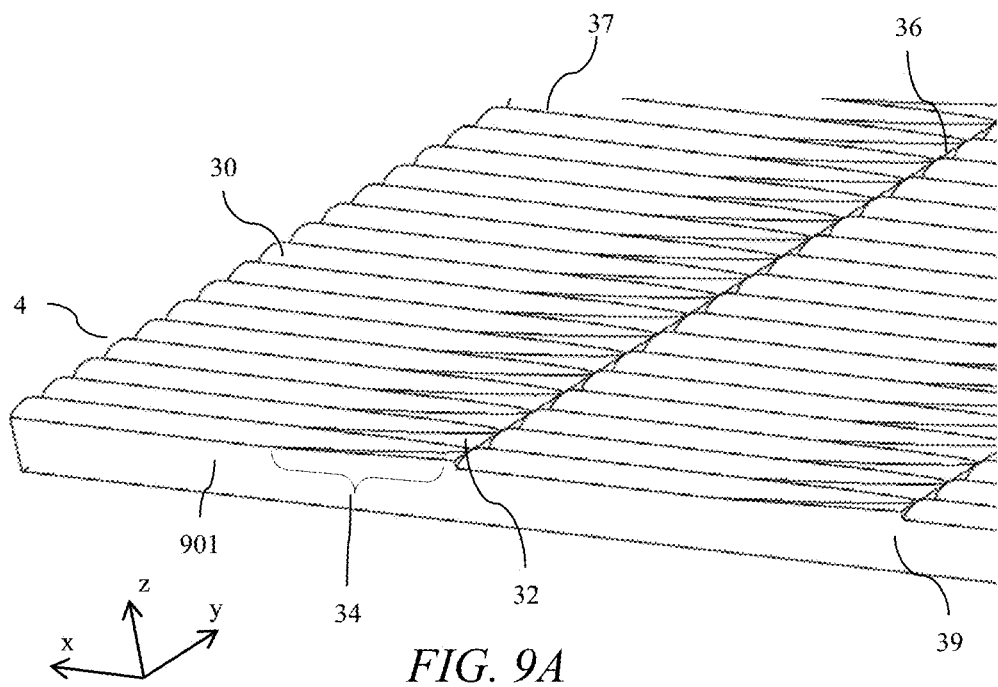
FIG. 9A and FIG. 9B are schematic diagrams illustrating in perspective views a collimating waveguide comprising a planar first surface and a second surface opposite the first surface comprising non-inclined lenticular surface and inclined planar surfaces.
Figure 9B:
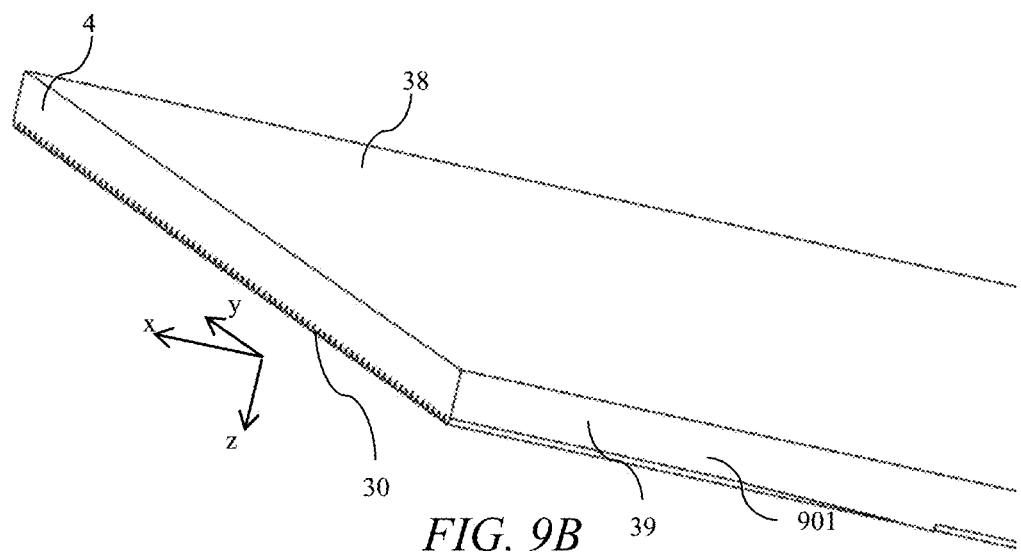

FIGS. 9A-9B are schematic diagrams illustrating in perspective views an optical waveguide 901 comprising a non-inclined lenticular surface 30 and inclined planar surfaces 32, 36 arranged on a single side of the optical waveguide 901. Such waveguides are described in U.S. Provisional Patent Appl. No. 62/646,550, filed Mar. 22, 2018 and titled "Optical waveguide for privacy display" which is herein incorporated by reference in its entirety.

The at least one light input end of the optical waveguide 901 comprises a first light input end 2 and a second light input end 4 facing the first light input end 2.

The first light guiding surface 6 of the optical waveguide 901 comprises a planar surface.

The second light guiding surface 8 comprises (i) a plurality of non-inclined light extraction features 30; and (ii) a plurality of inclined light extraction features 32, 36 arranged in an array. In the present embodiments, the plurality of non-inclined light extraction features 30 comprise a lenticular surface, that comprises a curved surface that is extended in the longitudinal (parallel to x-axis) direction.

The structure of the second light guiding surface 8 will now be described in further detail.

Figure 9C:
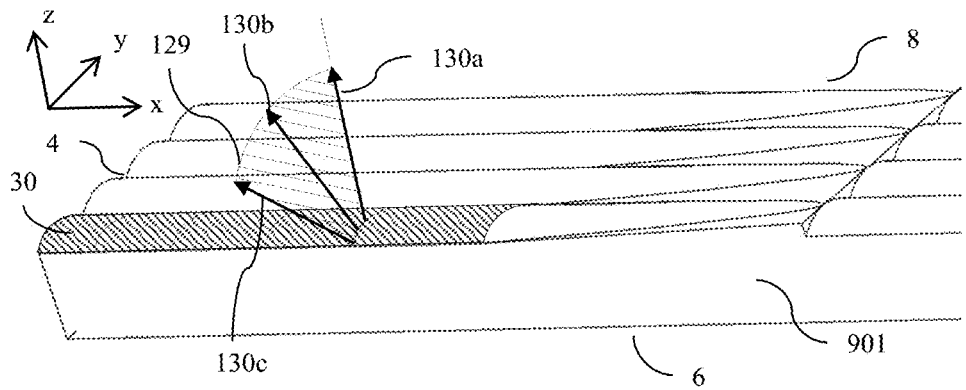
FIG. 9C is a schematic diagram illustrating in side perspective view a non-inclined lenticular surface of an optical waveguide not in an intersection region.

FIG. 9C is a schematic diagram illustrating in side perspective view a non-inclined lenticular surface 30 of an optical waveguide not in an intersection region 34.

The second light guiding surface 8 comprises a plurality of non-inclined light extraction features 30 arranged in an array, each non-inclined light extraction feature 30 being elongate and extending in a longitudinal direction (parallel to the x-axis direction). Each non-inclined light extraction feature 30 comprises surface normal directions 130a, 130b, 130c that vary in a plane 129 orthogonal to the longitudinal direction and that have no component of tilt in the longitudinal direction.

Figure 9D:
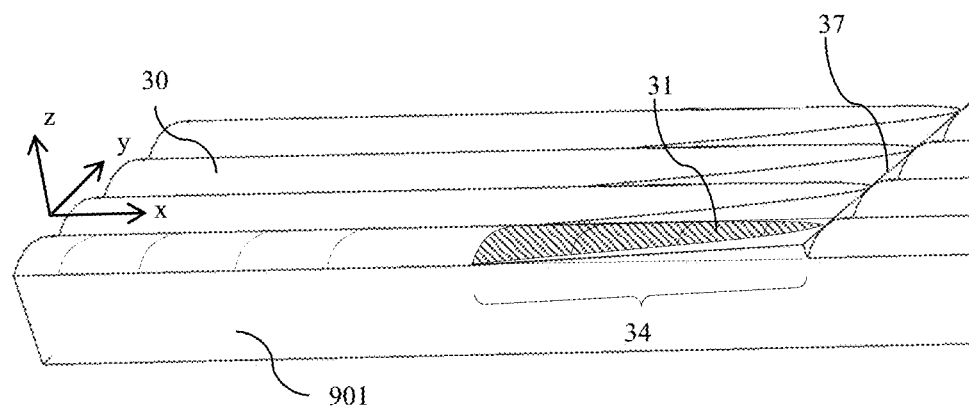
FIG. 9D is a schematic diagram illustrating in side perspective view a non-inclined lenticular surface of an optical waveguide in an intersection region.

FIG. 9D is a schematic diagram illustrating in side perspective view a non-inclined lenticular surface 30 of an optical waveguide in an intersection region 34.

The plurality of non-inclined light extraction features 30 are intersected by at least one first inclined light extraction feature 32, 36 are intersected by the at least one first inclined light extraction feature in an intersection region 34; and the width of the non-inclined light extraction feature 31 in the intersection region varies in the longitudinal direction. In other words, in the present embodiment the lenticular surface of the feature 30 is bisected by a plane such that its width reduces towards a cusp 37 between the planar surfaces 32, 36.

Figure 9E:
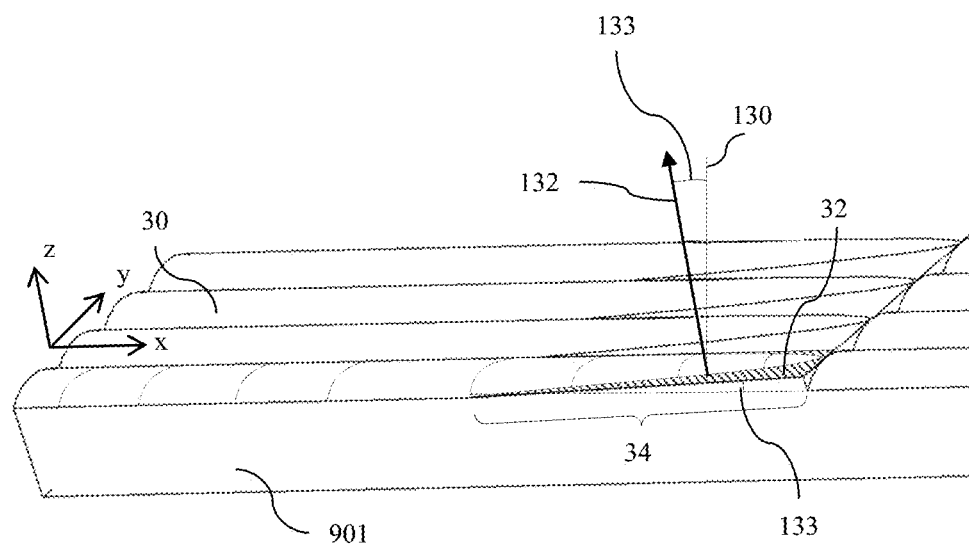
FIG. 9E is a schematic diagram illustrating in side perspective view a first inclined planar region of an optical waveguide in an intersection region.

FIG. 9E is a schematic diagram illustrating in side perspective view a first inclined planar region 32 of an optical waveguide 901 in the intersection region 34.

The second light guiding surface 8 further comprises a plurality of inclined light extraction features 32 arranged in an array, each inclined light extraction feature 32 comprising at least one surface normal direction 132 with a tilt with tilt angle 133 about the display normal direction 130 that has a component in the longitudinal direction.

The plurality of inclined light extraction features comprises a first plurality of inclined light extraction features 32. Each light extraction feature 32 of the first plurality of inclined light extraction features 32 has a surface normal 132 that has a tilt angle 133 wherein the tilt of the surface normal 132 has a component in the longitudinal direction (parallel to x-axis) that is away from the first light input end 2.

A second plurality of inclined light extraction features 36 is further illustrated that are shaded. Each light extraction feature 36 has a surface normal direction 136 that has a tilt angle 137 wherein the tilt of the surface normal 137 has a component in the longitudinal direction that is towards the first light input end 2.

The inclined light extraction features 32, 36 comprise planar inclined light extraction features. The planar inclined light extraction features 32, 36 may also have surface normal directions that have no component in the lateral direction, that is the surface normals 132, 136 may be arranged in the x-z plane.

Figure 9F:
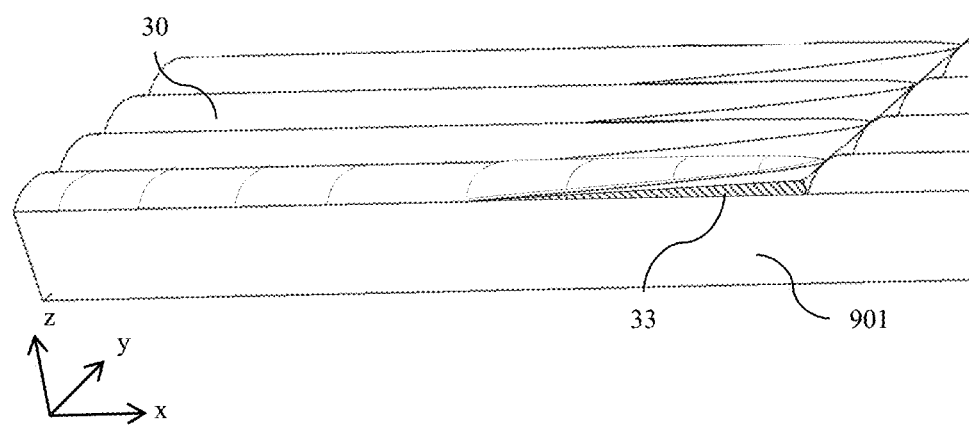
FIG. 9F is a schematic diagram illustrating in side perspective view the tilted cross sectional profile of the first inclined planar region of an optical waveguide in the intersection region.

FIG. 9F is a schematic diagram illustrating in side perspective view the tilted cross sectional profile 33 of the first inclined planar region of an optical waveguide in the intersection region. The cross sectional profile 33 may comprise a triangular region for example. Advantageously such a structure may be conveniently tooled as will be described below.

In an illustrative embodiment, the tilt angle 133 may be 2 degrees. More generally in an optical waveguide 901 of the type illustrated in FIG. 2, the tilt angle 133 in the longitudinal direction of the first plurality of inclined light extraction features 32 may be between 0.25 degrees and 5 degrees, preferably between 0.5 degrees and 4 degrees and most preferably between 1 degree and 3 degrees.

At least some of the plurality of non-inclined light extraction features 30 are intersected in intersection region 34 by at least one inclined light extraction feature 32, 36.

Considering further FIGS. 9A-9F, in other words, the first light guiding surface comprises a planar surface 38 and the second light guiding surface 37 comprises: (i) a plurality of non-inclined light extraction features arranged in an array 30, each non-inclined light extraction feature 30 being elongate, extending in a longitudinal direction perpendicular to the lateral direction, and having surface normal directions that vary in a plane orthogonal to the longitudinal direction and that have no component of tilt in the longitudinal direction; and (ii) a plurality of inclined light extraction features 34 arranged in an array, each inclined light extraction feature having a surface normal direction with a tilt that has a component in the longitudinal direction, the plurality of non-inclined light extraction features 30 and the plurality of inclined light extraction features 34 being oriented to direct guided light through the first and second light guiding surfaces 38, 37 as output light. The plurality of inclined light extraction features 34 comprises: a first plurality of inclined light extraction features 32, each light extraction feature of the first plurality of inclined light extraction features having a surface normal direction that has a tilt with a component in the longitudinal direction that is away from the first light input end 2; and a second plurality of inclined light extraction features 36, each light extraction feature of the second plurality of inclined light extraction features having a surface normal direction that has a tilt with a component in the longitudinal direction that is towards the first light input end 2. The magnitude of the component in the longitudinal direction of the tilt of the surface normal direction of the first plurality of inclined light extraction features is different from the magnitude of the component in the longitudinal direction of the tilt of the surface normal direction of the second plurality of inclined light extraction features. The plurality of non-inclined light extraction features 30 comprise a lenticular surface or an elongate prismatic surface.

Figure 10:
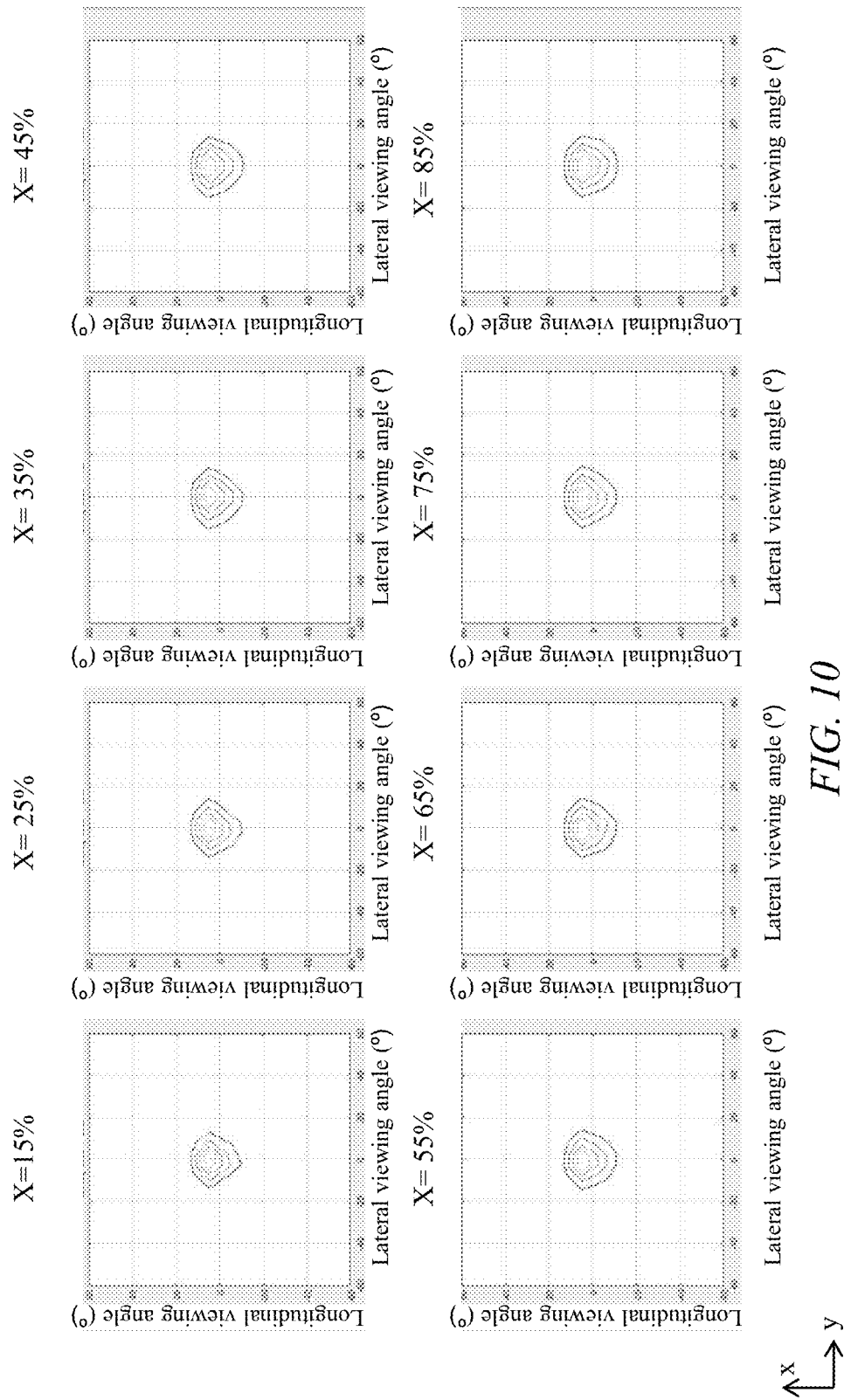
FIG. 10 is a schematic graph illustrating iso-luminance field-of-view polar plots for different positions across a backlight comprising an optical waveguide of FIG. 9A and light turning film of FIG. 6A when light is input into the first end of the optical waveguide.

FIG. 10 is a schematic graph illustrating iso-luminance field-of-view polar plots for different positions across a backlight 20 comprising an optical waveguide of FIG. 9A and light turning film of FIG. 6A when light is input into the first end 2 of the optical waveguide 901.

FIG. 10 illustrates simulated appearance for illumination of the optical waveguide 1 and turning film 5 of the present illustrative embodiment by light source 15 where each contour represents a 20% luminance contour interval. The parameter X represents the relative distance from the first input end 2, and is given by equation 11 where x is the distance from the input end 2 and L is the length of the optical waveguide 901.

$$X=x/L \qquad \text{Eqn. 11}$$

The luminance output profile is provided within approximately +/−20 degree lateral viewing angle and +/−10 degree longitudinal viewing angle about the display normal direction 130.

The field-of-view plots of the present disclosure illustrate the variation of output luminance for longitudinal viewing angle against lateral viewing angle. In the present illustrative embodiments, the source 15 may be arranged at the lower edge of the display 100 and the source 17 is arranged at the upper edge of the display 100. In this arrangement, the horizontal viewing angle direction is in the lateral direction (parallel to x-axis) and the vertical viewing angle direction is the longitudinal direction (parallel to y-axis).

In the longitudinal direction the light ray distribution is provided by light at near grazing angles of incidence onto the light guiding surface 8 and thus has a restricted cone angle. In the lateral viewing angle direction, the output luminance profile is determined by the distribution of rays from the lenticular surface 930 as shown in FIG. 8J.

Advantageously such an illumination profile can achieve high efficiency of illumination to a head-on user. Further, such a profile is substantially uniform along the length of the optical waveguide 901, achieving high luminance uniformity and reduced power consumption. Such a profile can also be used to provide the privacy mode operation of a backlight 20 for a privacy display 100.

The operation of the privacy mode of a display will now be described further.

Figure 11A:
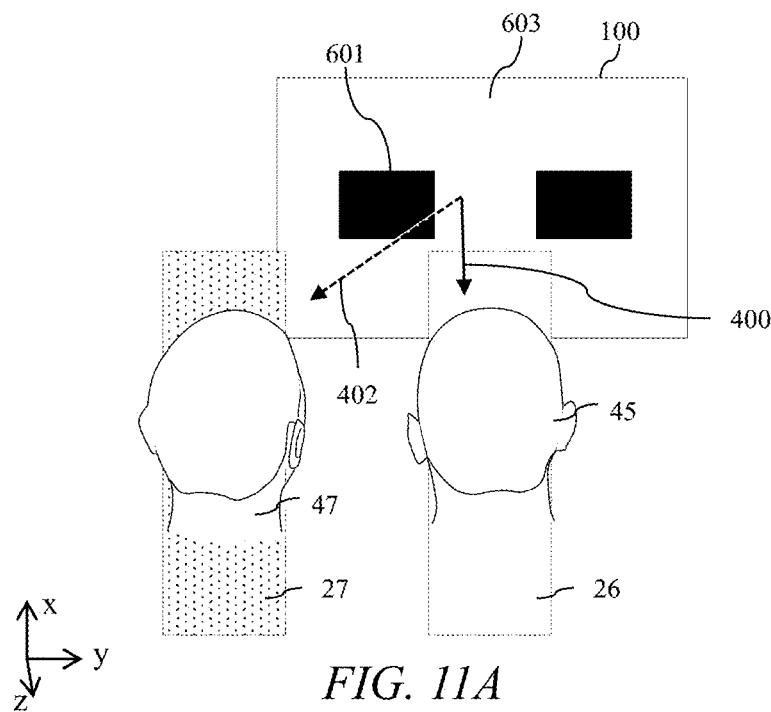
FIG. 11A is a schematic diagram illustrating in front perspective view observation of transmitted output light for a display comprising a backlight operating in narrow angle mode.

FIG. 11A is a schematic diagram illustrating in front perspective view observation of transmitted output light for a display comprising a backlight 20 such as illustrated in FIG. 3A, FIGS. 5A-5C or FIGS. 9A-9F operating in privacy mode with light source set 15 illuminating from end 2 of the respective waveguide 901.

Display 100 may be provided with white regions 603 and black regions 601. A snooper may observe an image on the display if luminance difference between the observed regions 601, 603 can be perceived. In operation, primary user 45 observes a full luminance images by rays 400 to viewing locations 26 that may be optical windows of a directional display. Snooper 47 observes reduced luminance rays 402 in viewing locations 27 that may be optical windows of a directional display. Regions 26, 27 further represent on-axis and off-axis regions.

Figure 11B:
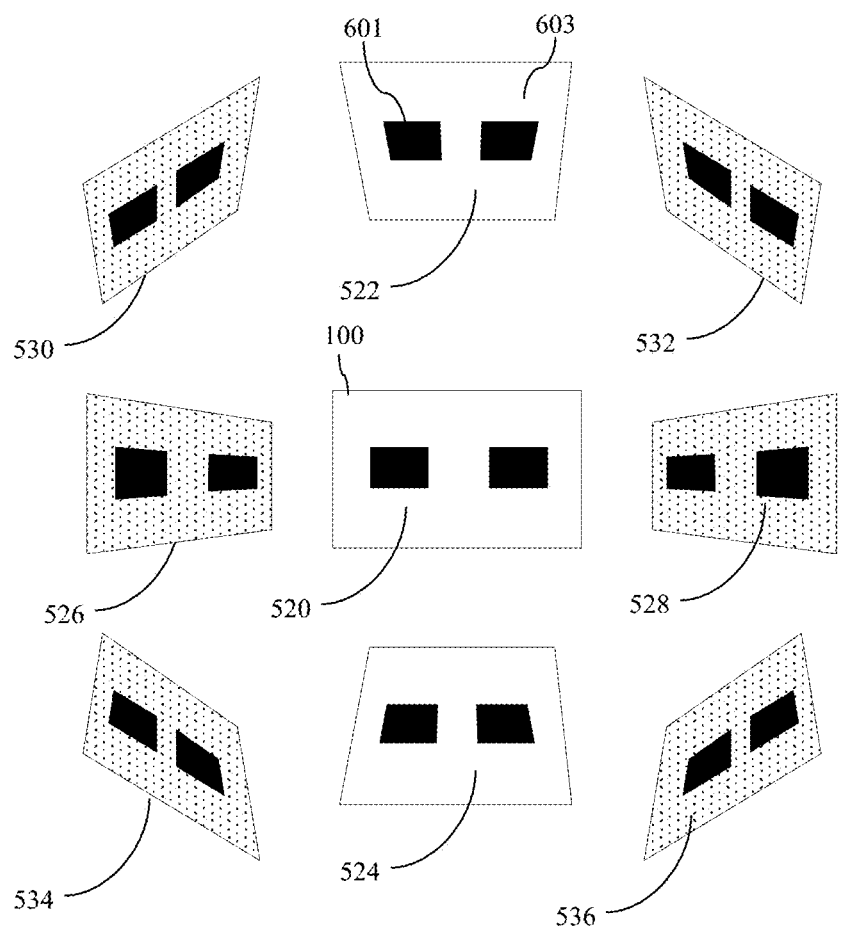
FIG. 11B is a schematic diagram illustrating in front perspective views the appearance of the display comprising a switchable backlight operating in privacy mode.

FIG. 11B is a schematic diagram illustrating in front perspective views the appearance of the display of FIG. 11A operating in privacy mode with luminance variations as illustrated in FIG. 3B or FIG. 10 for example. Thus upper viewing quadrants 530, 532, lower viewing quadrants 534, 536 and lateral viewing positions 526, 528 provide reduced luminance, whereas up/down central viewing regions 522, 520 and head-on viewing provides higher luminance.

However, as illustrated in FIGS. 1B-1G, the luminance profile of the backlight 20 alone is insufficient to achieve desirable privacy performance.

The operation of the switchable liquid crystal retarder 300 and additional polariser 318 of FIG. 1A in a narrow angle mode for privacy operation will now be described. Switchable directional displays are further described in International Appl. No. PCT/US18/31206 filed in the U.S. receiving office May 4, 2018 and in U.S. Provisional Patent Appl. No. 62/699,914 filed Jul. 18, 2018 and titled "Optical stack for switchable directional display", both of which are herein incorporated by reference in their entireties.

Figure 12:
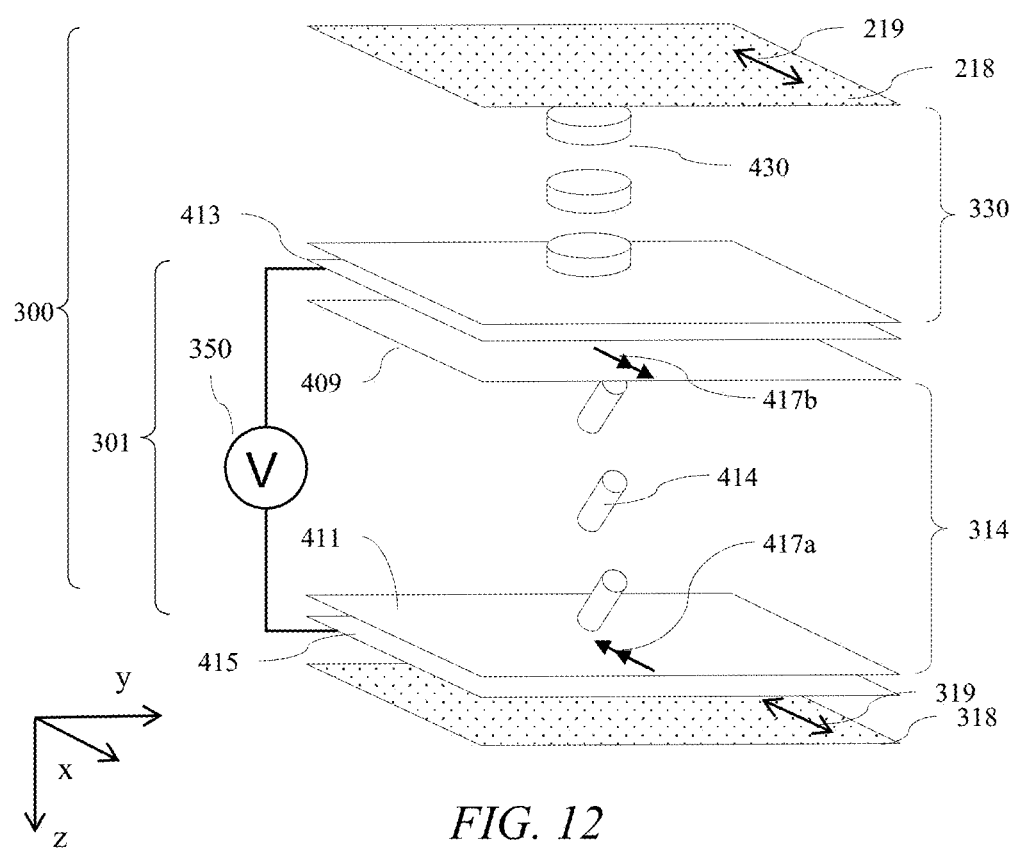
FIG. 12 is a schematic diagram illustrating in perspective side view an arrangement of a switchable compensated retarder comprising a negative C-plate and a switchable liquid crystal retarder comprising homeotropic alignment layers in a privacy mode of operation.

FIG. 12 is a schematic diagram illustrating in perspective side view an arrangement of a switchable compensated retarder 300 in a privacy mode of operation comprising a negative C-plate passive compensation retarder 330 and homeotropically aligned switchable liquid crystal retarder 301 in a privacy mode of operation.

The switchable liquid crystal retarder 301 comprises two surface alignment layers disposed adjacent to the liquid crystal material 414 on opposite sides thereof and arranged to provide homeotropic alignment at the adjacent liquid crystal material 414. The liquid crystal material 414 may be provided with a pretilt, for example 88 degrees from the horizontal to remove degeneracy of liquid crystal material 414 alignment.

The passive compensation retarder 330 comprises a negative C-plate retarder having an optical axis that is a fast axis perpendicular to the plane of the retarder. Thus the material 430 of the C-plate retarder may have a negative dielectric anisotropy. C-plates may comprise transparent birefringent materials such as: polycarbonates or reactive mesogens that are cast onto a substrate that provides homeotropic alignment for example; Zeonex™ Cyclo Olefin Polymer (COP); discotic polymers; and Nitto Denko™ double stretched polycarbonates.

The liquid crystal retarder 301 further comprises transparent electrodes 413, 415 such as ITO electrodes arranged across the switchable liquid crystal retarder 301, that is adjacent to the layer 314 of liquid crystal material and on opposite sides of the liquid crystal layer 314. Electrodes 413, 415 control the switchable liquid crystal retarder 301 by adjusting the voltage being applied to the electrodes 413, 415.

In the case that the additional polariser 318 is arranged on the output side of the output polariser 218, the additional polariser 318 has an electric vector transmission direction 319 that is parallel to the electric vector transmission direction 219 of the output polariser 218, as illustrated in FIG. 1A and FIG. 12.

In the case that the additional polariser 318 is arranged on the input side of the input polariser 210 between the input polariser 210 and the backlight 20 as illustrated in FIG. 2A, the additional polariser 318 has an electric vector transmission direction 319 that is parallel to the electric vector transmission direction of the input polariser 210.

The switchable liquid crystal retarder 301 comprises two surface alignment layers 409, 411 disposed adjacent to the layer 314 of liquid crystal material 414 and on opposite sides thereof and arranged to provide homeotropic alignment in the adjacent liquid crystal material 414.

Electrodes 413, 415 are arranged to provide a voltage across the liquid crystal retarder layer 314. The liquid crystal retarder 301 further comprises electrodes 413, 415 arranged to control the liquid crystal material 414, the layer 314 of liquid crystal material being switchable by means of adjusting the voltage being applied to the electrodes. The electrodes 413, 415 may be across the liquid crystal retarder layer 314. Control system 352 is arranged to control the voltage applied by voltage driver 350 across the electrodes 413, 415 of the switchable liquid crystal retarder 301.

The orientation of the liquid crystal material 414 in the x-y plane is determined by the pretilt direction of the alignment layers so that each alignment layer has a pretilt wherein the pretilt of each alignment layer has a pretilt direction with a component 417a, 417b in the plane of the liquid crystal retarder layer 314 that is parallel or antiparallel or orthogonal to the electric vector transmission direction 303 of the output display polariser 218.

In typical use for switching between a wide angle mode and a privacy mode, the layer of liquid crystal material is switchable between two states, the first state being a wide angle mode so that the display may be used by multiple users, the second state being a privacy mode for use by a primary user with minimal visibility by snoopers. The switching may be by means of a voltage being applied across the electrodes.

In general such a display may be considered having a first wide angle state and a second reduced off-axis luminance state.

The propagation of polarised light from the output display polariser 218 will now be considered for on-axis and off-axis directions.

Figure 13A:
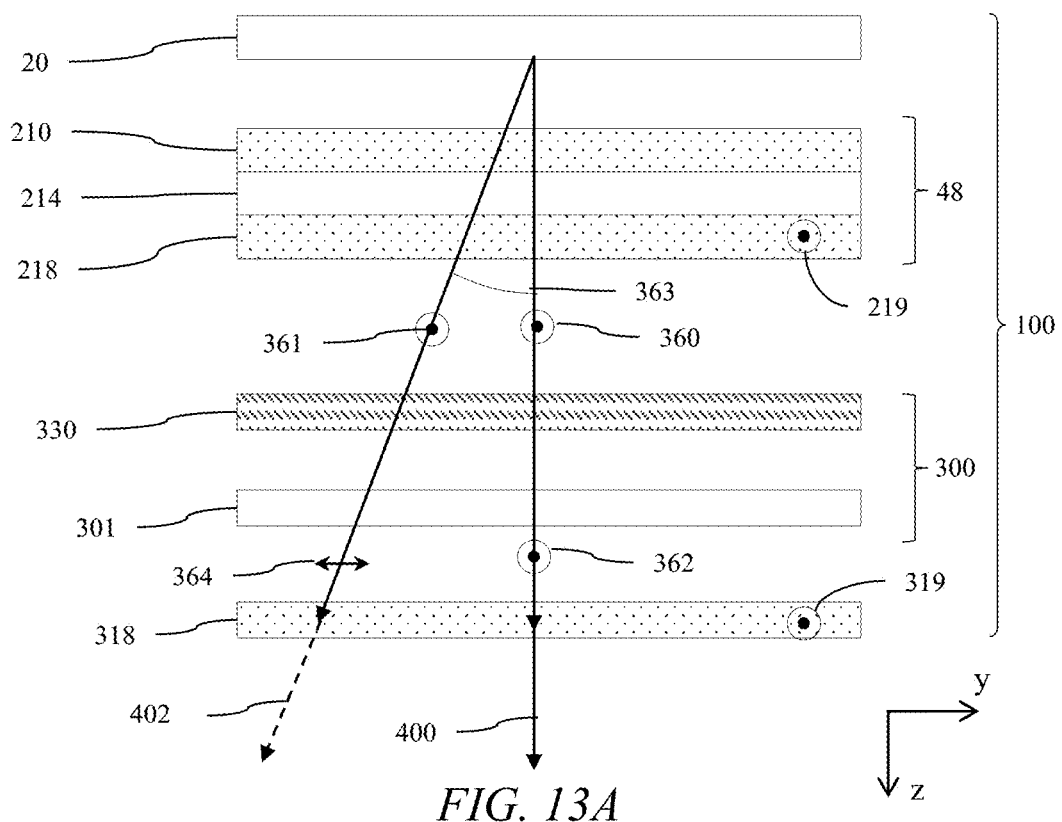
FIG. 13A is a schematic diagram illustrating in side view propagation of output light from a spatial light modulator through the optical stack of FIG. 12 in a privacy mode of operation.

FIG. 13A is a schematic diagram illustrating in side view propagation of output light from a spatial light modulator 48 through the optical stack of FIG. 1A in a privacy mode of operation.

Polarisation component 360 from the output display polariser 218 is transmitted by output display polariser 218 and incident on switchable compensated retarder 300. On-axis light has a polarisation component 362 that is unmodified from component 360 while off-axis light has a polarisation component 364 that is transformed by retarders of switchable compensated retarder 300. At a minimum, the polarisation component 361 is transformed to a linear polarisation component 364 and absorbed by additional absorptive polariser 318. More generally, the polarisation component 361 is transformed to an elliptical polarisation component, that is partially absorbed by additional absorptive polariser 318.

Thus when the retarder layer 314 of liquid crystal material 414 is in the second orientation state of said two orientation states, the plural retarders 314, 330 provide no overall retardance to light passing therethrough along an axis perpendicular to the plane of the retarders, but provides a non-zero overall retardance to light passing therethrough for some polar angles 363 that are at an acute angle to the perpendicular to the plane of the retarders 314, 330.

In other words when the layer of liquid crystal material 314 is in a second state of said two states, the switchable compensated retarder 330 provides no overall transformation of polarisation component 360 to output light rays 400 passing therethrough along an axis perpendicular to the plane of the switchable retarder layer 314, but provides an overall transformation of polarisation component 361 to light rays 402 passing therethrough for some polar angles which are at an acute angle to the perpendicular to the plane of the retarders 314, 330.

Such O-plate oriented liquid crystal retarder layer 314 provides field-of-view polarisation modifications that are predominately in the zero elevation lateral direction, and smaller reductions in non-zero elevation directions such that the viewing quadrants (for example elevation 45 degrees, lateral angle 45 degrees) have a polarisation state that is substantially unmodified by the liquid crystal retarder.

The compensation retarder 330 provides modification of polarisation state in the viewing quadrants but does not provided any modification in the zero elevation lateral direction. Thus the polarisation state in the second privacy state of operation is modified in the lateral direction by the liquid crystal retarder layer 314 and in the viewing quadrants by the passive compensation retarder 330.

The performance of an illustrative material system will be described for narrow angle operation.

Figure 13B:
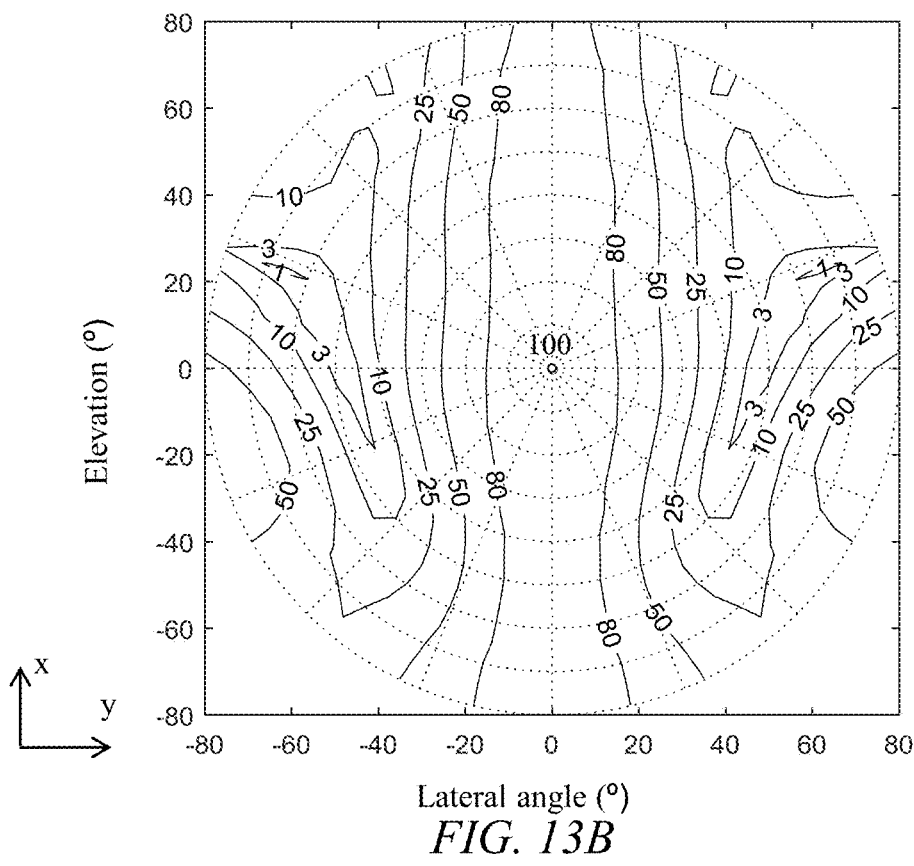
FIG. 13B is a schematic graph illustrating the variation of output transmission with polar direction for the transmitted light rays in FIG. 13A.

FIG. 13B is a schematic graph illustrating the variation of output transmission with polar direction for the transmitted light rays in FIG. 13A with the switchable compensated retarder 300 driven in a privacy mode, and comprising the parameters described in TABLE 1.

TABLE 1

| | Passive compensation retarder(s) | | Active LC retarder | | | | |
|---|---|---|---|---|---|---|---|
| Mode | Type | Δn.d/nm | Alignment layers | Pretilt/deg | Δn.d/nm | Δε | Voltage/V |
| Wide | Negative C | −700 | Homeotropic | 88 | 810 | −4.3 | 0 |
| Privacy | | | Homeotropic | 88 | | | 2.2 |

In the present embodiments, desirable ranges for retardations and voltages have been established by means of simulation of retarder stacks and experiment with display optical stacks.

The switchable liquid crystal retarder 300 comprises a first surface alignment layer 409 disposed on a first side of the layer of liquid crystal material 414, and a second surface alignment layer 411 disposed on the second side of the layer of liquid crystal material 414 opposite the first side; wherein the first surface alignment layer 409 is a homeotropic alignment layer and the second surface alignment layer 411 is a homeotropic alignment layer, wherein the layer of liquid crystal material has a retardance for light of a wavelength of 550 nm between 500 nm and 1000 nm, preferably between 600 nm and 900 nm and most preferably between 700 nm and 850 nm.

When the passive compensation retarder 330 comprises a retarder having an optical axis perpendicular to the plane of the retarder, the passive retarder has a retardance for light of a wavelength of 550 nm between −300 nm and −900 nm, preferably between −450 nm and −800 nm and most preferably between −500 nm and −725 nm.

The polar distribution of light transmission illustrated in FIG. 13B modifies the polar distribution of luminance output of the underlying backlight 20 that is arranged to provide a narrow angle distribution such profile 486 as illustrated in FIG. 1G, achieving modified profile 490.

Such a display may achieve 0.5% of head-on luminance at a lateral viewing angle of 45 degrees and zero degrees elevation. Advantageously, a privacy display is provided that has desirable visual security level to an off-axis snooper while maintaining high luminance for an on-axis observer. Further a large polar region is provided over which the visual security level of the display to an off-axis snooper is reduced. Further the on-axis luminance is substantially unaffected for the primary display user in privacy mode of operation.

The voltage applied across the electrodes is zero for the first orientation state and non-zero for the second orientation state. Advantageously the wide mode of operation may have no additional power consumption, and the failure mode for driving of the switchable liquid crystal retarder layer 314 is for wide angle mode.

The passive compensation retarder 330 of FIG. 12 may alternatively be provided by crossed A-plates, comprising an illustrative embodiment as illustrated in TABLE 2.

When the passive compensation retarder 330 comprises a pair of retarders which have optical axes in the plane of the retarders that are crossed, each retarder of the pair of retarders has a retardance for light of a wavelength of 550 nm between 300 nm and 800 nm, preferably between 500 nm and 700 nm and most preferably between 550 nm and 675 nm.

The pair of retarders 330A, 330B have optical axes that each extend at 45° with respect to an electric vector transmission direction 211 that is parallel to the electric vector transmission of the input display polariser 210 in the case that the additional polariser 318 is arranged on the input side of the input display polariser or is parallel to the electric vector transmission 219 of the output display polariser 218 in the case that the additional polariser 318 is arranged on the output side of the input display polariser 210.

In the present embodiments, 'crossed' refers to an angle of substantially 90° between the optical axes of the two retarders in the plane of the retarders. To reduce cost of retarder materials, it is desirable to provide materials with some variation of retarder orientation due to stretching errors during film manufacture for example. Variations in retarder orientation away from preferable directions can reduce the head-on luminance and increase the minimum transmission. Preferably the angle 310A is at least 35° and at most 55°, more preferably at least 40° and at most 50° and most preferably at least 42.5° and at most 47.5°. Preferably the angle 310B is at least 125° and at most 145°, more preferably at least 130° and at most 135° and most preferably at least 132.5° and at most 137.5°.

Advantageously A-plates may be more conveniently manufactured at lower cost than for the C-plate retarder of FIG. 4A and FIG. 5A. Further a zero voltage state may be provided for the wide angle mode of operation, minimising power consumption during wide angle operation.

During mechanical distortion, such as when touching the display, the homeotropically aligned liquid crystal retarders 301 of FIG. 12 may have undesirably long recovery times creating visible misalignment artefacts. It would be desirable to provide fast recovery times after mechanical distortion.

Figure 14A:
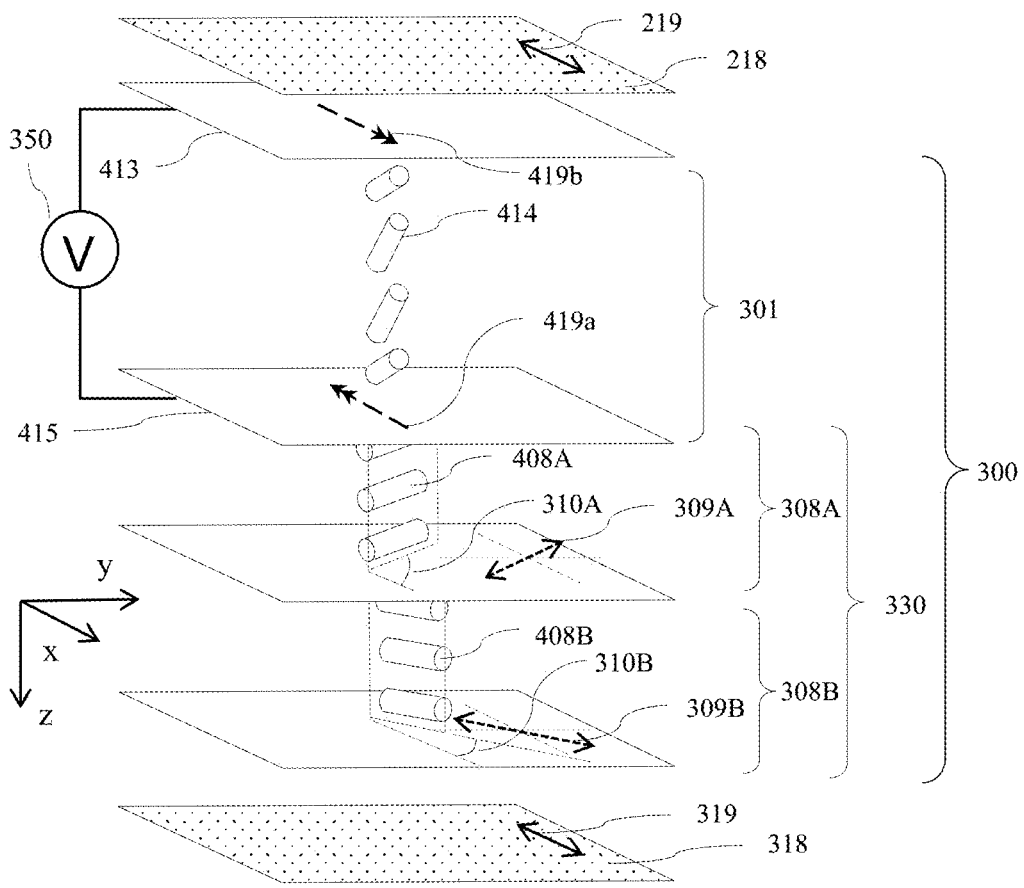
FIG. 14A is a schematic diagram illustrating in perspective side view an arrangement of a switchable compensated retarder comprising crossed A-plates and a switchable liquid crystal retarder comprising homogeneous alignment layers in a privacy mode of operation.
Figure 14B:
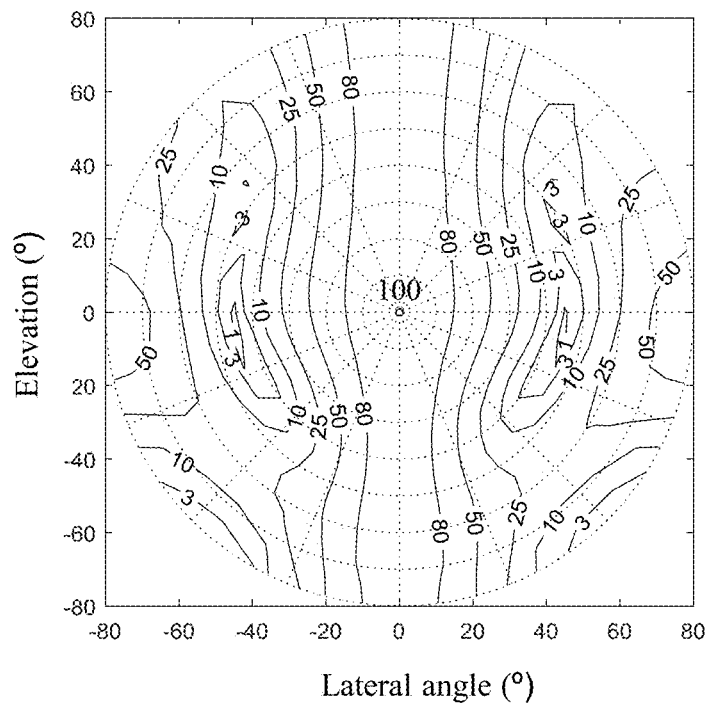
FIG. 14B is a schematic graph illustrating the variation of output transmission with polar direction for the transmitted light rays in FIG. 14A in a privacy mode of operation.

FIG. 14A is a schematic diagram illustrating in perspective side view an arrangement of a switchable compensated retarder comprising crossed A-plates and a switchable liquid crystal retarder comprising homogeneous alignment layers in a privacy mode of operation; and FIG. 14B is a schematic graph illustrating the variation of output transmission with polar direction for the transmitted light rays in FIG. 14A in a privacy mode of operation comprising the parameters described in TABLE 3.

TABLE 2

| Mode | Passive compensation retarder(s) | | Active LC retarder | | | |
| | Type | Δn.d/nm | Alignment layers | Pretilt/ deg | Δn.d/nm | Δε | Voltage/V |
|---|---|---|---|---|---|---|---|
| Wide | Crossed A | +650 @ 45° | Homeotropic | 88 | 810 | −4.3 | 0 |
| Privacy | | +650@ 135° | Homeotropic | 88 | | | 2.3 |

TABLE 3

| | Passive compensation | | Active LC retarder | | | | |
|---|---|---|---|---|---|---|---|
| | retarder(s) | | Alignment | Pretilt/ | | | |
| Mode | Type | Δn.d/nm | layers | deg | Δn.d/nm | Δε | Voltage/V |
| Privacy | Crossed A | +500 @ 45° | Homogeneous | 2 | 750 | +13.2 | 2.3 |
| Wide | | +500 @ 135° | Homogeneous | 2 | | | 5 |
| Wide | | | | | | | 10 |

When the first and second alignment layers are each homogeneous alignment layers; the layer of liquid crystal material has a retardance for light of a wavelength of 550 nm in a range from 500 nm to 1000 nm, preferably in a range from 600 nm to 850 nm and most preferably in a range from 700 nm to 800 nm; and the passive compensation retarder 330 comprises a pair of retarders which have optical axes in the plane of the retarders that are crossed, then each retarder of the pair of retarders has a retardance for light of a wavelength of 550 nm between 300 nm and 800 nm, preferably between 350 nm and 650 nm and most preferably between 450 nm and 550 nm.

The increased magnitude of resolved component 419a, 419b may provide increased restoring force after mechanical distortion in comparison to the arrangement of FIG. 9A for example. Sensitivity to mechanical distortions such as during touching the display may advantageously be reduced.

To reduce device thickness, the crossed A-plates may be replaced by a negative C-plate comprising an illustrative embodiment as illustrated in TABLE 4.

TABLE 4

| | Passive compensation | | Active LC retarder | | | | |
|---|---|---|---|---|---|---|---|
| | retarder(s) | | Alignment | Pretilt/ | | | |
| Mode | Type | Δn.d/nm | layers | deg | Δn.d/nm | Δε | Voltage/V |
| Privacy | Negative C | −500 | Homogeneous | 2 | 750 | +13.2 | 2.3 |
| Wide | | | Homogeneous | 2 | | | 5.0 |
| Wide | | | | | | | 10.0 |

The switchable liquid crystal retarder 300 comprises a first surface alignment layer 431 disposed on a first side of the layer of liquid crystal material 414, and a second surface alignment layer 433 disposed on the second side of the layer of liquid crystal material 414 opposite the first side; wherein the first surface alignment layer 409 is a homogeneous alignment layer and the second surface alignment layer is a homogeneous alignment layer; wherein the layer of liquid crystal material has a retardance for light of a wavelength of 550 nm in a range from 500 nm to 1000 nm, preferably in a range from 600 nm to 850 nm and most preferably in a range from 700 nm to 800 nm. Thus when the first and second alignment layers are each homogeneous alignment layers and when the passive compensation retarder 330 comprises a retarder having an optical axis perpendicular to the plane of the retarder, the passive retarder has a retardance for light of a wavelength of 550 nm in a range from −300 nm to −700 nm, preferably in a range from −350 nm to −600 nm and most preferably −400 nm to −500 nm.

Hybrid aligned structures comprising both homogeneous and homeotropic alignment layers will now be described.

Figure 15A:
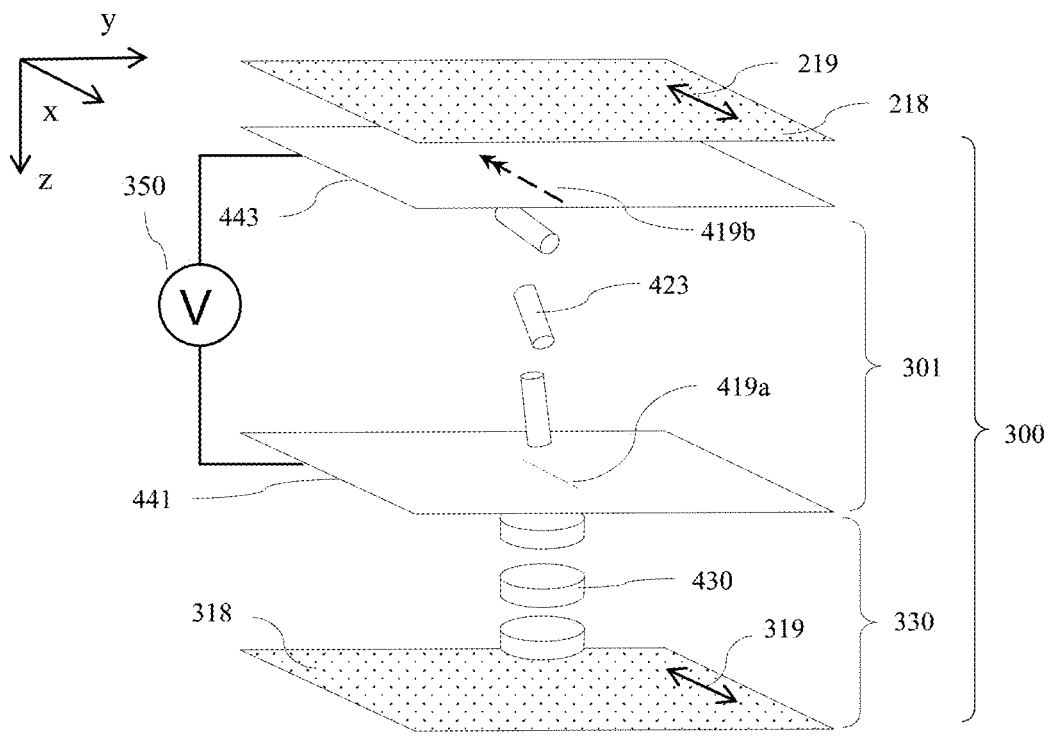
FIG. 15A is a schematic diagram illustrating in perspective side view an arrangement of a switchable compensated retarder in a privacy mode of operation comprising a homogeneously and homeotropically aligned switchable liquid crystal retarder and a passive negative C-plate retarder.
Figure 15B:
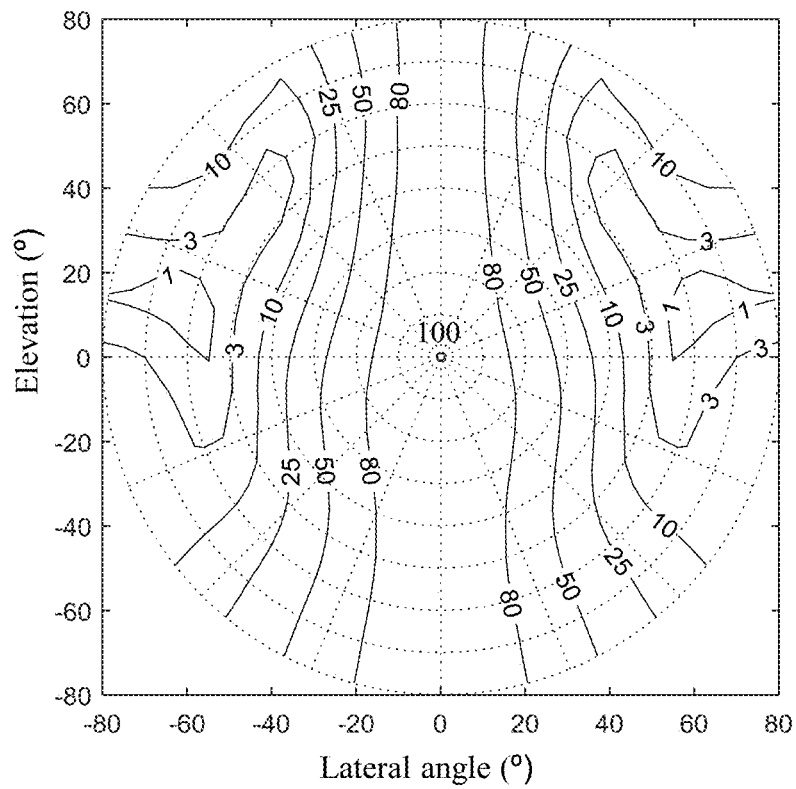
FIG. 15B is a schematic graph illustrating the variation of output transmission with polar direction for transmitted light rays in FIG. 15A in a privacy mode of operation.

FIG. 15A is a schematic diagram illustrating in perspective side view an arrangement of a switchable retarder in a privacy mode of operation comprising a homogeneously and homeotropically aligned switchable liquid crystal retarder 301 comprising liquid crystal material 423 and a passive negative C-plate retarder 330; and FIG. 15B is a schematic graph illustrating the variation of output transmission with polar direction for transmitted light rays in FIG. 15A in a privacy mode of operation, and provided by the arrangement of TABLE 5.

TABLE 5

| Mode | Passive compensation retarder(s) | | Active LC retarder | | | | |
|---|---|---|---|---|---|---|---|
| | Type | Δn.d/nm | Alignment layers | Pretilt/ deg | Δn.d/nm | Δε | Voltage/V |
| Wide Privacy | Negative C | −1100 | Homogeneous Homeotropic | 2 88 | 1300 | +4.3 | 15.0 2.8 |
| Wide Privacy | Crossed A | +1100 @ 45° +1100@ 135° | Homeotropic Homogeneous | 2 88 | 1300 | +4.3 | 15.0 2.8 |

The hybrid aligned switchable liquid crystal retarder 301 has variable tilt such that for a given material and cell thickness choice, reduced effective birefringence is provided. Thus the retarder design must be adjusted to compensate in comparison to the arrangements wherein the alignment layers are the same. The switchable liquid crystal retarder 330 comprises a first surface alignment layer 441 disposed on a first side of the layer of liquid crystal material 423, and a second surface alignment layer 443 disposed on the second side of the layer of liquid crystal material 423 opposite the first side. The first surface alignment layer 441 is a homeotropic alignment layer arranged to provide homeotropic alignment in the adjacent liquid crystal material 423 and the second surface alignment layer 443 is a homogeneous alignment layer arranged to provide homogeneous alignment in the adjacent liquid crystal material 423.

Further, the optimum designs of retarders are related to the relative location of the passive compensation retarder 330 with respect to the homeotropic and homogeneous alignment layers.

Figure 19A:
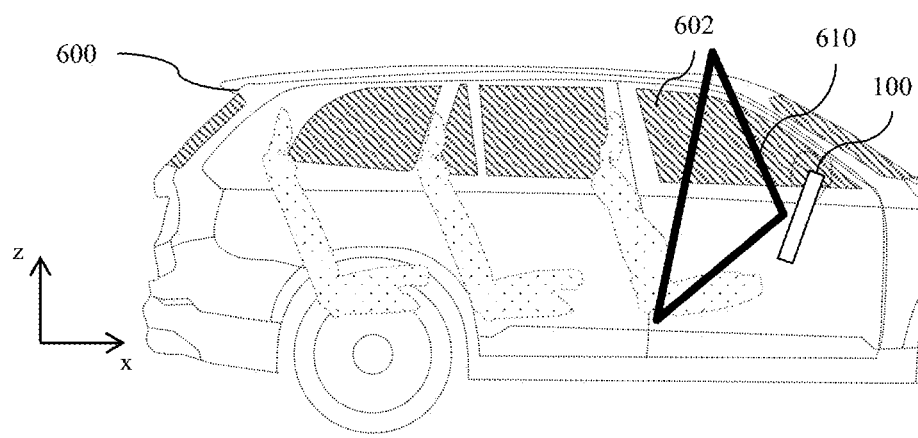
FIG. 19A is a schematic diagram illustrating in side view an automotive vehicle with a switchable directional display arranged within the vehicle cabin for both entertainment and sharing modes of operation.

When the surface alignment layer 443 arranged to provide homogeneous alignment is between the layer of liquid crystal material 423 and the compensation retarder 330, the layer of liquid crystal material 423 has a retardance for light of a wavelength of 550 nm in a range from 500 nm to 1800 nm, preferably in a range from 700 nm to 1500 nm and most preferably in a range from 900 nm to 1350 nm. When the surface alignment layer 443 arranged to provide homogeneous alignment is between the layer of liquid crystal material 423 and the compensation retarder 330, the passive compensation retarder may comprise a retarder 330 having its optical axis perpendicular to the plane of the retarder as shown in FIG. 19A, the passive retarder 330 having a retardance for light of a wavelength of 550 nm in a range from −300 nm to −1600 nm, preferably in a range from −500 nm to −1300 nm and most preferably in a range from −700 nm to −1150 nm; or alternatively the passive compensation retarder may comprise a pair of retarders (not shown) which have optical axes in the plane of the retarders that are crossed, each retarder of the pair of retarders having a retardance for light of a wavelength of 550 nm in a range from 400 nm to 1600 nm, preferably in a range from 600 nm to 1400 nm and most preferably in a range from 800 nm to 1300 nm.

When the surface alignment layer 441 arranged to provide homeotropic alignment is between the layer of liquid crystal material 423 and the compensation retarder 330, the layer of liquid crystal material 423 has a retardance for light of a wavelength of 550 nm in a range from 700 nm to 2000 nm, preferably in a range from 1000 nm to 1700 nm and most preferably in a range from 1200 nm to 1500 nm. When the surface alignment layer 441 arranged to provide homeotropic alignment is between the layer of liquid crystal material 423 and the compensation retarder 330, the passive compensation retarder may comprise a retarder 330 having its optical axis perpendicular to the plane of the retarder as shown in FIG. 19A, the passive retarder having a retardance for light of a wavelength of 550 nm in a range from −400 nm to −1800 nm, preferably in a range from −700 nm to −1500 nm and most preferably in a range from −900 nm to −1300 nm; or alternatively the passive compensation retarder may comprise a pair of retarders (not shown) which have optical axes in the plane of the retarders that are crossed, each retarder of the pair of retarders having a retardance for light of a wavelength of 550 nm in a range from 400 nm to 1800 nm, preferably in a range from 700 nm to 1500 nm and most preferably in a range from 900 nm to 1300 nm.

In comparison to the arrangement of FIG. 12, the privacy mode of operation may advantageously achieve increased resilience to the appearance of material flow when the liquid crystal retarder is pressed.

Figure 16A:
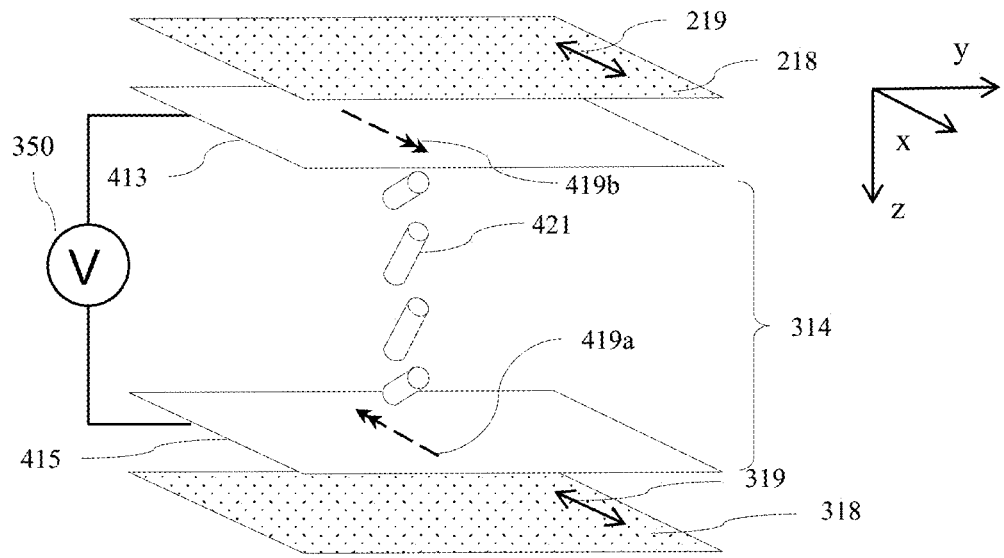
FIG. 16A is a schematic diagram illustrating in perspective side view an arrangement of a switchable liquid crystal retarder comprising homogeneous alignment layers and no compensation retarder in a privacy mode of operation.
Figure 16B:
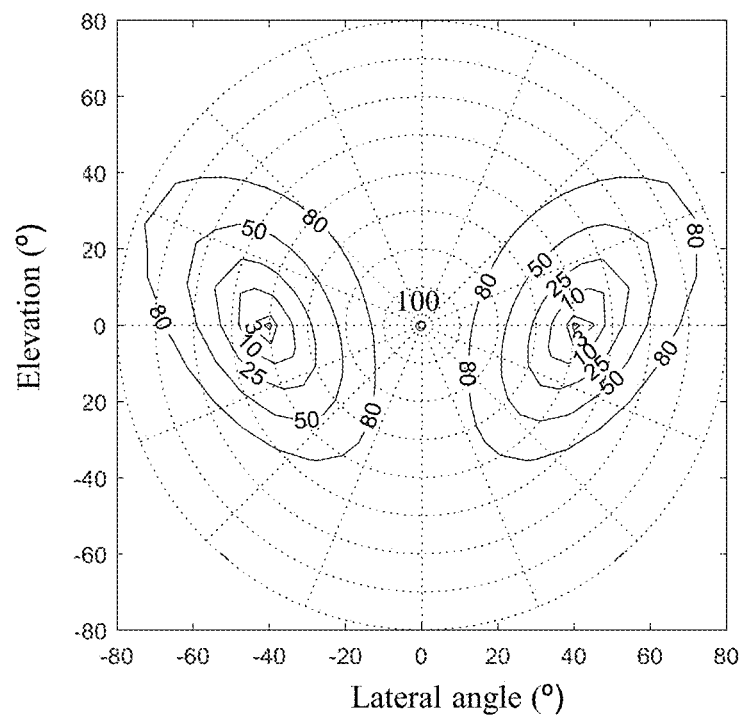
FIG. 16B is a schematic graph illustrating the variation of output transmission with polar direction for the transmitted light rays in FIG. 16A.

FIG. 16A is a schematic diagram illustrating in perspective side view an arrangement of a switchable liquid crystal retarder comprising homogeneous alignment layers and no compensation retarder in a privacy mode of operation; and FIG. 16B is a schematic graph illustrating the variation of output transmission with polar direction for the transmitted light rays in FIG. 16A.

TABLE 6

| Mode | Passive compensation retarder(s) | | Active LC retarder | | | | |
|---|---|---|---|---|---|---|---|
| | Type | Δn.d/nm | Alignment layers | Pretilt/ deg | Δn.d/nm | Δε | Voltage/V |
| Privacy | None | — | Homogeneous | 2 | 750 | +13.2 | 2.3 |
| Wide | | | Homogeneous | 2 | | | 5.0 |
| Wide | | | | | | | 10.0 |

To provide still higher visual security levels in privacy mode it may be desirable to increase the reduction of luminance for off-axis viewing positions.

Figure 17:
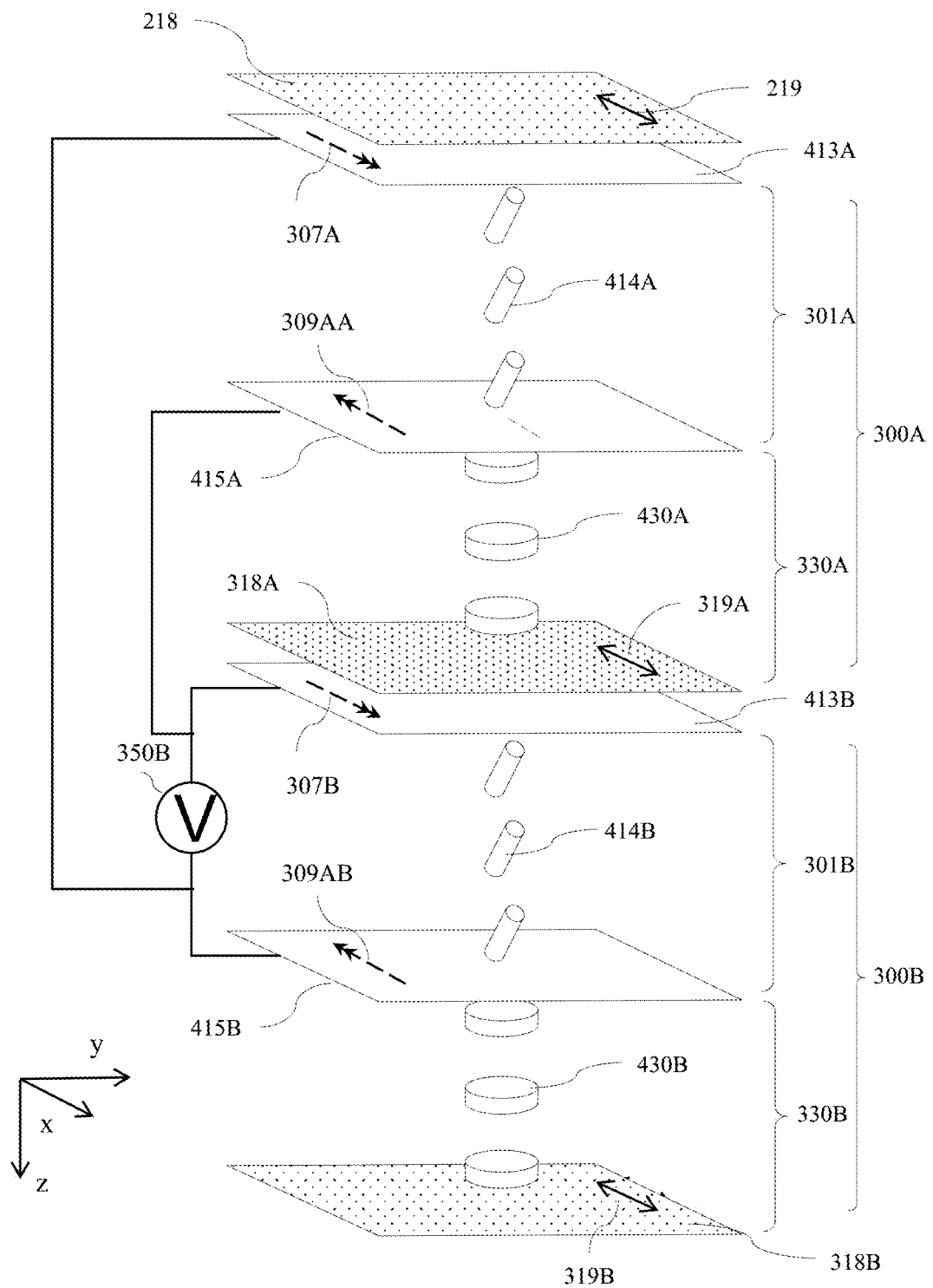
FIG. 17 is a schematic diagram illustrating in perspective side view an arrangement of a switchable compensated retarder in a privacy mode of operation comprising a negative C-plate passive compensation retarder and homeotropically aligned switchable liquid crystal retarder arranged between the output polariser and additional polariser; and a negative C-plate passive compensation retarder and homeotropically aligned switchable liquid crystal retarder arranged between the first-mentioned additional polariser and further additional polariser in a privacy mode of operation.
Figure 18:
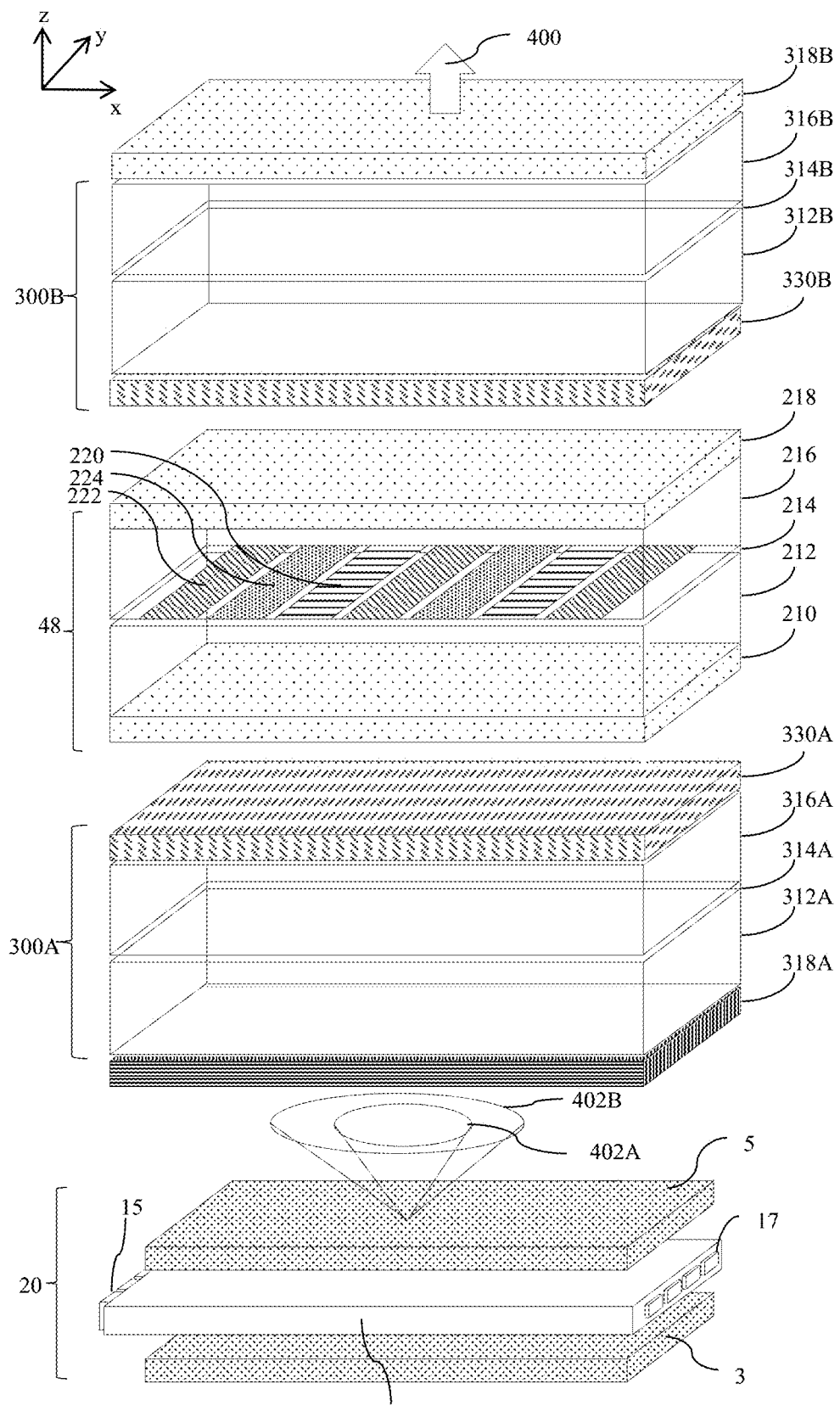
FIG. 18 is a schematic diagram illustrating in perspective side view an arrangement of first switchable compensated retarder arranged on the input of a liquid crystal display and a second switchable compensated retarder arranged on the output of a liquid crystal display comprising a switchable backlight.

FIG. 17 is a schematic diagram illustrating in perspective side view (and noting the reversed view in which the z-axis along which output light is directed is downwards) an arrangement of a switchable retarder in a privacy mode of operation; and FIG. 18 is a schematic diagram illustrating in perspective side view an arrangement of first switchable compensated retarder arranged on the input of a liquid crystal display and a second switchable compensated retarder arranged on the output of a liquid crystal display.

The arrangement comprises: a first switchable compensated retarder 300A (in this case, a negative C-plate passive compensation retarder 330A and homeotropically aligned switchable liquid crystal retarder 301A, but this is merely an example and may be replaced by any of the other arrangements of plural retarders disclosed herein) arranged between the output display polariser 218 and an additional polariser 318A; and a further switchable compensated retarder 300B (in this case, a negative C-plate passive compensation retarder 330B and homeotropically aligned switchable liquid crystal retarder 301B, but this is merely an example and may be replaced by any of the other arrangements of plural retarders disclosed herein) arranged between the first-mentioned additional polariser 318A and a further additional polariser 318B with electric vector transmission direction 319B.

The first-mentioned additional polariser 318A is arranged on the input side of the input display polariser 210 between the input display polariser 210 and the backlight 20, and the display device further comprises: a further additional polariser 318B arranged on the output side of the output display polariser 218; and further retarders 301B, 330B arranged between the further additional polariser 318B and the output display polariser 218. The further retarders comprise a further switchable liquid crystal retarder 301B comprising a layer of liquid crystal material 414B and electrodes 413B, 415B on opposite sides of the layer of liquid crystal material 414B, the layer of liquid crystal material 414B being switchable between two orientation states by means of a voltage being applied across the electrodes 413B, 415B.

In other words the display device 100 further comprises a further additional polariser 318B arranged either on the input side of the input display polariser 210 between the first-mentioned additional polariser 318A and the backlight 20 in the case that the first-mentioned additional polariser 318A is arranged on the input side of the input display polariser 210, or on the output side of the first-mentioned additional polariser 318A in the case that the first-mentioned additional polariser 318A is arranged on the output side of the output display polariser 218; and at least one further retarder 300B arranged between the further additional polariser 318B and the first-mentioned additional polariser 318A in the case that the first-mentioned additional polariser 318A is arranged on the input side of the input display polariser 210 or between the further additional polariser 318B and the first-mentioned additional polariser 318A in the case that the first-mentioned additional polariser 318A is arranged on the output side of the output display polariser 218, wherein the at least one further retarder 300B comprises at least one passive compensation retarder 300B. The at least one further retarder 300B may comprise a further switchable liquid crystal retarder 301B comprising a layer of liquid crystal material 314B and electrodes on opposite sides of the layer of liquid crystal material, the layer of liquid crystal material being switchable between two orientation states by means of a voltage being applied across the electrodes.

As an alternative, the first-mentioned additional polariser 318A may be arranged on the input side of the input display polariser 210, in which case the further additional polariser 318B may be arranged on the input side of the input display polariser 210 between the first-mentioned additional polariser 318A and the backlight 20, and the further switchable compensated retarder 300B may be arranged between the further additional polariser 318B and the first-mentioned additional polariser 318A.

In both of these alternatives, each of the first plural retarders 300A and the further plural retarders 300B are arranged between a respective pair of polarisers and so have an effect similar to that of the corresponding structure in the devices described above.

The pretilt directions 307A, 309AA of the alignment layers of the further switchable liquid crystal retarder 301A may have a component in the plane of the liquid crystal layer that is aligned parallel or antiparallel or orthogonal to the pretilt directions of the alignment layers 307B, 309AB of the first switchable liquid crystal retarder 301B. In a wide mode of operation, both switchable liquid crystal retarders 301A, 301B are driven to provide a wide viewing angle. In a privacy mode of operation, switchable liquid crystal retarders 301B, 301A may cooperate to advantageously achieve increased luminance reduction and thus improved privacy in a single axis.

The retardation provided by the first switchable liquid crystal retarder 301B and further liquid crystal retarders 301A may be different. The switchable liquid crystal retarder 301B and further switchable liquid crystal retarder 301A may be driven by a common voltage and the liquid crystal material 408B in the first switchable liquid crystal retarder 301B may be different to the liquid crystal material 408A in the further switchable liquid crystal retarder 301A. Chromatic variation of the polar luminance profiles illustrated elsewhere herein may be reduced, so that advantageously off-axis color appearance is improved.

Alternatively, switchable liquid crystal retarders 301B, 301A may have orthogonal alignments so that reduced luminance is achieved in both horizontal and vertical directions, to advantageously achieve landscape and portrait privacy operation.

Alternatively, the layers 301A, 301B may be provided with different drive voltages. Advantageously increased control of roll-off of luminance profile may be achieved or switching between landscape and privacy operation may be provided.

The retardance control layer 330B may comprise a passive compensation retarder 330A arranged between the first additional polariser 318A and the further additional polariser 318B. More generally, the switchable liquid crystal retarder 301A may be omitted and a fixed luminance reduction may be provided by passive compensation retarders 330A. For example, luminance reduction in viewing quadrants may be provided by means of layer 330A alone. Advantageously increased area of the polar region for luminance reduction may be achieved. Further, backlights that have a wider angle of illumination output than collimated backlights may be provided, increasing the visibility of the display in wide angle mode of operation.

In the case that the first-mentioned additional polariser 318A or further additional polariser 318B is arranged on the input side of the input display polariser 210, the first-mentioned additional polariser 318A or further additional polariser 318B may be a reflective polariser.

Advantageously the privacy mode may have reduced luminance for off-axis viewing positions in comparison with the previous arrangements. Visual security level, V may be increased in privacy mode and image visibility may be increased in wide angle mode for off-axis observers.

It may be desirable to provide controllable display illumination in an automotive vehicle.

FIG. 19A is a schematic diagram illustrating in side view an automotive vehicle with a switchable directional display 100 arranged within the vehicle cabin 602 of an automotive vehicle 600 for both entertainment and sharing modes of operation. Light cone 610 (for example representing the cone of light within which the luminance is greater than 50% of the peak luminance) may be provided by the luminance distribution of the display 100 in the elevation direction and is not switchable.

Figure 19B:
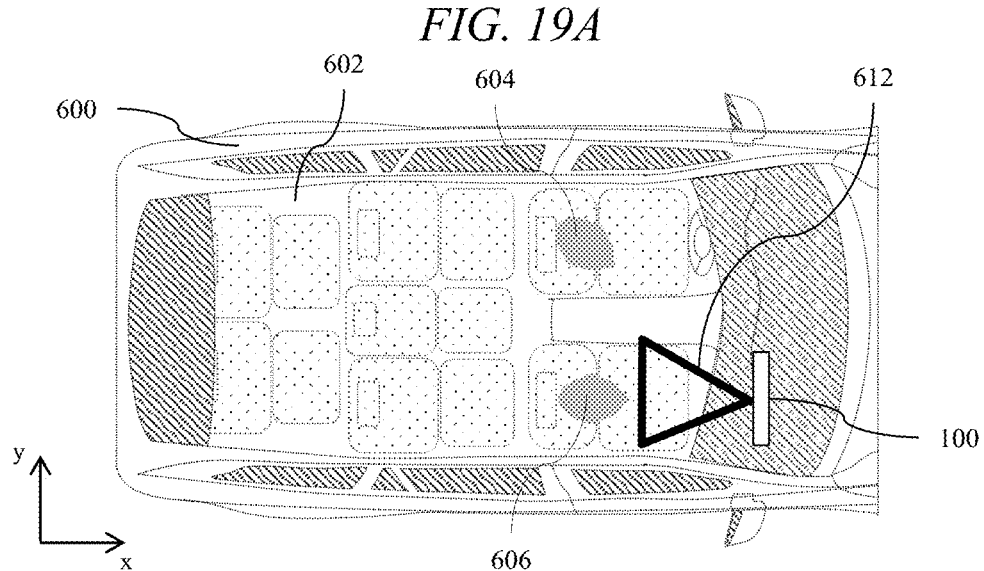
FIG. 19B is a schematic diagram illustrating in top view an automotive vehicle with a switchable directional display arranged within the vehicle cabin in an entertainment mode of operation.

FIG. 19B is a schematic diagram illustrating in top view an automotive vehicle with a switchable directional display 100 arranged within the vehicle cabin 602 in an entertainment mode of operation and operates in a similar manner to a privacy display. Light cone 612 is provided with a narrow angular range such that passenger 606 may see the display 100 whereas driver 604 may not see an image on the display 100. Advantageously entertainment images may be displayed to the passenger 606 without distraction to the driver 604.

Figure 19C:
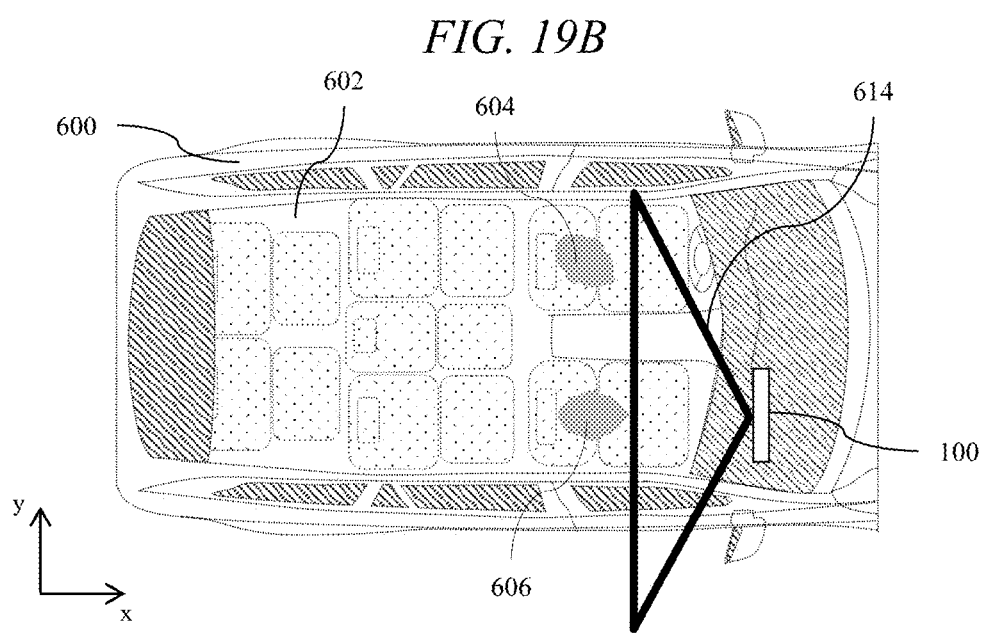
FIG. 19C is a schematic diagram illustrating in top view an automotive vehicle with a switchable directional display arranged within the vehicle cabin in a sharing mode of operation.

FIG. 19C is a schematic diagram illustrating in top view an automotive vehicle with a switchable directional display 100 arranged within the vehicle cabin 602 in a sharing mode of operation. Light cone 614 is provided with a wide angular range such that all occupants may perceive an image on the display 100, for example when the display is not in motion or when non-distracting images are provided.

Figure 20A:
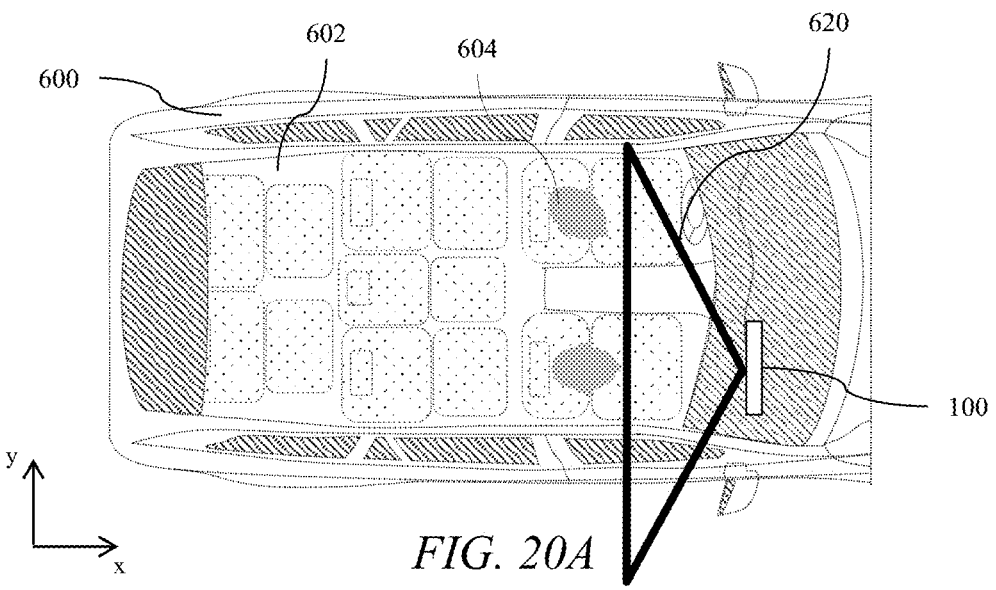
FIG. 20A is a schematic diagram illustrating in top view an automotive vehicle with a switchable directional display arranged within the vehicle cabin for both night-time and day-time modes of operation.

FIG. 20A is a schematic diagram illustrating in top view an automotive vehicle with a switchable directional display 100 arranged within the vehicle cabin 602 for both night-time and day-time modes of operation. In comparison to the arrangements of FIGS. 19A-C, the optical output is rotated so that the display elevation direction is along an axis between the driver 604 and passenger 606 locations. Light cone 620 illuminates both driver 604 and passenger 606.

Figure 20B:
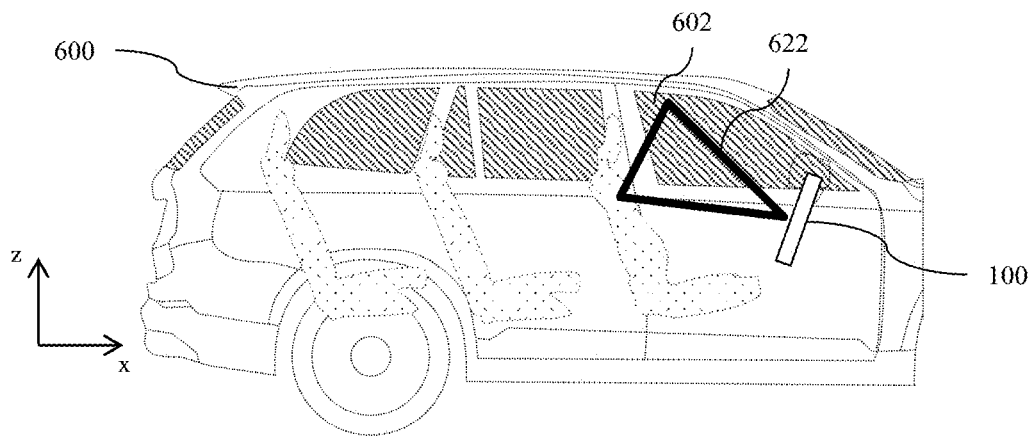
FIG. 20B is a schematic diagram illustrating in side view an automotive vehicle with a switchable directional display arranged within the vehicle cabin in a night-time mode of operation.

FIG. 20B is a schematic diagram illustrating in side view an automotive vehicle with a switchable directional display 100 arranged within the vehicle cabin 602 in a night-time mode of operation. Thus the display may provide a narrow angular output light cone 622. Stray light that illuminates internal surfaces and occupants of the vehicle cabin 602 and cause distraction to driver 604 may advantageously be substantially reduced. Both driver 604 and passenger 606 may advantageously be able to observe the displayed images.

Figure 20C:
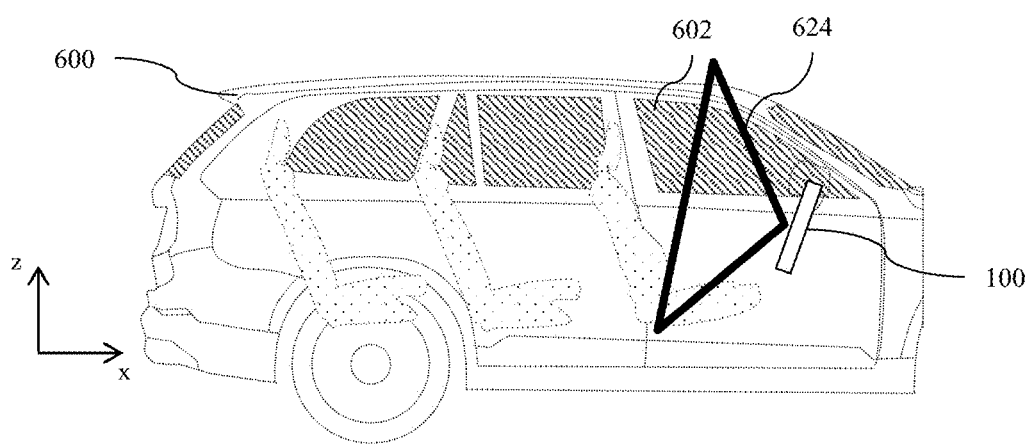
FIG. 20C is a schematic diagram illustrating in side view an automotive vehicle with a switchable directional display arranged within the vehicle cabin in a day-time mode of operation.

FIG. 20C is a schematic diagram illustrating in side view an automotive vehicle with a switchable directional display 100 arranged within the vehicle cabin 602 in a day-time mode of operation. Thus the display may provide a narrow angular output light cone 624. Advantageously the display may be conveniently observed by all cabin 602 occupants.

It would be desirable in wide angle mode to provide a solid angular output that is greater than that for privacy mode operation.

Figure 21:
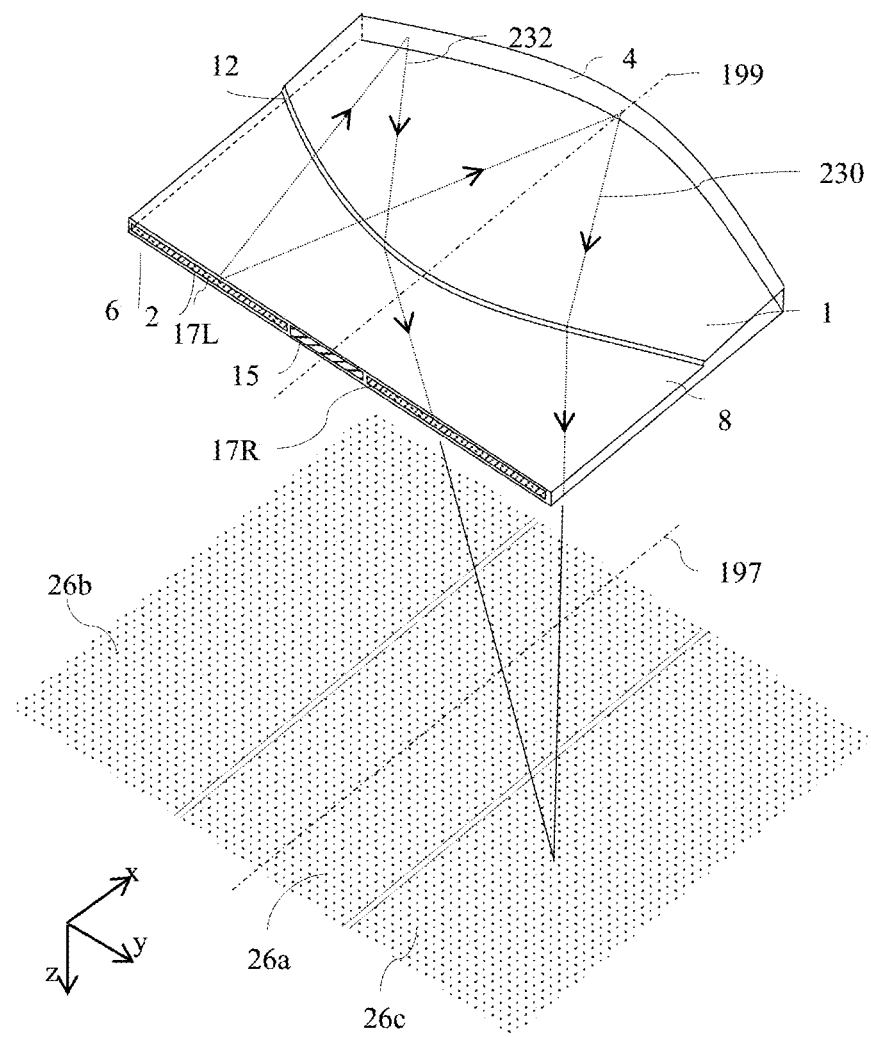
FIG. 21 is a schematic diagram illustrating in rear perspective view operation of an imaging waveguide in a wide angle mode of operation.
Figure 22:
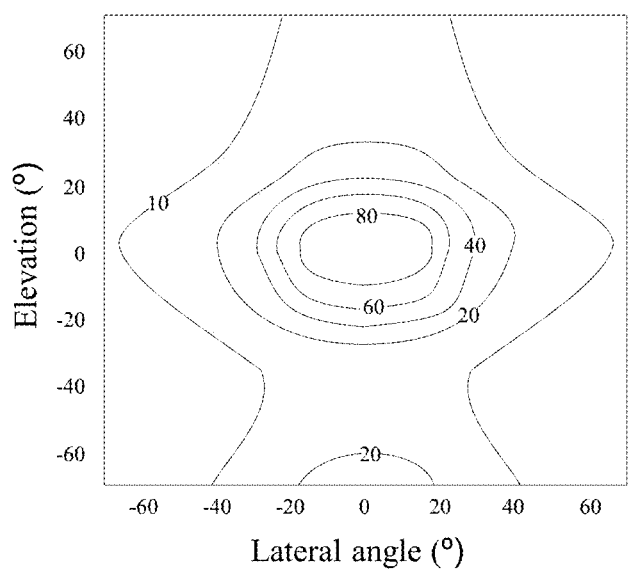
FIG. 22 is a schematic graph illustrating field-of-view luminance plot of the output of FIG. 21.

FIG. 21 is a schematic diagram illustrating in rear perspective view operation of an imaging waveguide in a narrow angle mode of operation; and FIG. 22 is a schematic graph illustrating field-of-view luminance plot of the output of FIG. 21.

In the first operating mode, the sets 17L and 17R of light sources that are arranged in the input side 2 of the imaging waveguide 1 are illuminated. Such an arrangement provides optical windows 26b that are outside the region of optical windows 26a and thus provide increased solid angular extent of the light cone from the display, particularly in the lateral direction. Advantageously the image visibility to an off-axis observer is increased as described above with reference to FIGS. 1B and 1F.

Advantageously as described with reference to FIG. 3A, such waveguides can achieve very high levels of visual image security, V to snoopers and further may provide a high solid angular extent in wide angle mode to achieve high levels of image visibility, W for off-axis viewers.

It may be desirable to reduce the backlight 20 thickness.

Figure 23:
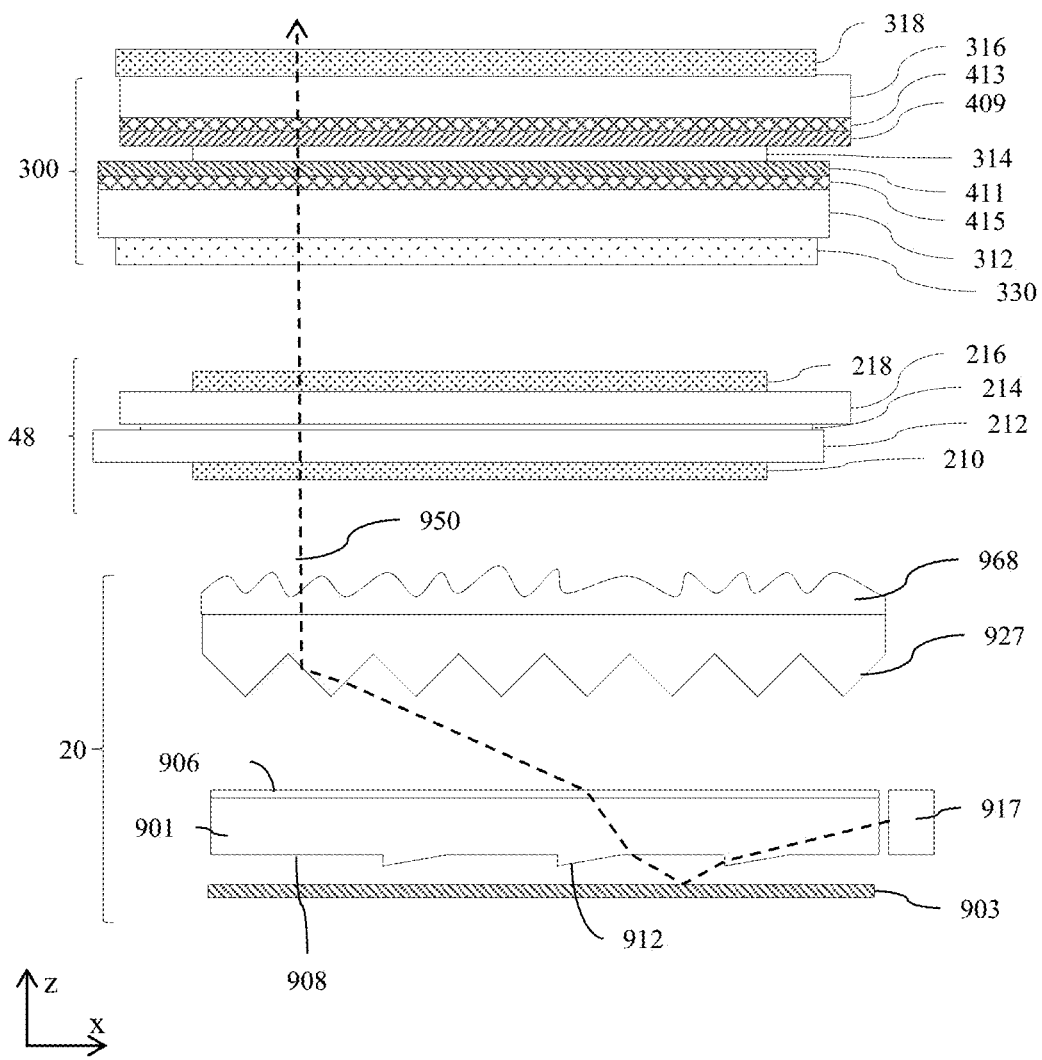
FIG. 23 is a schematic diagram illustrating in side view a switchable directional display apparatus comprising a switchable collimating waveguide and a switchable liquid crystal retarder operating in a wide angle mode of operation.
Figure 24:
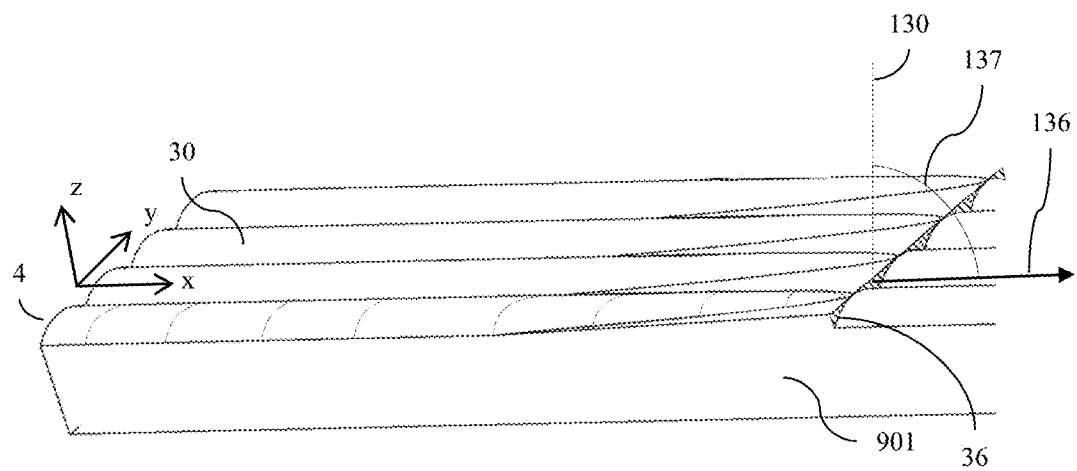
FIG. 24 is a schematic diagram illustrating in side view a non-inclined lenticular surface of an optical waveguide.

FIG. 23 is a schematic diagram illustrating in side view a switchable directional display apparatus comprising a switchable collimating waveguide and a switchable liquid crystal retarder operating in a wide angle mode of operation; and FIG. 24 is a schematic diagram illustrating in side view a non-inclined lenticular surface of an optical waveguide.

Returning to the waveguide 901 of FIGS. 9A-9F in an illustrative embodiment, the tilt angle 137 may be 88 degrees. More generally in an optical waveguide 901 of the type illustrated in FIG. 1A, the tilt angle 137 in the longitudinal direction of the second plurality of inclined light extraction features 36 may be between 80 degrees and 90 degrees, and preferably between 85 degrees and 90 degrees.

The operation of the waveguide 901 in wide angle mode of operation will now be described.

Figures 25A, 25B, 25C:
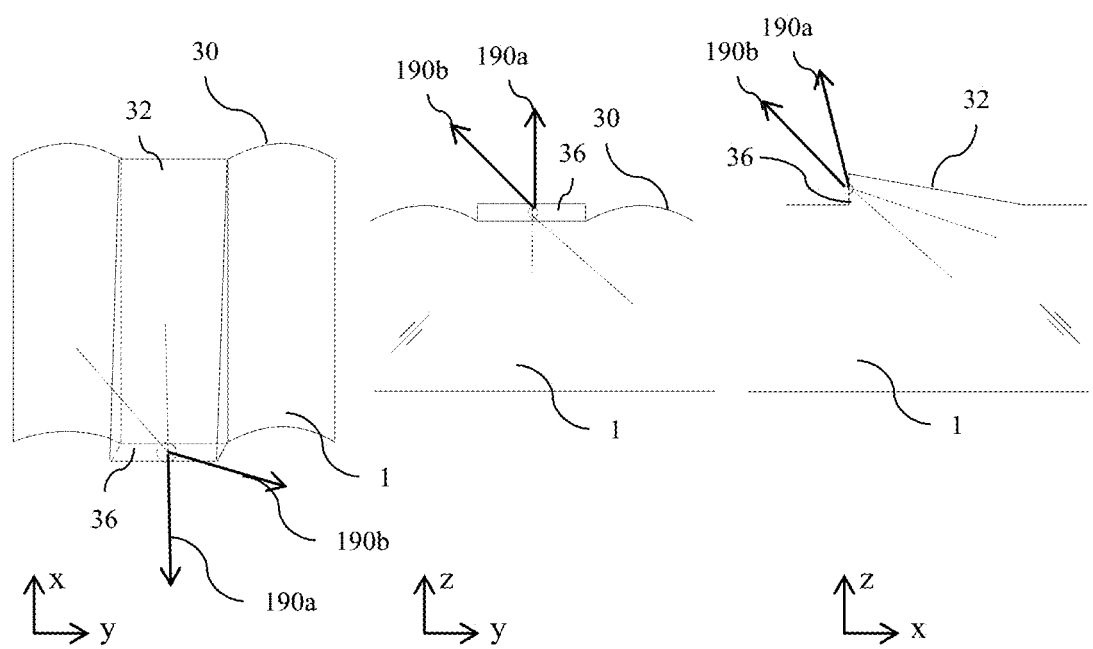
FIG. 25A, FIG. 25B, and FIG. 25C are schematic diagrams illustrating views of propagation of output light from a spatial light modulator through the optical stack of FIG. 23 in a wide angle mode of operation.

FIG. 25A is a schematic diagram illustrating in top view operation of an inclined planar feature 36 for light from the second input end; FIG. 25B is a schematic diagram illustrating in end view operation of an inclined planar feature for light from the second input end; and FIG. 25C is a schematic diagram illustrating in side view operation of an inclined planar feature for light from the second input end.

In comparison to FIG. 8J, light rays 190a, 190b incident on the extraction feature 36 are directed with a wide angular spread by refraction at the interface.

The extraction from the features 36 is in proximity to the light turning film 5 and not onto rear reflector 3. Efficiency of extraction is improved because of increased Fresnel reflections that would otherwise be present if the extraction was from the first guiding surface 8. Advantageously efficiency of wide angle output is enhanced.

Figure 26:
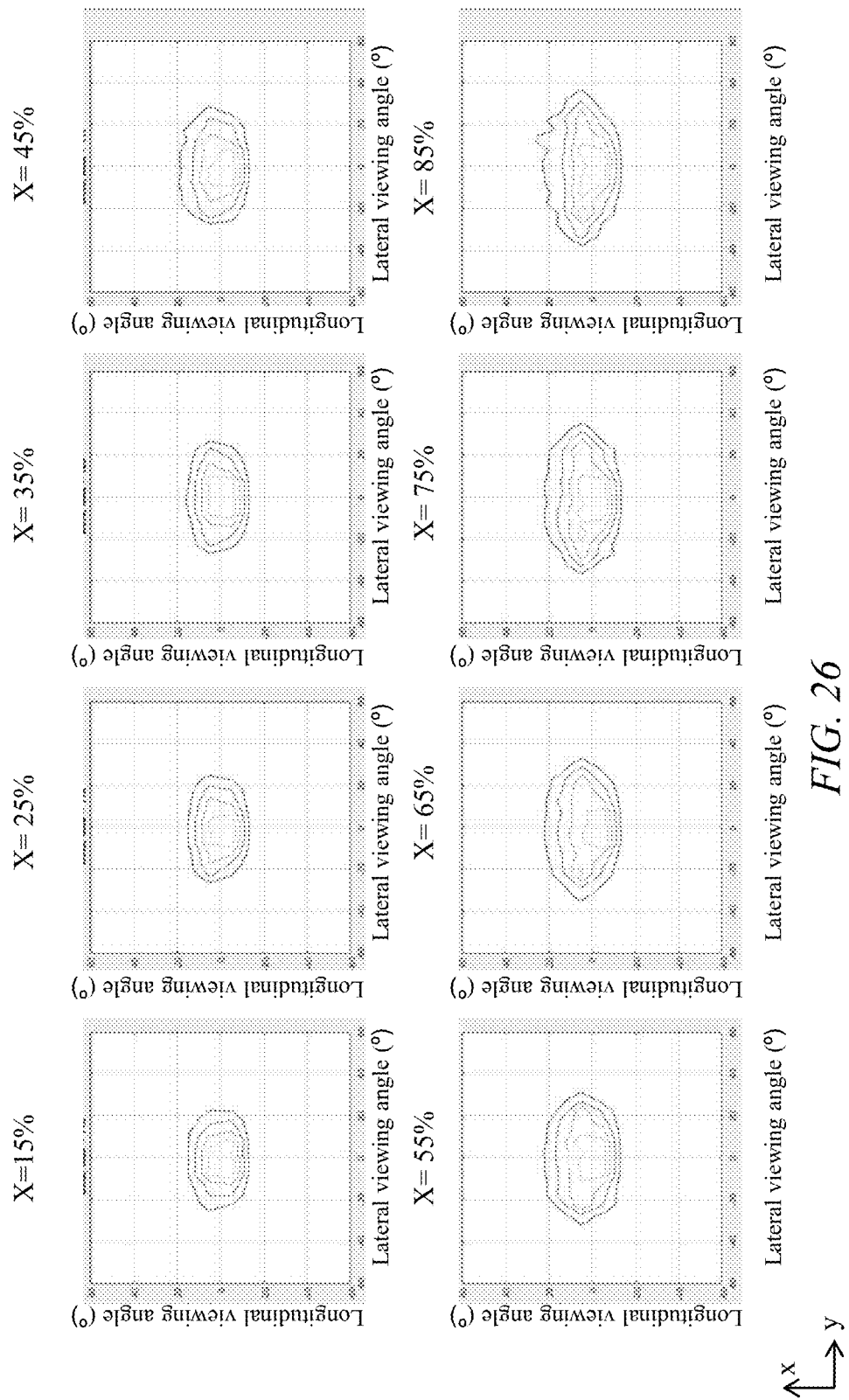
FIG. 26 is a schematic graph illustrating iso-luminance field-of-view polar plots for different positions across a backlight comprising an optical waveguide of FIG. 24 and light turning film of FIGS. 6A-6B when light is input into the second end of the optical waveguide.

FIG. 26 is a schematic graph illustrating iso-luminance field-of-view polar plots for different positions across a backlight comprising an optical waveguide of FIG. 24 and light turning film of FIGS. 6A-6B when light is input into the second end of the optical waveguide. A wide angular output is achieved in the lateral direction.

Angular output in the elevation direction can be increased, for example by vertical diffusers.

Advantageously an optical waveguide 901 with a switchable wide angular solid angular extent may be provided. Such a backlight 20 may be thinner than a backlight 20 comprising an imaging waveguide 1. High levels of image visibility, W may be achieved in wide angle mode for off-axis users.

The operation of switchable retarder 301 in wide angle mode will now be described.

Figure 27A:
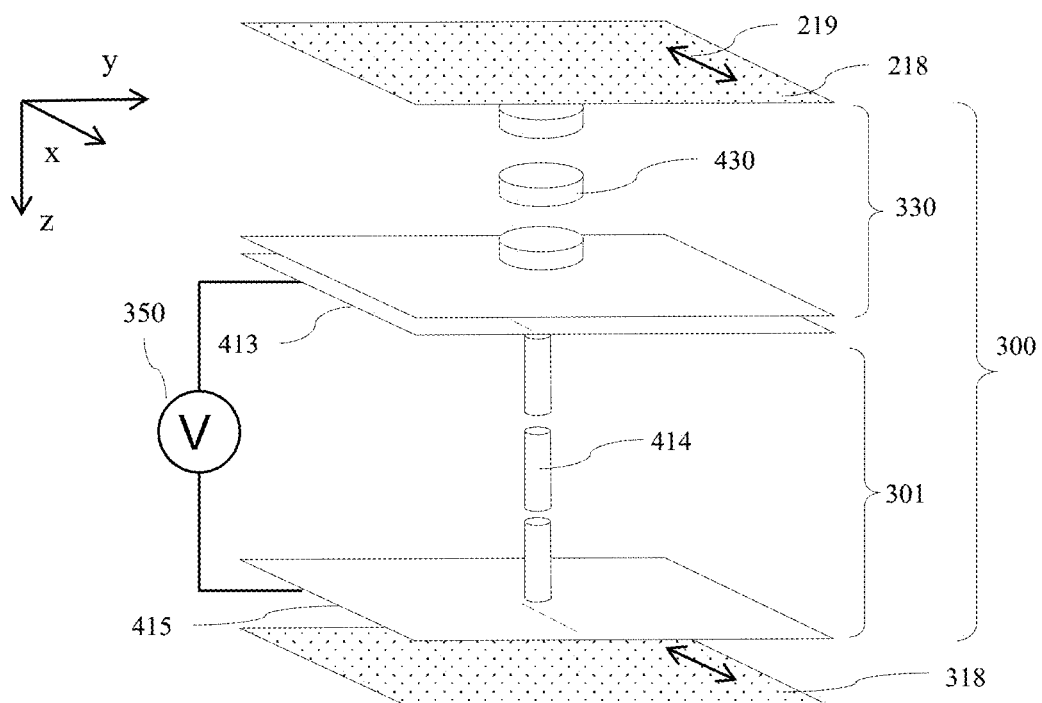
FIG. 27A is a schematic diagram illustrating in perspective side view an arrangement of a switchable compensated retarder comprising a negative C-plate and a switchable liquid crystal retarder comprising homeotropic alignment layers in wide angle mode of operation.

FIG. 27A is a schematic diagram illustrating in perspective side view an arrangement of a switchable compensated retarder comprising a negative C-plate and a switchable liquid crystal retarder comprising homeotropic alignment layers in wide angle mode of operation. In such an arrangement, the control voltage may be zero volts. This is merely an example and may be replaced by any of the other arrangements of plural retarders disclosed herein. In other embodiments a drive voltage may be arranged to provide substantially homeotropic alignment of at least some of liquid crystal material 414 within the liquid crystal retarder 301. Further the retarder arrangement of FIG. 27A is merely an example and may be replaced by any of the other arrangements of plural retarders disclosed herein.

The operation of the switchable retarder in wide angle mode will now be described.

Figure 27B:
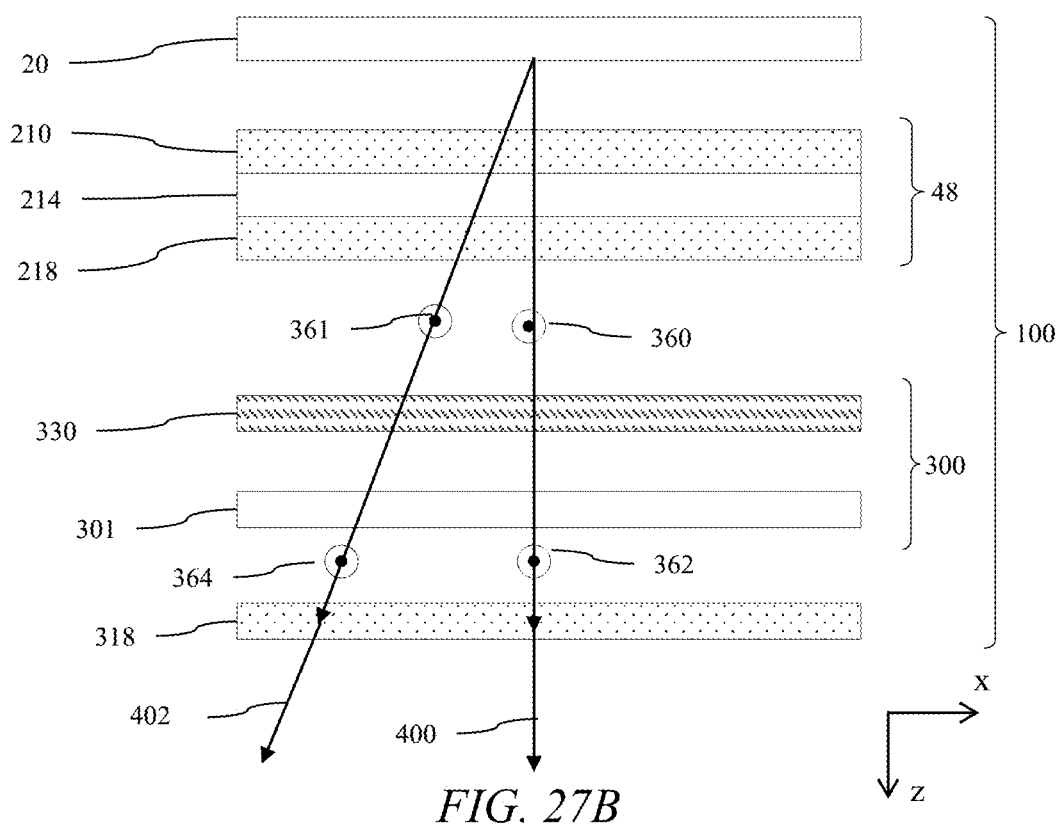
FIG. 27B is a schematic diagram illustrating in side view propagation of output light from a spatial light modulator through the switchable retarder of FIG. 1A in a wide angle mode of operation.

FIG. 27B is a schematic diagram illustrating in side view propagation of output light from a spatial light modulator through the switchable retarder of FIG. 1A in a wide angle mode of operation.

An ideal compensated switchable retarder 300 comprises compensation retarder 330 in combination with a variable switchable liquid crystal retarder 301 wherein the dielectric constants, anisotropy and dispersion of anisotropy of the compensation retarder 330 have the equal and opposite dielectric constants, anisotropy and dispersion of anisotropy to that of the layer 314. The retardance of the passive compensation retarder 330 is equal and opposite to the retardance of the switchable liquid crystal retarder 301.

Such an ideal compensated switchable retarder achieves compensation for transmitted light in a first wide angle state of the layer 314 of liquid crystal material 414 for all polar angles; and narrow field of view in a lateral direction in a second privacy state of the switchable liquid crystal retarder 301.

Further the optical axis of compensation retarder 330 has the same direction as that of the optical axis of the liquid crystal retarder 301 in its wide angle state. Such a compensation retarder 330 cancels out the retardation of the liquid crystal retarder for all viewing angles, and provides an ideal wide angle viewing state with no loss of luminance for all viewing directions.

The wide angle transmission polar profile for non-ideal material selections will now be described.

The illustrative embodiments of the present disclosure illustrate compensation retarders 330 that may not exactly compensate the retardation of the switchable liquid crystal retarder 301 because of small differences in material properties that are typical for the retarders 330, 301. However, advantageously such deviations are small and high performance wide and narrow angle states can be achieved with such deviations that may be close to ideal performance.

Thus when the switchable liquid crystal retarder 301 is in a first state of said two states, the switchable compensated retarder 300 provides no overall transformation of polarisation component 360, 361 to output light rays 400 passing therethrough perpendicular to the plane of the switchable retarder or at an acute angle to the perpendicular to the plane of the switchable retarder, such as for light rays 402.

Polarisation component 362 is substantially the same as polarisation component 360 and polarisation component 364 is substantially the same as polarisation component 361. Thus the angular transmission profile is substantially uniformly transmitting across a wide polar region.

In other words, when the layer of liquid crystal material 414 is in the first orientation state of said two orientation states, the plural retarders 330, 301 provide no overall retardance to light passing therethrough perpendicular to the plane of the retarders or at an acute angle to the perpendicular to the plane of the retarders 330, 301.

Advantageously the variation of display luminance with viewing angle in the first state is substantially unmodified. Multiple users may conveniently view the display from a wide range of viewing angles.

Illustrative examples of polar transmission profiles in wide angle mode will now be described.

Figure 28A:
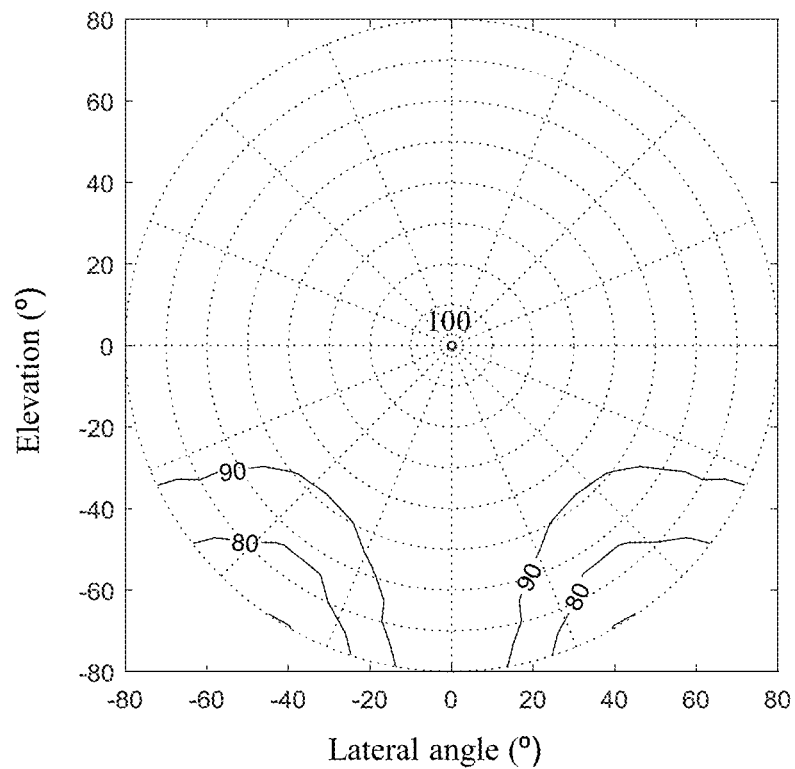
FIG. 28A is a schematic graph illustrating the variation of output transmission with polar direction for the transmitted light rays in FIG. 12 with a different voltage setting.
Figure 28B:
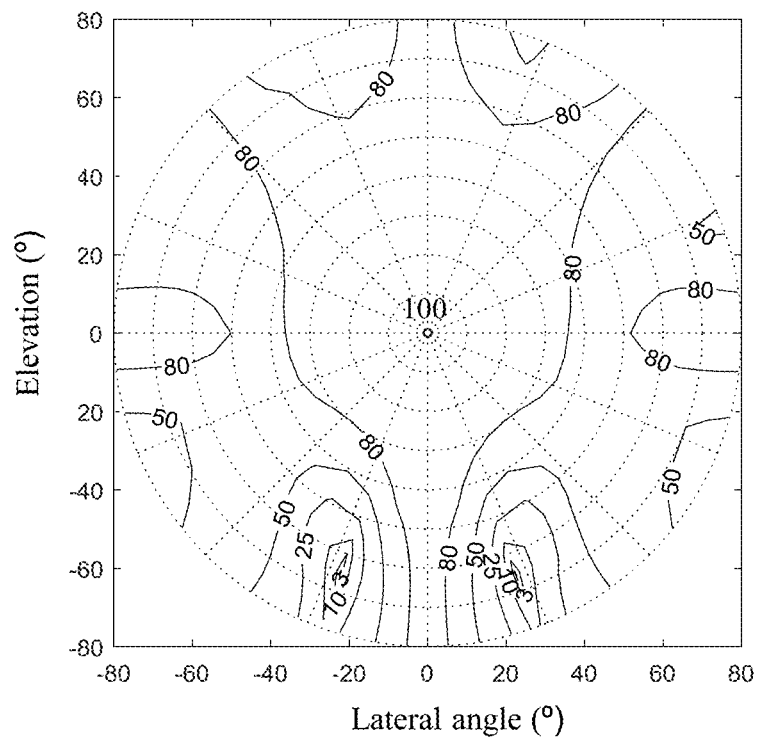
FIG. 28B is a schematic graph illustrating the variation of output transmission with polar direction for the transmitted light rays in FIG. 14A with a different voltage setting.
Figure 28C:
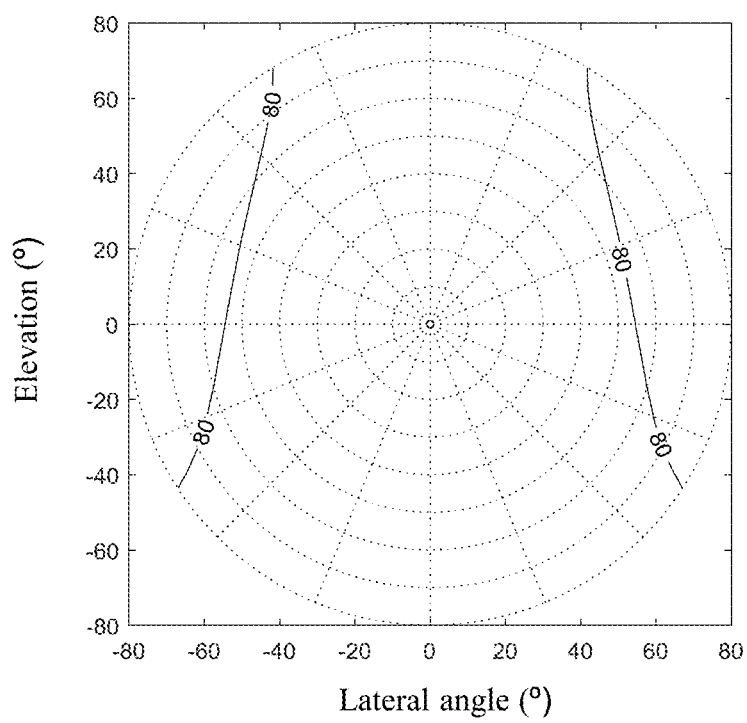
FIG. 28C is a schematic graph illustrating the variation of output transmission with polar direction for the transmitted light rays in FIG. 15A with a different voltage setting.

FIG. 28A is a schematic graph illustrating the variation of output transmission with polar direction for the transmitted light rays in FIG. 12 and according to TABLE 1 with a different voltage setting; FIG. 28B is a schematic graph illustrating the variation of output transmission with polar direction for the transmitted light rays in FIG. 14A and according to TABLE 3 with a different voltage setting; and FIG. 28C is a schematic graph illustrating the variation of output transmission with polar direction for the transmitted light rays in FIG. 15A and according to TABLE 5 with a different voltage setting.

These are merely examples of wide angle profiles from the various embodiments and may be replaced by any of the other arrangements of plural retarders disclosed herein. Thus low luminance roll-off is provided in wide angle mode by the switchable liquid crystal retarders of the embodiment described herein.

Advantageously high image visibility, W may be provided for display users in off-axis viewing positions while achieving comfortable head-on luminance for the centrally located display user.

The operation of retarder layers between parallel polarisers for off-axis illumination will now be described further. In the various devices described above, retarders are arranged between a pair of polarisers (typically the additional polariser 318 and one of the input polariser 210 and output polariser 218) in various different configurations. In each case, the retarders are configured so that they not affect the luminance of light passing through the pair of polarisers and the plural retarders along an axis along a normal to the plane of the retarders but they do reduce the luminance of light passing through the pair of polarisers and the plural retarders along an axis inclined to a normal to the plane of the retarders, at least in one of the switchable states of the compensated switchable liquid crystal retarder 300. There will now be given a description of this effect in more detail, the principles of which may be applied in general to all of the devices described above.

Figure 29A:
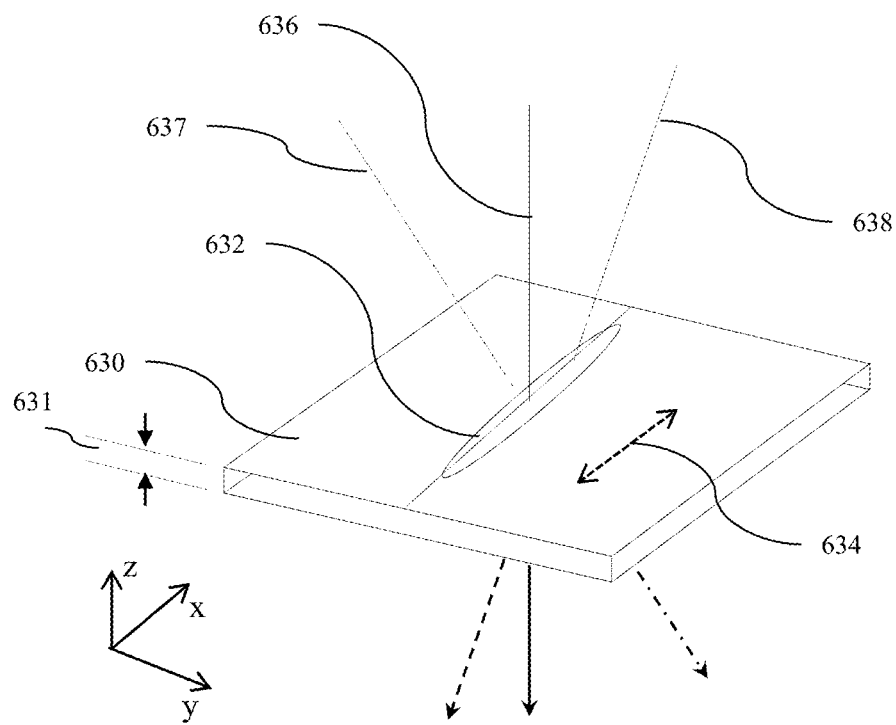
FIG. 29A is a schematic diagram illustrating in perspective view illumination of a retarder layer by off-axis light.

FIG. 29A is a schematic diagram illustrating in perspective view illumination of a retarder layer by off-axis light. Correction retarder 630 may comprise birefringent material, represented by refractive index ellipsoid 632 with optical axis direction 634 at 0 degrees to the x-axis, and have a thickness 631. Normal light rays 636 propagate so that the path length in the material is the same as the thickness 631. Light rays 637 are in the y-z plane have an increased path length; however the birefringence of the material is substantially the same as the rays 636. By way of comparison light rays 638 that are in the x-z plane have an increased path length in the birefringent material, and further the birefringence is different to the normal ray 636.

The retardance of the retarder 630 is thus dependent on the angle of incidence of the respective ray, and also the plane of incidence, that is rays 638 in the x-z will have a retardance different from the normal rays 636 and the rays 637 in the y-z plane.

The interaction of polarized light with the retarder 630 will now be described. To distinguish from the first and second polarization components during operation in a directional backlight 101, the following explanation will refer to third and fourth polarization components.

Figure 29B:
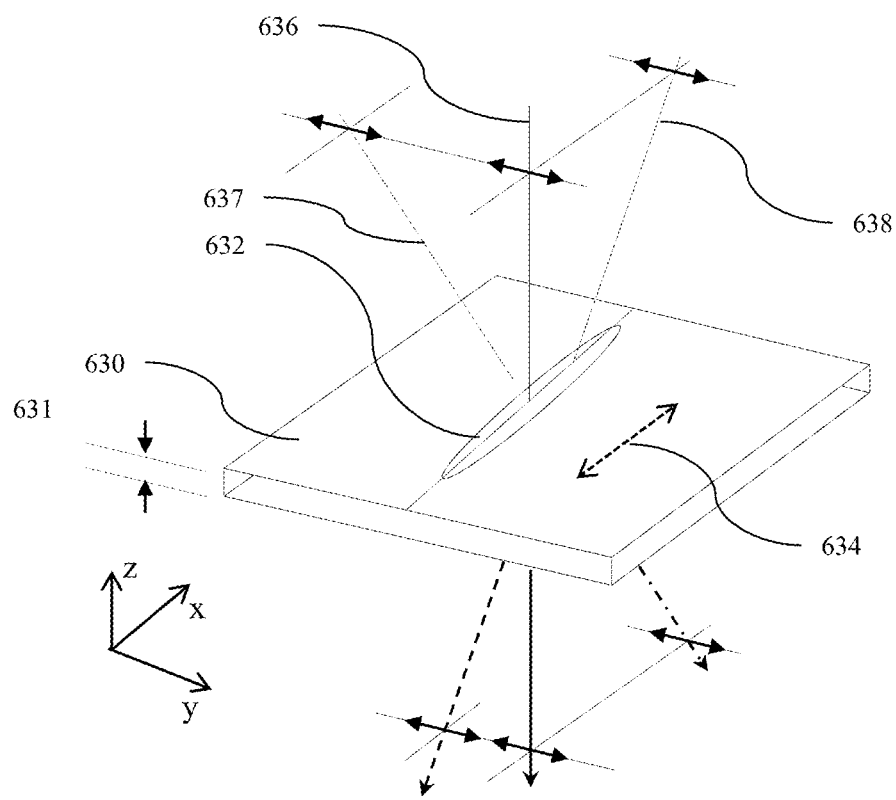
FIG. 29B is a schematic diagram illustrating in perspective view illumination of a retarder layer by off-axis light of a first linear polarization state at 0 degrees.
Figure 29C:
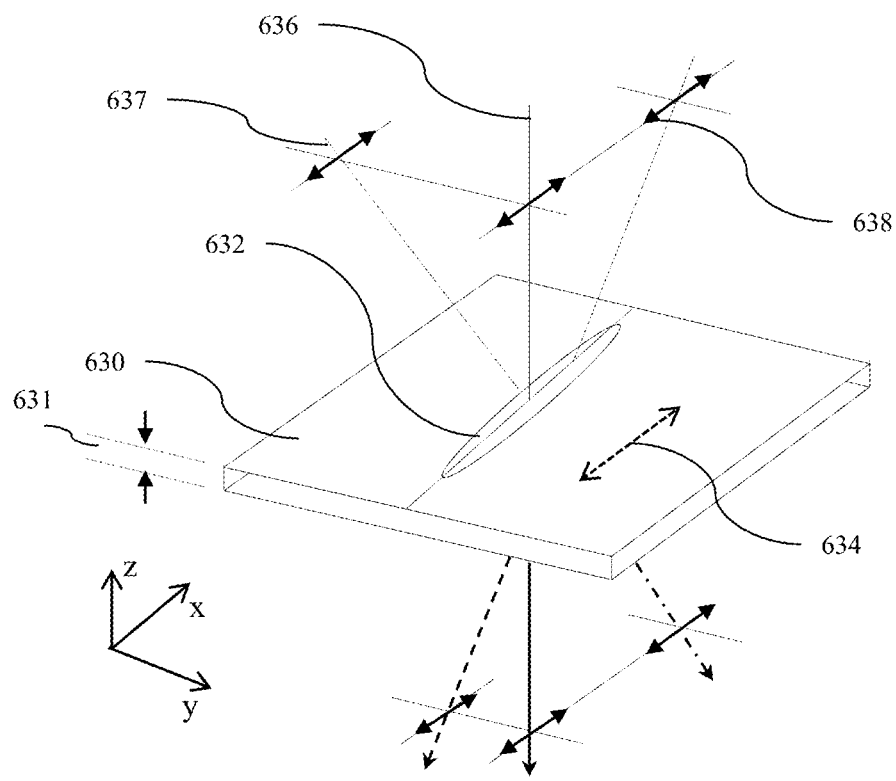
FIG. 29C is a schematic diagram illustrating in perspective view illumination of a retarder layer by off-axis light of a first linear polarization state at 90 degrees.

FIG. 29B is a schematic diagram illustrating in perspective view illumination of a retarder layer by off-axis light of a third linear polarization state at 90 degrees to the x-axis and FIG. 29C is a schematic diagram illustrating in perspective view illumination of a retarder layer by off-axis light of a fourth linear polarization state at 0 degrees to the x-axis. In such arrangements, the incident linear polarization states are aligned to the optical axes of the birefringent material, represented by ellipse 632. Consequently, no phase difference between the third and fourth orthogonal polarization components is provided, and there is no resultant change of the polarization state of the linearly polarized input for each ray 636, 637, 638. Thus, the retarder 630 introduces no phase shift to polarisation components of light passed by the polariser on the input side of the retarder 630 along an axis along a normal to the plane of the retarder 630. Accordingly, the retarder 630 does not affect the luminance of light passing through the retarder 630 and polarisers (not shown) on each side of the retarder 630. Although FIGS. 29A-C relate specifically to the retarder 630 that is passive, a similar effect is achieved by a switchable liquid crystal retarder and by plural retarders in the devices described above.

Figure 29D:
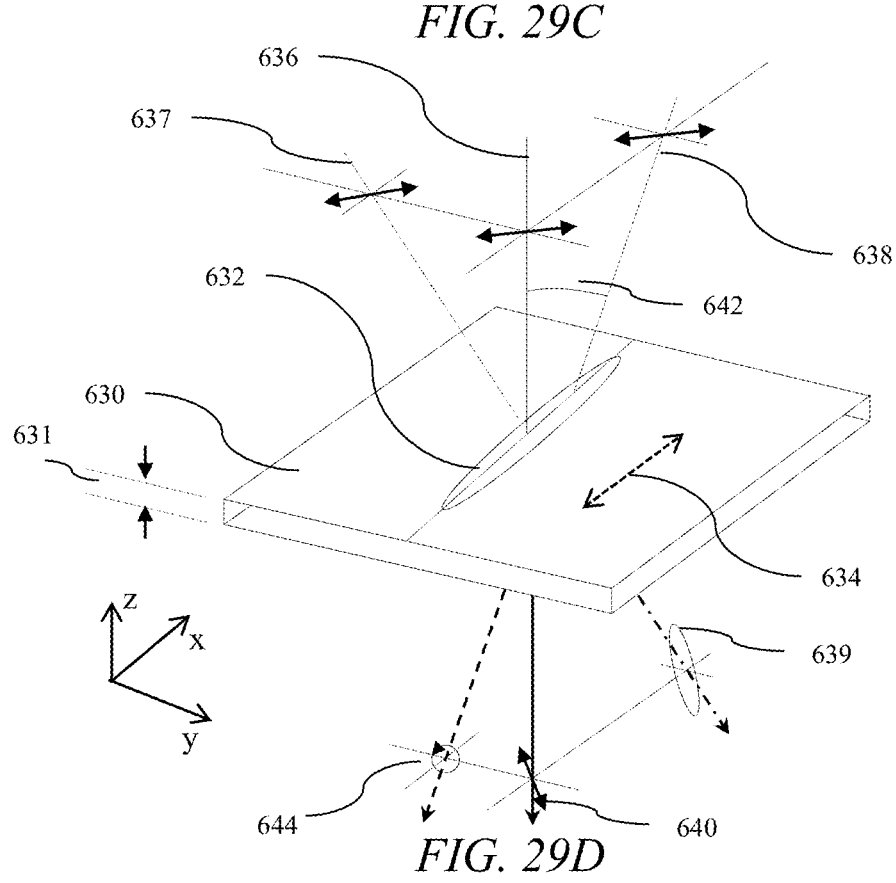
FIG. 29D is a schematic diagram illustrating in perspective view illumination of a retarder layer by off-axis light of a first linear polarization state at 45 degrees.

FIG. 29D is a schematic diagram illustrating in perspective view illumination of a retarder 630 layer by off-axis light of a linear polarization state at 45 degrees. The linear polarization state may be resolved into third and fourth polarization components that are respectively orthogonal and parallel to optical axis 634 direction. The retarder thickness 631 and material retardance represented by refractive index ellipsoid 632 may provide a net effect of relatively shifting the phase of the third and fourth polarization components incident thereon in a normal direction represented by ray 636 by half a wavelength, for a design wavelength. The design wavelength may for example be in the range of 500 to 550 nm.

At the design wavelength and for light propagating normally along ray 636 then the output polarization may be rotated by 90 degrees to a linear polarization state 640 at −45 degrees. Light propagating along ray 637 may see a phase difference that is similar but not identical to the phase difference along ray 637 due to the change in thickness, and thus an elliptical polarization state 639 may be output which may have a major axis similar to the linear polarization axis of the output light for ray 636.

By way of contrast, the phase difference for the incident linear polarization state along ray 638 may be significantly different, in particular a lower phase difference may be provided. Such phase difference may provide an output polarization state 644 that is substantially circular at a given inclination angle 642. Thus, the retarder 630 introduces a phase shift to polarisation components of light passed by the polariser on the input side of the retarder 630 along an axis corresponding to ray 638 that is inclined to a normal to the plane of the retarder 630. Although FIG. 29D relates to the retarder 630 that is passive, a similar effect is achieved by a switchable liquid crystal retarder, and in the plural retarders described above, in a switchable state of the switchable liquid crystal retarder corresponding to the privacy mode.

To illustrate the off-axis behavior of retarder stacks, the angular luminance control of C-plates 308A, 308B between an additional polariser 318 and output display polariser 218 will now be described for various off-axis illumination arrangements with reference to the operation of a C-plate 560 between the parallel polarisers 500, 210.

Figure 30A:
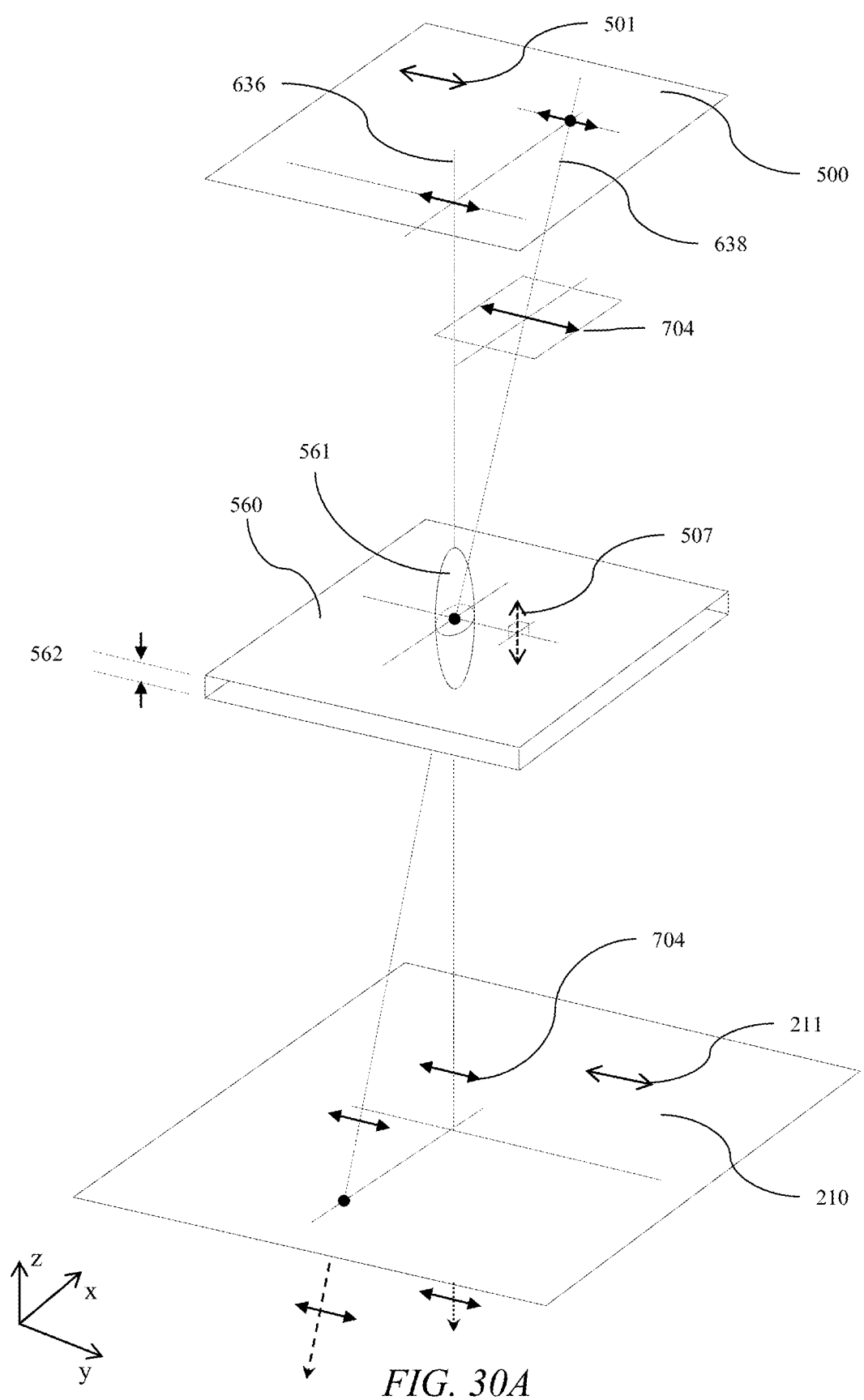
FIG. 30A is a schematic diagram illustrating in perspective view illumination of a C-plate retarder by off-axis polarised light with a positive elevation.

FIG. 30A is a schematic diagram illustrating in perspective view illumination of a C-plate layer by off-axis polarised light with a positive elevation. Incident linear polarisation component 704 is incident onto the birefringent material 632 of the retarder 560 that is a C-plate with optical axis direction 507 that is perpendicular to the plane of the retarder 560. Polarisation component 704 sees no net phase difference on transmission through the liquid crystal molecule and so the output polarisation component is the same as component 704. Thus a maximum transmission is seen through the polariser 210. Thus the retarder comprises a retarder 560 having an optical axis 561 perpendicular to the plane of the retarder 560, that is the x-y plane. The retarder 560 having an optical axis perpendicular to the plane of the retarder comprises a C-plate.

Figure 30B:
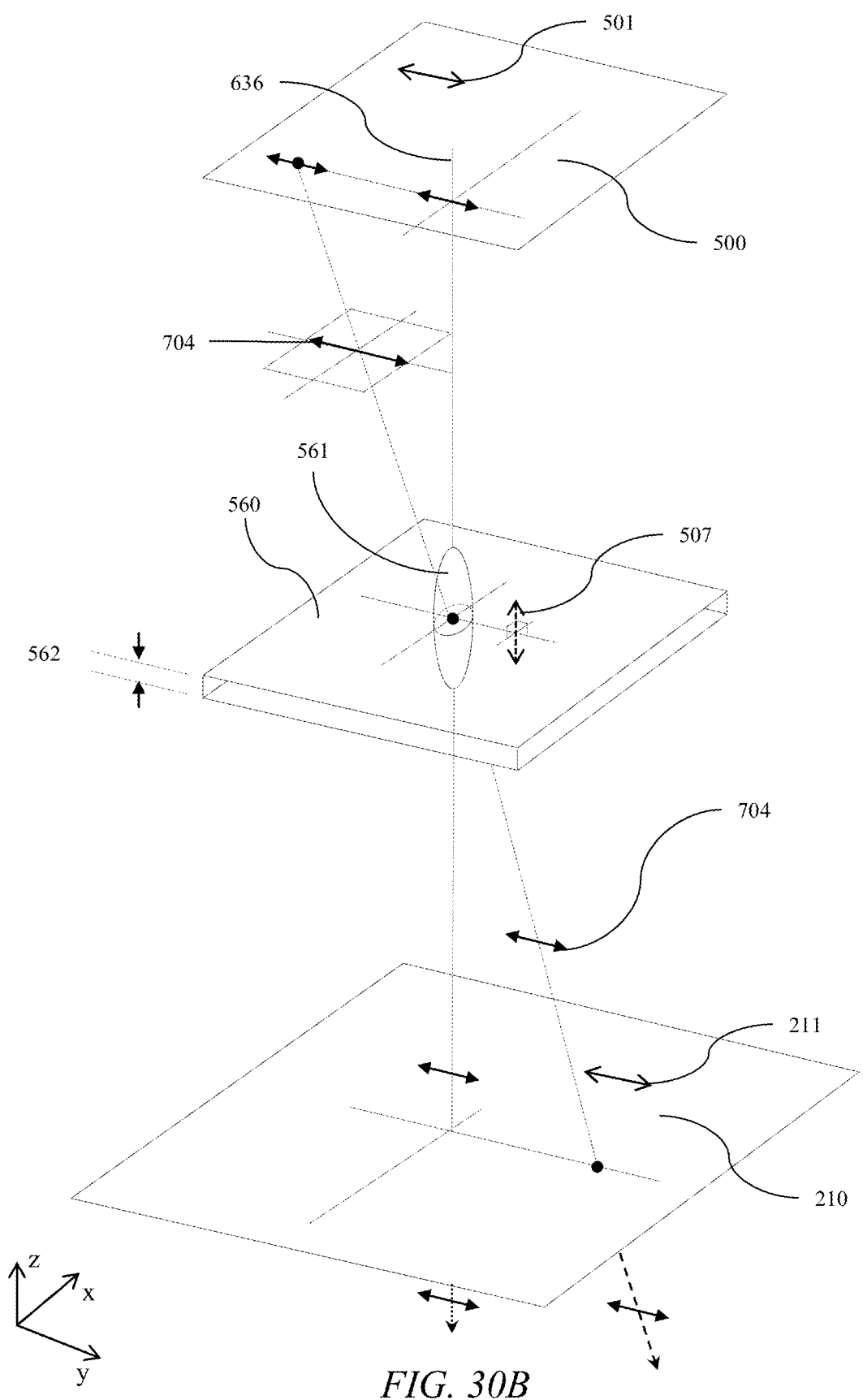
FIG. 30B is a schematic diagram illustrating in perspective view illumination of a C-plate retarder by off-axis polarised light with a negative lateral angle.

FIG. 30B is a schematic diagram illustrating in perspective view illumination of a C-plate layer by off-axis polarised light with a negative lateral angle. As with the arrangement of FIG. 30A, polarisation state 704 sees no net phase difference and is transmitted with maximum luminance. Thus, the retarder 560 introduces no phase shift to polarisation components of light passed by the polariser on the input side of the retarder 560 along an axis along a normal to the plane of the retarder 560. Accordingly, the retarder 560 does not affect the luminance of light passing through the retarder 560 and polarisers (not shown) on each side of the retarder 560. Although FIGS. 29A-C relate specifically to the retarder 560 that is passive, a similar effect is achieved by a switchable liquid crystal retarder and by plural retarders in the devices described above.

Figure 30C:
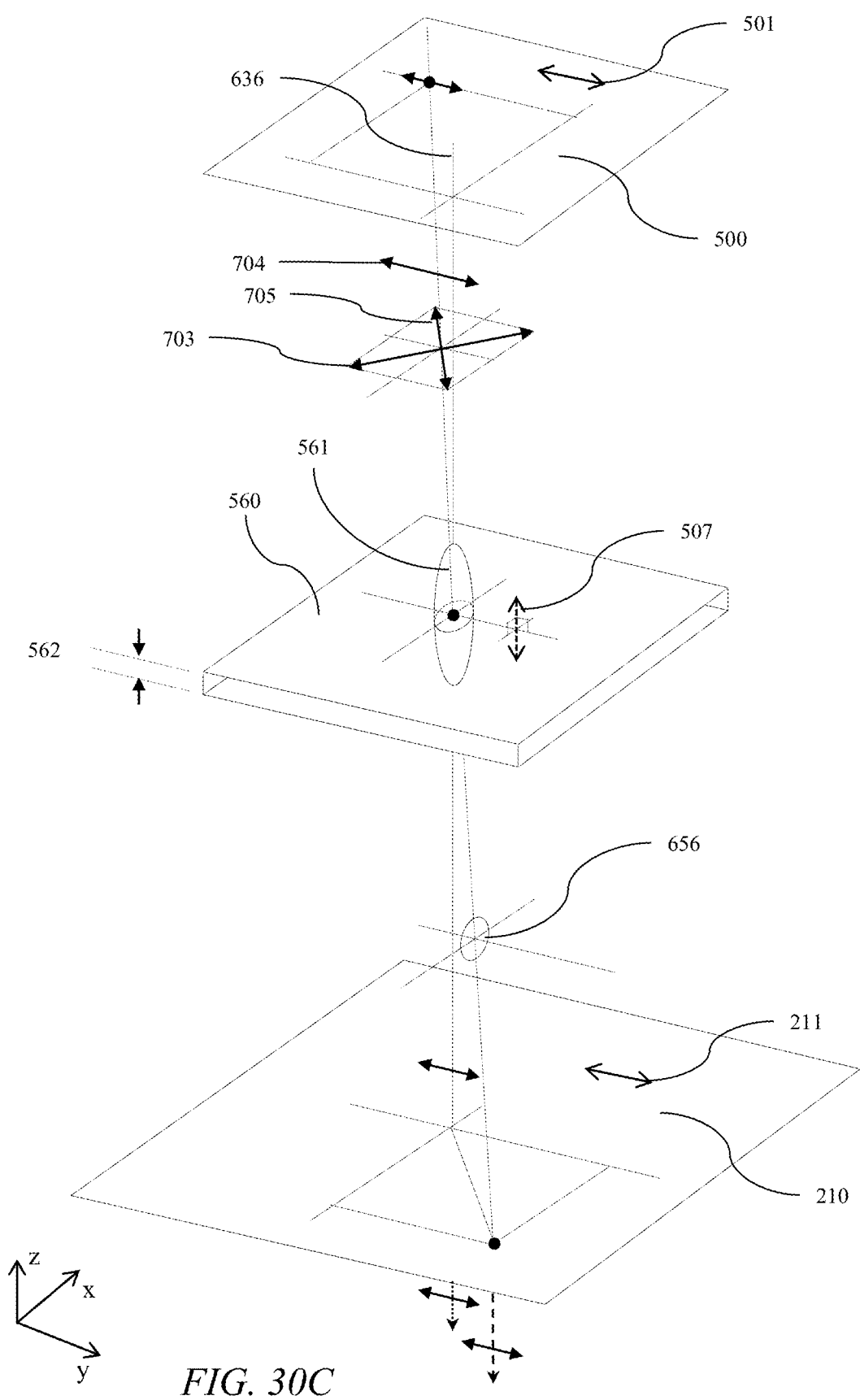
FIG. 30C is a schematic diagram illustrating in perspective view illumination of a C-plate retarder by off-axis polarised light with a positive elevation and negative lateral angle.

FIG. 30C is a schematic diagram illustrating in perspective view illumination of a C-plate layer by off-axis polarised light with a positive elevation and negative lateral angle. In comparison to the arrangement of FIGS. 30A-B, the polarisation state 704 resolves onto eigenstates 703, 705 with respect to the birefringent material 632 providing a net phase difference on transmission through the retarder 560. The resultant elliptical polarisation component 656 is transmitted through polariser 210 with reduced luminance in comparison to the rays illustrated in FIGS. 30A-B.

Figure 30D:
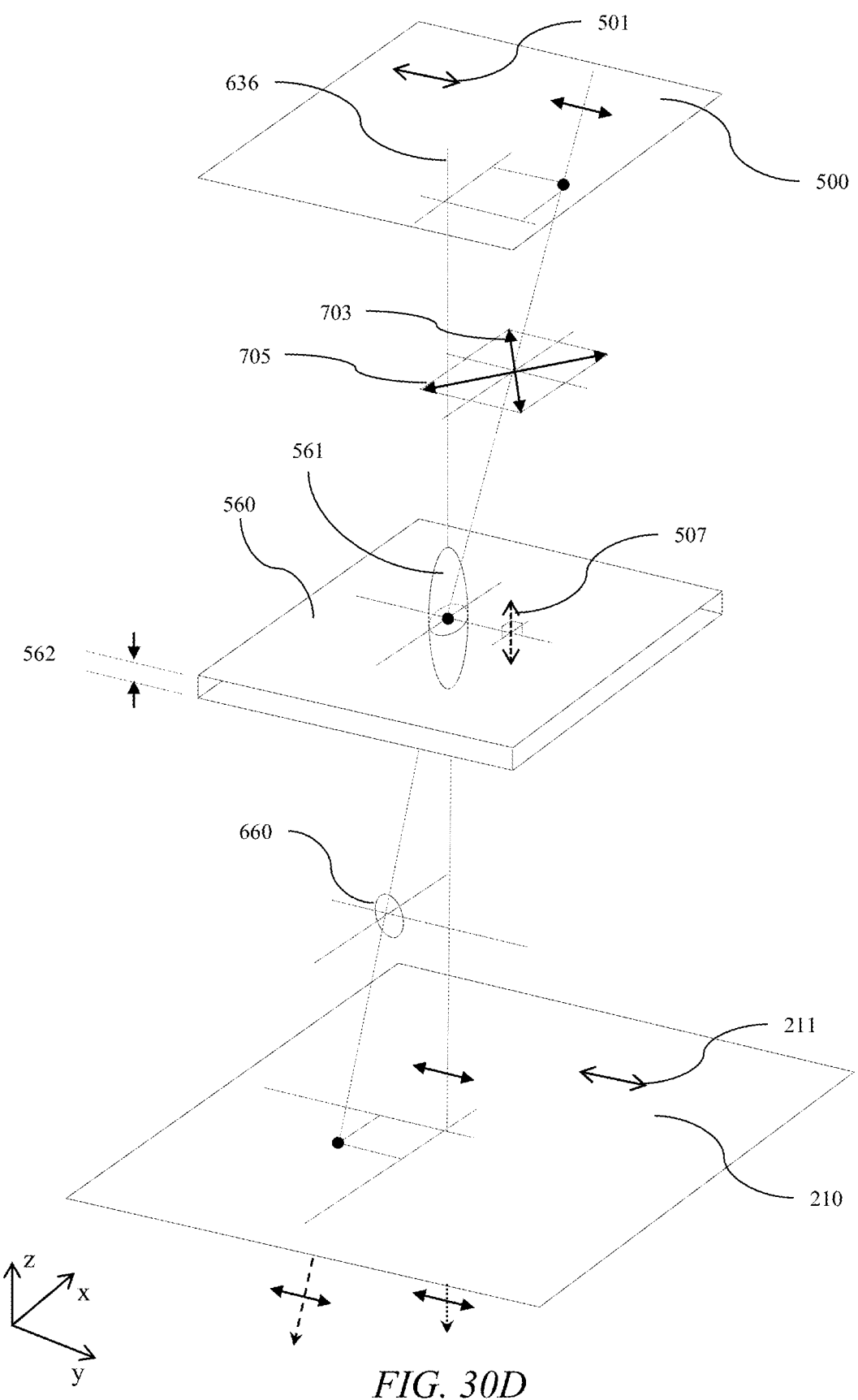
FIG. 30D is a schematic diagram illustrating in perspective view illumination of a C-plate retarder by off-axis polarised light with a positive elevation and positive lateral angle.

FIG. 30D is a schematic diagram illustrating in perspective view illumination of a C-plate layer by off-axis polarised light with a positive elevation and positive lateral angle. In a similar manner to FIG. 30C, the polarisation component 704 is resolved into eigenstates 703, 705 that undergo a net phase difference, and elliptical polarisation component 660 is provided, which after transmission through the polariser reduces the luminance of the respective off-axis ray. Thus, the retarder 560 introduces a phase shift to polarisation components of light passed by the polariser on the input side of the retarder 560 along an axis that is inclined to a normal to the plane of the retarder 560. Although FIG. 29D relates to the retarder 560 that is passive, a similar effect is achieved by a switchable liquid crystal retarder, and in the plural retarders described above, in a switchable state of the switchable liquid crystal retarder corresponding to the privacy mode.

Figure 30E:
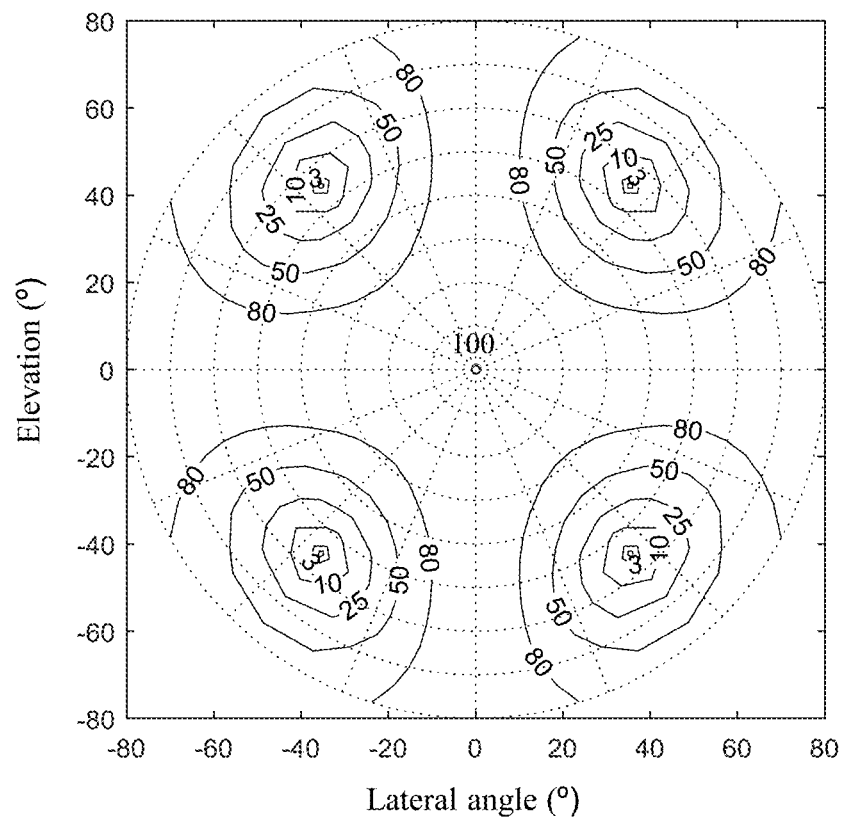
FIG. 30E is a schematic graph illustrating the variation of output transmission with polar direction for transmitted light rays in FIGS. 30A-D.

FIG. 30E is a schematic graph illustrating the variation of output transmission with polar direction for transmitted light rays in FIGS. 30A-D. Thus, the C-plate may provide luminance reduction in polar quadrants. In combination with switchable liquid crystal retarder 301 described elsewhere herein, (i) removal of luminance reduction of the C-plate may be provided in a first wide angle state of operation, and (ii) extended polar region for luminance reduction may be achieved in a second privacy state of operation.

To illustrate the off-axis behavior of retarder stacks, the angular luminance control of crossed A-plates 308A, 308B between an additional polariser 318 and output display polariser 218 will now be described for various off-axis illumination arrangements.

Figure 31A:
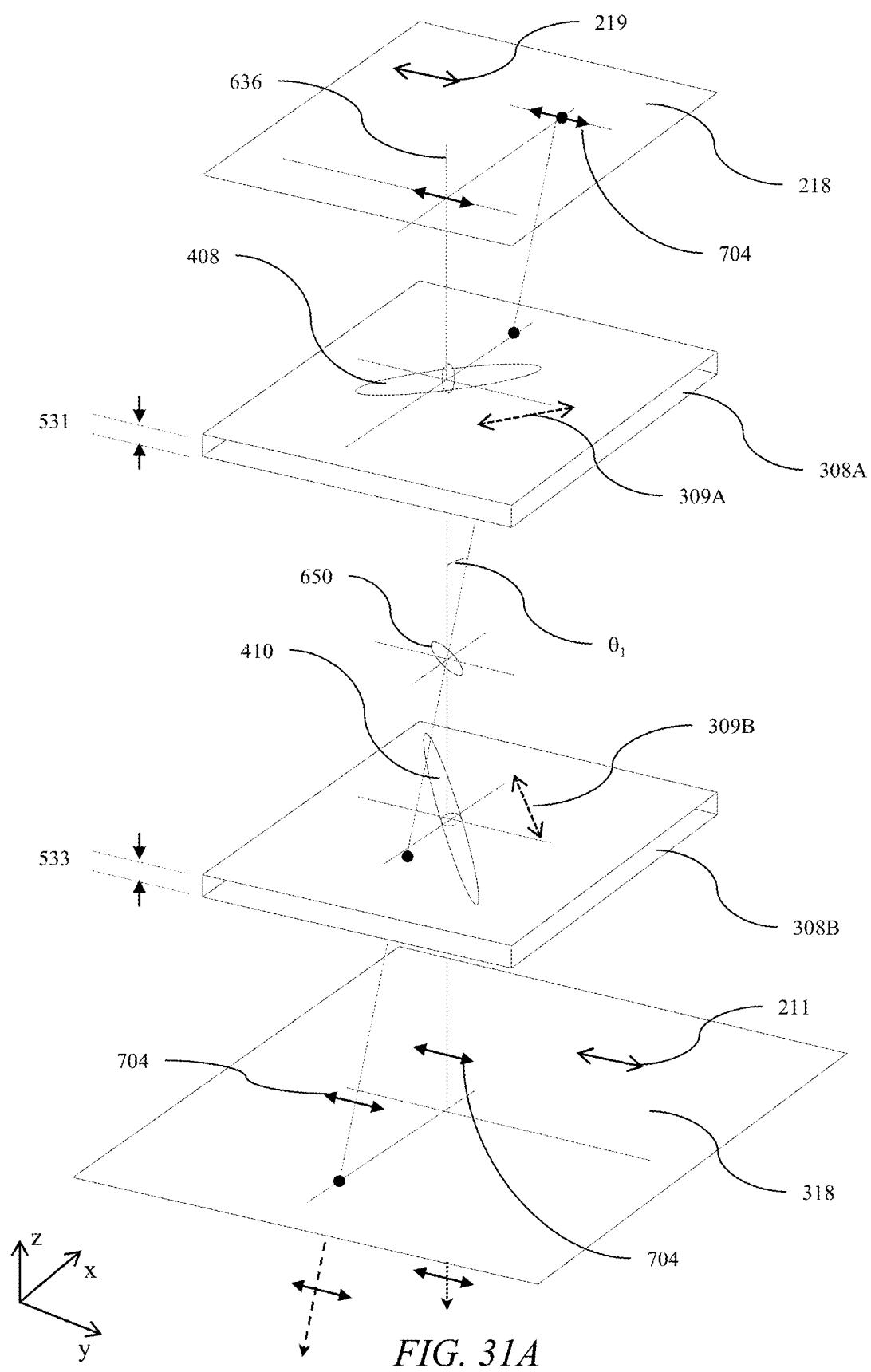
FIG. 31A is a schematic diagram illustrating in perspective view illumination of crossed A-plate retarder layers by off-axis polarised light with a positive elevation.

FIG. 31A is a schematic diagram illustrating in perspective view illumination of crossed A-plate retarder layers by off-axis polarised light with a positive elevation. Linear polariser 218 with electric vector transmission direction 219 is used to provide a linear polarisation state 704 that is parallel to the lateral direction onto first A-plate 308A of the crossed A-plates 308A, 308B. The optical axis direction 309A is inclined at +45 degrees to the lateral direction. The retardance of the retarder 308A for the off-axis angle $\theta_1$ in the positive elevation direction provides a resultant polarisation component 650 that is generally elliptical on output. Polarisation component 650 is incident onto the second A-plate 308B of the crossed A-plates 308A, 308B that has an optical axis direction 309B that is orthogonal to the optical axis direction 309A of the first A-plate 308A. In the plane of incidence of FIG. 31A, the retardance of the second A-plate 308B for the off-axis angle $\theta_1$ is equal and opposite to the retardance of the first A-plate 308A. Thus a net zero retardation is provided for the incident polarisation component 704 and the output polarisation component is the same as the input polarisation component 704.

The output polarisation component is aligned to the electric vector transmission direction of the additional polariser 318, and thus is transmitted efficiently. Advantageously substantially no losses are provided for light rays that have zero lateral angle angular component so that full transmission efficiency is achieved.

Figure 31B:
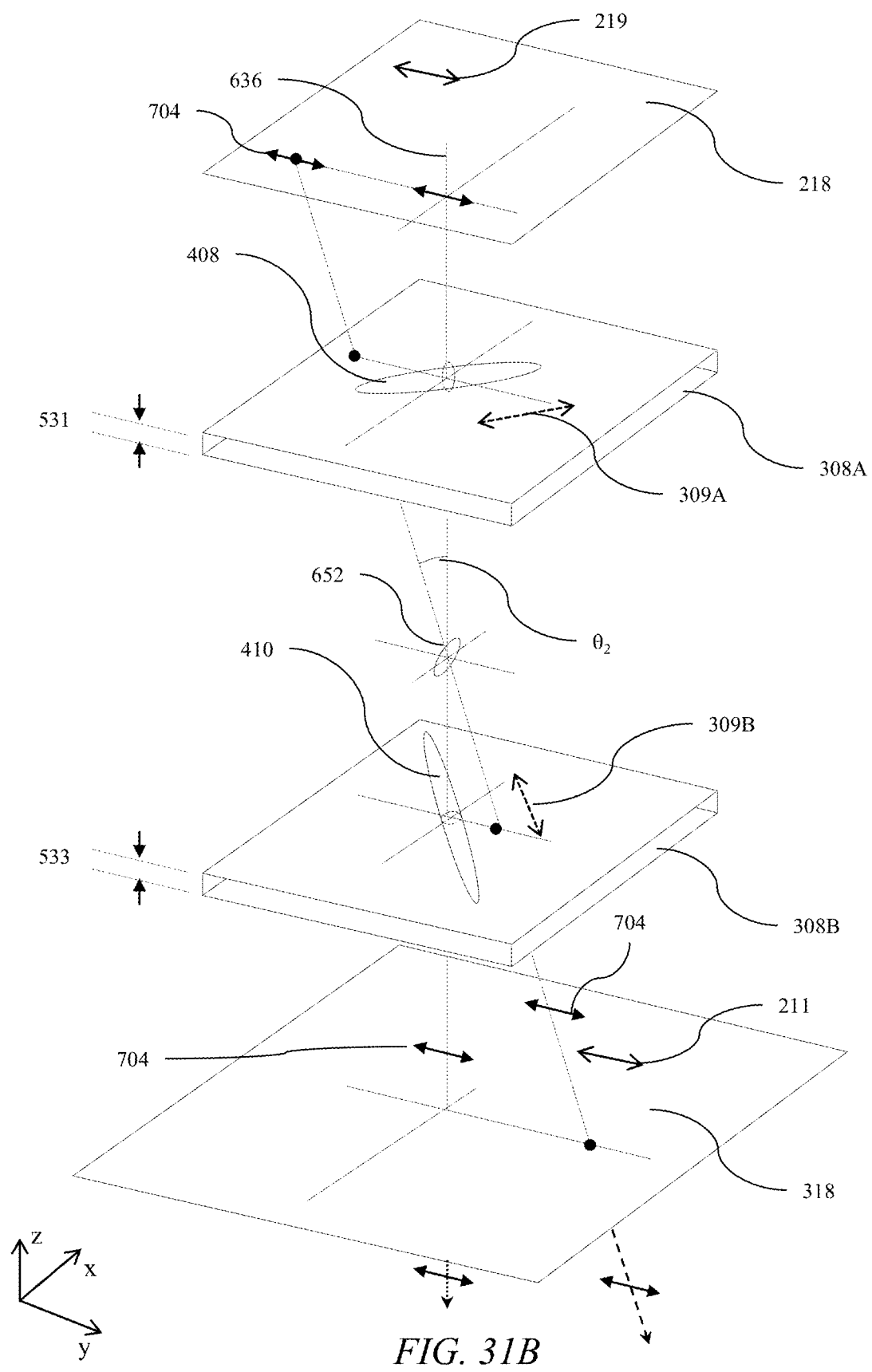
FIG. 31B is a schematic diagram illustrating in perspective view illumination of crossed A-plate retarder layers by off-axis polarised light with a negative lateral angle.

FIG. 31B is a schematic diagram illustrating in perspective view illumination of crossed A-plate retarder layers by off-axis polarised light with a negative lateral angle. Thus input polarisation component is converted by the first A-plate 308A to an intermediate polarisation component 652 that is generally an elliptical polarisation state. The second A-plate 308B again provides an equal and opposite retardation to the first A-plate so that the output polarisation component is the same as the input polarisation component 704 and light is efficiently transmitted through the polariser 318.

Thus the retarder comprises a pair of retarders 308A, 308B which have optical axes in the plane of the retarders 308A, 308B that are crossed, that is the x-y plane in the present embodiments. The pair of retarders 308A, 308B have optical axes 309A, 309B that each extend at 45° with respect to an electric vector transmission direction that is parallel to the electric vector transmission of the polariser 318.

Advantageously substantially no losses are provided for light rays that have zero elevation angular component so that full transmission efficiency is achieved.

Figure 31C:
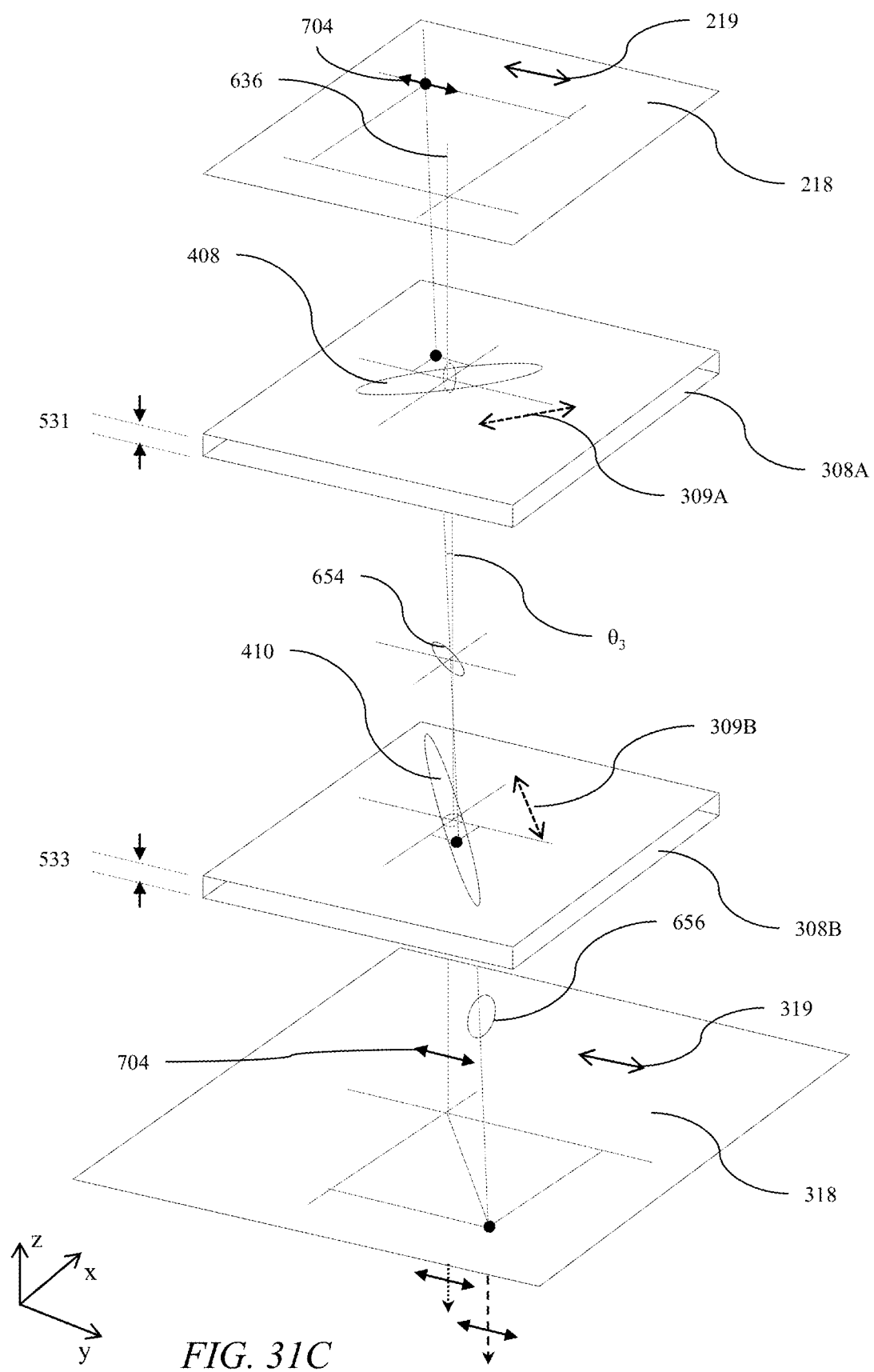
FIG. 31C is a schematic diagram illustrating in perspective view illumination of crossed A-plate retarder layers by off-axis polarised light with a positive elevation and negative lateral angle.

FIG. 31C is a schematic diagram illustrating in perspective view illumination of crossed A-plate retarder layers by off-axis polarised light with a positive elevation and negative lateral angle. Polarisation component 704 is converted to an elliptical polarisation component 654 by first A-plate 308A. A resultant elliptical component 656 is output from the second A-plate 308B. Elliptical component 656 is analysed by input polariser 318 with reduced luminance in comparison to the input luminance of the first polarisation component 704.

Figure 31D:
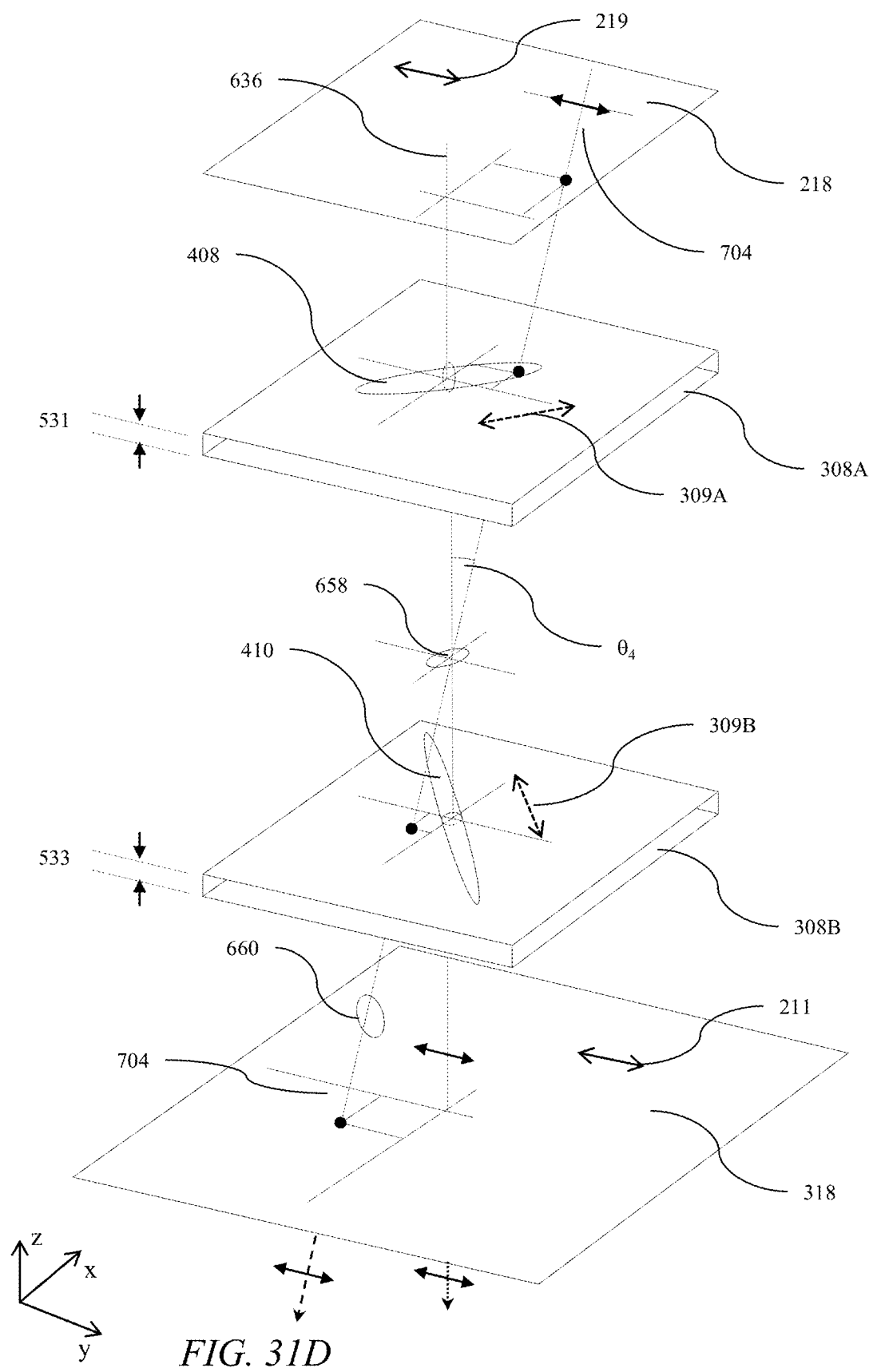
FIG. 31D is a schematic diagram illustrating in perspective view illumination of crossed A-plate retarder layers by off-axis polarised light with a positive elevation and positive lateral angle.

FIG. 31D is a schematic diagram illustrating in perspective view illumination of crossed A-plate retarder layers by off-axis polarised light with a positive elevation and positive lateral angle. Polarisation components 658 and 660 are provided by first and second A-plates 308A, 308B as net retardance of first and second retarders does not provide compensation.

Thus luminance is reduced for light rays that have non-zero lateral angle and non-zero elevation components. Advantageously display privacy can be increased for snoopers that are arranged in viewing quadrants while luminous efficiency for primary display users is not substantially reduced.

Figure 31E:
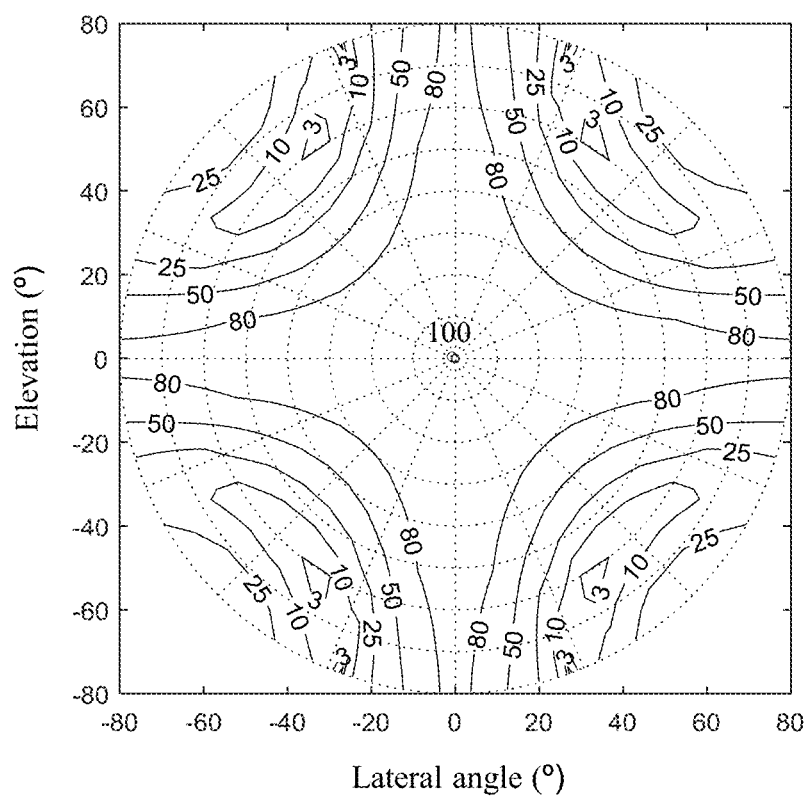
FIG. 31E is a schematic graph illustrating the variation of output transmission with polar direction for transmitted light rays in FIGS. 31A-D.

FIG. 31E is a schematic graph illustrating the variation of output transmission with polar direction for transmitted light rays in FIGS. 31A-D. In comparison to the arrangement of FIG. 30E, the area of luminance reduction is increased for off-axis viewing. However, the switchable liquid crystal retarder 301 may provide reduced uniformity in comparison to the C-plate arrangements for off-axis viewing in the first wide mode state of operation.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A display device comprising:
 a backlight arranged to output light, the backlight comprising
 a directional waveguide; and
 plural light sources arranged to input light into the waveguide, the waveguide being arranged to direct light from different light sources into different solid angular extents as the output light;
 a transmissive spatial light modulator arranged to receive the output light from the backlight;

an input polariser arranged on the input side of the spatial light modulator between the backlight and the spatial light modulator;

an output polariser arranged on the output side of the spatial light modulator;

an additional polariser arranged on the input side of the input polariser between the input polariser and the backlight or on the output side of the output polariser; and a switchable liquid crystal retarder comprising a layer of liquid crystal material arranged between the at least one additional polariser and the input polariser in the case that the additional polariser is arranged on the input side of the input polariser or between the additional polariser and the output polariser in the case that the additional polariser is arranged on the output side of the output polariser; and a control system arranged to synchronously control the light sources and the at least one switchable liquid crystal retarder.

2. A display device according to claim 1, wherein the control system is arranged:

in a first device state, to operate light sources to selectively operate a first set of the light sources, the output light from which is directed into a first output solid angular extent, and to switch the switchable liquid crystal retarder into a first retarder state in which no phase shift is introduced to light passing therethrough; and in a second device state, to operate light sources to selectively operate a second set of the light sources, the output light from which is directed into a second output solid angular extent that is narrower than the first output solid angular extent, and to switch the switchable liquid crystal retarder into a second retarder state in which a phase shift is introduced to polarisation components of light passing therethrough along an axis inclined to a normal to the plane of the switchable liquid crystal retarder.

3. A display device according to claim 1, wherein the directional waveguide comprises:

at least one light input surface extending in a lateral direction along an end of the waveguide, the light sources being disposed along the at least one light input surface; and opposed first and second light guiding surfaces extending across the waveguide from the at least one light input surfaces for guiding the input light along the waveguide by total internal reflection, the waveguide being arranged to deflect input light guided through the waveguide to exit through the first guide surface.

4. A display device according to claim 3, wherein the second guide surface is arranged to deflect the reflected input light through the first guide surface as output light, and the waveguide is arranged to image the light sources in the lateral direction so that the output light from the light sources is directed into respective optical windows in output directions that are distributed in dependence on input positions of the light sources.

5. A display device according to claim 4, wherein the waveguide comprises a light input surface extending along a first end of the directional waveguide, and a reflective end extending along a second end of the directional waveguide opposite to the first end for reflecting the input light back along the waveguide, the reflective end having positive optical power in the lateral direction.

6. A display device according to claim 3, wherein the second guide surface comprises light extraction features and intermediate regions between the light extraction features, the light extraction features being oriented to deflect the reflected input light through the first guide surface as output light and the intermediate regions being arranged to direct light through the waveguide without extracting it.

7. A display device according to claim 6, wherein the light extraction features have positive optical power in the lateral direction.

8. A display device according to claim 3, wherein the at least one light input surface comprises a first input surface extending along a first end of the waveguide and a second input surface extending along a second light input end of the waveguide wherein the second light input end faces the first light input end.

9. A display device according to claim 8, wherein the first light guiding surface comprises: a plurality of non-inclined light extraction features arranged in an array, each non-inclined light extraction feature being elongate, extending in a longitudinal direction perpendicular to the lateral direction, and having surface normal directions that vary in a plane orthogonal to the longitudinal direction and that have no component of tilt in the longitudinal direction;

and the second light guiding surface comprises: a plurality of inclined light extraction features arranged in an array, each inclined light extraction feature having a surface normal direction with a tilt that has a component in the longitudinal direction, the plurality of non-inclined light extraction features and the plurality of inclined light extraction features being oriented to direct guided light through the first and second light guiding surfaces as output light.

10. A display device according to claim 8, wherein the first light guiding surface comprises a planar surface and the second light guiding surface comprises:

(i) a plurality of non-inclined light extraction features arranged in an array, each non-inclined light extraction feature being elongate, extending in a longitudinal direction perpendicular to the lateral direction, and having surface normal directions that vary in a plane orthogonal to the longitudinal direction and that have no component of tilt in the longitudinal direction; and (ii) a plurality of inclined light extraction features arranged in an array, each inclined light extraction feature having a surface normal direction with a tilt that has a component in the longitudinal direction, the plurality of non-inclined light extraction features and the plurality of inclined light extraction features being oriented to direct guided light through the first and second light guiding surfaces as output light.

11. An optical waveguide according to claim 9, wherein the plurality of inclined light extraction features comprises:

a first plurality of inclined light extraction features, each light extraction feature of the first plurality of inclined light extraction features having a surface normal direction that has a tilt with a component in the longitudinal direction that is away from the first light input end; and a second plurality of inclined light extraction features, each light extraction feature of the second plurality of inclined light extraction features having a surface normal direction that has a tilt with a component in the longitudinal direction that is towards the first light input end.

12. An optical waveguide according to claim 11, wherein the magnitude of the component in the longitudinal direction of the tilt of the surface normal direction of the first plurality of inclined light extraction features is different from the magnitude of the component in the longitudinal direction of the tilt of the surface normal direction of the second plurality of inclined light extraction features.

13. A display device according to claim 9, wherein the plurality of non-inclined light extraction features comprises a lenticular surface or an elongate prismatic surface.

14. A display device according to claim 8, further comprising a light turning film comprising an array of elongate prismatic elements.

15. A display device according to claim 1, wherein the switchable liquid crystal retarder comprises electrodes disposed adjacent to the layer of liquid crystal material and on opposite sides of the liquid crystal layer.

16. A display device according to claim 15, wherein the control system controls the switchable liquid crystal material by means of control of a voltage being applied across the electrodes.

17. A display device according to claim 16, wherein the layer of liquid crystal material is switchable between two orientation states.

18. A display device according to claim 17, wherein
when the layer of liquid crystal material is in the first orientation state of said two orientation states, the liquid crystal retarder provides no overall retardance to light passing therethrough perpendicular to the plane of the liquid crystal retarder or at an acute angle to the perpendicular to the plane of the liquid crystal retarder, and
when the layer of liquid crystal material is in the second orientation state of said two orientation states, the liquid crystal retarder provides no overall retardance to light passing therethrough along an axis perpendicular to the plane of the retarders, but provides a non-zero overall retardance to light passing therethrough for some polar angles that are at an acute angle to the perpendicular to the plane of the liquid crystal retarder.

19. A display device according to claim 1, wherein
in the case that the additional polariser is arranged on the input side of the input polariser between the input polariser and the backlight, the additional polariser has an electric vector transmission direction that is parallel to the electric vector transmission direction of the input polariser; or
in the case that the additional polariser is arranged on the output side of the output polariser, the additional polariser has an electric vector transmission direction that is parallel to the electric vector transmission direction of the output polariser.

20. A display device according to claim 1, further comprising at least one passive compensation retarder arranged between the at least one additional polariser and the input polariser in the case that the additional polariser is arranged on the input side of the input polariser or between the additional polariser and the output polariser in the case that the additional polariser is arranged on the output side of the output polariser.

21. A display device according to claim 1, wherein the at least one passive compensation retarder comprises a pair of positive birefringent retarders which have optical axes in the plane of the retarders that are crossed.

22. A display device according to claim 21, wherein the pair of retarders have optical axes that each extend at 45° with respect to an electric vector transmission direction that is parallel to the electric vector transmission of the input display polariser in the case that the additional polariser is arranged on the input side of the input display polariser or is parallel to the electric vector transmission of the output display polariser in the case that the additional polariser is arranged on the output side of the input display polariser.

23. A display device according to claim 21, wherein the pair of retarders each comprise a single A-plate.

24. A display device according to claim 20, wherein the at least one passive compensation retarder comprises a retarder having an optical axis perpendicular to the plane of the retarder.

25. A display device according to claim 24, wherein the passive compensation retarder having an optical axis perpendicular to the plane of the retarders comprises a negative C-plate.

26. A display device according to claim 1, wherein the switchable liquid crystal retarder further comprises at least one surface alignment layer disposed adjacent to the layer of liquid crystal material and arranged to provide homeotropic alignment in the adjacent liquid crystal material.

27. A display device according to claim 26, wherein the switchable liquid crystal retarder comprises two surface alignment layers disposed adjacent to the layer liquid crystal material and on opposite sides thereof and arranged to provide homeotropic alignment in the adjacent liquid crystal material.

28. A display device according to claim 27, wherein the layer of liquid crystal material of the switchable retarder comprises a liquid crystal material with a negative dielectric anisotropy.

29. A display device according to claim 27, wherein the layer of liquid crystal material has a retardance for light of a wavelength of 550 nm in a range from 500 nm to 1000 nm, preferably in a range from 600 nm to 900 nm and most preferably in a range from 700 nm to 850 nm.

30. A display device according to claim 27, wherein:
the at least one passive compensation retarder comprises a retarder having its optical axis perpendicular to the plane of the retarder, the at least one passive retarder having a retardance for light of a wavelength of 550 nm in a range from −300 nm to −900 nm, preferably in a range from −450 nm to −800 nm and most preferably in a range from −500 nm to −725 nm; or
the at least one passive compensation retarder comprises a pair of retarders which have optical axes in the plane of the retarders that are crossed, each retarder of the pair of retarders having a retardance for light of a wavelength of 550 nm in a range from 300 nm to 800 nm, preferably in a range from 500 nm to 700 nm and most preferably in a range from 550 nm to 675 nm.

31. A display device according to claim 1, wherein the switchable liquid crystal retarder further comprises at least one surface alignment layer disposed adjacent to the layer of liquid crystal material and arranged to provide homogeneous alignment in the adjacent liquid crystal material.

32. A display device according to claim 31, wherein the switchable liquid crystal retarder comprises two surface alignment layers disposed adjacent to the layer of liquid crystal material and on opposite sides thereof and arranged to provide homogeneous alignment in the adjacent liquid crystal material.

33. A display device according to claim 32, wherein the layer of liquid crystal material of the switchable liquid crystal retarder comprises a liquid crystal material with a positive dielectric anisotropy.

34. A display device according to claim 32, wherein the layer of liquid crystal material has a retardance for light of a wavelength of 550 nm in a range from 500 nm to 1,000 nm, preferably in a range from 600 nm to 850 nm and most preferably in a range from 700 nm to 800 nm.

35. A display device according to claim 32, wherein:
the at least one passive compensation retarder comprises a retarder having its optical axis perpendicular to the plane of the retarder, the at least one passive retarder having a retardance for light of a wavelength of 550 nm in a range from −300 nm to −700 nm, preferably in a range from −350 nm to −600 nm and most preferably in a range from −400 nm to −500 nm; or
the at least one passive compensation retarder comprises a pair of retarders which have optical axes in the plane of the retarders that are crossed, each retarder of the pair of retarders having a retardance for light of a wavelength of 550 nm in a range from 300 nm to 800 nm, preferably in a range from 350 nm to 650 nm and most preferably in a range from 450 nm to 550 nm.

36. A display device according to claim 1, wherein the switchable liquid crystal retarder comprises two surface alignment layers disposed adjacent to the layer of liquid crystal material and on opposite sides thereof, one of the surface alignment layers being arranged to provide homeotropic alignment in the adjacent liquid crystal material and the other of the surface alignment layers being arranged to provide homogeneous alignment in the adjacent liquid crystal material.

37. A display device according to claim 36, wherein the surface alignment layer arranged to provide homogeneous alignment is between the layer of liquid crystal material and the compensation retarder;
the layer of liquid crystal material has a retardance for light of a wavelength of 550 nm in a range from 700 nm to 2,000 nm, preferably in a range from 1,000 nm to 1,500 nm and most preferably in a range from 1,200 nm to 1,500 nm; and
the at least one passive compensation retarder comprises a retarder having its optical axis perpendicular to the plane of the retarder, the at least one passive retarder having a retardance for light of a wavelength of 550 nm in a range from −400 nm to −1,800 nm, preferably in a range from −700 nm to −1,500 nm and most preferably in a range from −900 nm to −1,300 nm; or
the at least one passive compensation retarder comprises a pair of retarders which have optical axes in the plane of the retarders that are crossed, each retarder of the pair of retarders having a retardance for light of a wavelength of 550 nm in a range from 400 nm to 1,800 nm, preferably in a range from 700 nm to 1500 nm and most preferably in a range from 900 nm to 1,300 nm.

38. A display device according to claim 36, wherein the surface alignment layer arranged to provide homeotropic alignment is between the layer of liquid crystal material and the compensation retarder;
the layer of liquid crystal material has a retardance for light of a wavelength of 550 nm in a range from 500 nm to 1,800 nm, preferably in a range from 700 nm to 1,500 nm and most preferably in a range from 900 nm to 1,350 nm; and
the at least one passive compensation retarder comprises a retarder having its optical axis perpendicular to the plane of the retarder, the at least one passive retarder having a retardance for light of a wavelength of 550 nm in a range from −300 nm to −1,600 nm, preferably in a range from −500 nm to −1,300 nm and most preferably in a range from −700 nm to −1,150 nm; or
the at least one passive compensation retarder comprises a pair of retarders which have optical axes in the plane of the retarders that are crossed, each retarder of the pair of retarders having a retardance for light of a wavelength of 550 nm in a range from 400 nm to 1,600 nm, preferably in a range from 600 nm to 1,400 nm and most preferably in a range from 800 nm to 1,300 nm.

39. A display device according to claim 1, further comprising:
a further additional polariser arranged either on the input side of the input display polariser between the first-mentioned additional polariser and the backlight in the case that the first-mentioned additional polariser is arranged on the input side of the input display polariser, or on the output side of the first-mentioned additional polariser in the case that the first-mentioned additional polariser is arranged on the output side of the output display polariser; and
at least one further retarder arranged between the further additional polariser and the first-mentioned additional polariser in the case that the first-mentioned additional polariser is arranged on the input side of the input display polariser or between the further additional polariser and the first-mentioned additional polariser in the case that the first-mentioned additional polariser is arranged on the output side of the output display polariser,
wherein the at least one further retarder comprises at least one passive compensation retarder.

40. A display device according to claim 1, wherein the first-mentioned additional polariser is arranged on the input side of the input display polariser between the input display polariser and the backlight, and the display device further comprises:
a further additional polariser arranged on the output side of the output display polariser; and
at least one further retarder arranged between the further additional polariser and the output display polariser.

41. A display device according to claim 35, wherein the at least one further retarder comprises a further switchable liquid crystal retarder comprising a layer of liquid crystal material and electrodes on opposite sides of the layer of liquid crystal material, the layer of liquid crystal material being switchable between two orientation states by means of a voltage being applied across the electrodes.

42. A display device according to claim 1, wherein in the case that the first-mentioned or further additional polariser is arranged on the input side of the input display polariser, the first-mentioned additional polariser or further additional polariser is a reflective polariser.

43. A display device according to claim 1, wherein in the second device state the backlight provides a luminance at lateral angles greater than 45 degrees, that is at most 20%, preferably at most 15% and most preferably at most 10% of the luminance in a direction normal to the display surface.

44. A display device according to claim 1, wherein in the second device state for a display luminance in a direction normal to the display surface of 1 nit and Lambertian ambient illuminance of 1 lux, the visual security level at lateral angles greater than 45 degrees is greater than 3.0, preferably greater than 4.0 and most preferably greater than 5.0.

45. A display device according to claim 1, wherein in the first device state the backlight provides a luminance at lateral angles greater than 45 degrees that is greater than 20%, preferably greater than 25% and most preferably greater than 30% of the luminance in a direction normal to the display surface.

46. A display device according to claim 1, wherein in the first device state for a display luminance in a direction normal to the display surface of 1 nit and Lambertian ambient illuminance of 1 lux, the image visibility at lateral angles greater than 45 degrees is greater than 0.85, preferably greater than 0.9 and most preferably greater than 0.95.

* * * * *